US009895706B2

(12) United States Patent
Velásquez-García et al.

(10) Patent No.: US 9,895,706 B2
(45) Date of Patent: Feb. 20, 2018

(54) ELECTRICALLY-DRIVEN FLUID FLOW AND RELATED SYSTEMS AND METHODS, INCLUDING ELECTROSPINNING AND ELECTROSPRAYING SYSTEMS AND METHODS

(71) Applicant: Massachusetts Institute of Technology, Cambridge, MA (US)

(72) Inventors: Luis Fernando Velásquez-García, Newton, MA (US); Philip James Ponce De Leon, Shenorock, NY (US); Frances Ann Hill, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/145,650

(22) Filed: May 3, 2016

(65) Prior Publication Data

US 2016/0318048 A1 Nov. 3, 2016
US 2017/0189922 A9 Jul. 6, 2017

Related U.S. Application Data

(62) Division of application No. 13/918,759, filed on Jun. 14, 2013, now Pat. No. 9,358,556.
(Continued)

(51) Int. Cl.
| | | |
|---|---|---|
| *B05B 5/025* | (2006.01) | |
| *B05B 5/057* | (2006.01) | |
| *B05D 1/00* | (2006.01) | |
| *D01D 5/00* | (2006.01) | |
| *B05B 1/14* | (2006.01) | |
| *B82Y 30/00* | (2011.01) | |
| *B05B 5/053* | (2006.01) | |

(52) U.S. Cl.
CPC ............. *B05B 5/0255* (2013.01); *B05B 1/14* (2013.01); *B05B 5/025* (2013.01); *B05B 5/0536* (2013.01); *B05D 1/007* (2013.01); *B82Y 30/00* (2013.01); *D01D 5/0069* (2013.01)

(58) Field of Classification Search
None
See application file for complete search history.

(56) References Cited

U.S. PATENT DOCUMENTS 3,486,302 A 12/1969 Paynter
4,855,604 A 8/1989 Riahi
(Continued)

FOREIGN PATENT DOCUMENTS

WO WO 2002/055990 A2 7/2002
WO WO 2006/009854 A2 1/2006
(Continued)

OTHER PUBLICATIONS

Office Communication dated Aug. 11, 2016 for U.S. Appl. No. 13/918,742.
(Continued)

*Primary Examiner* — Mary Lynn F Theisen
(74) *Attorney, Agent, or Firm* — Wolf, Greenfield & Sacks, P.C.

(57) ABSTRACT

Systems and methods in which the flow of fluid is electrically driven, including electrospinning and electrospraying systems and methods, are generally described.

20 Claims, 33 Drawing Sheets

Related U.S. Application Data

(60) Provisional application No. 61/827,893, filed on May 28, 2013, provisional application No. 61/827,905, filed on May 28, 2013.

(56) References Cited

U.S. PATENT DOCUMENTS

| | | | |
|---|---|---|---|
| 5,279,323 | A | 1/1994 | Grove et al. |
| 5,624,875 | A | 4/1997 | Nakanishi et al. |
| 6,288,390 | B1 | 9/2001 | Siuzdak et al. |
| 6,297,499 | B1 | 10/2001 | Fenn |
| 6,707,035 | B2 | 3/2004 | Hughey et al. |
| 6,768,119 | B2 | 7/2004 | de la Mora et al. |
| 6,867,415 | B2 | 3/2005 | Hughey et al. |
| 7,015,046 | B2 | 3/2006 | Wohlstadter et al. |
| 7,097,781 | B2 | 8/2006 | Asakawa et al. |
| 7,129,513 | B2 | 10/2006 | Zhou et al. |
| 7,199,364 | B2 | 4/2007 | Thakur |
| 7,335,897 | B2 | 2/2008 | Takats et al. |
| 7,397,032 | B2 | 7/2008 | Zona et al. |
| 7,517,479 | B2 | 4/2009 | Bango et al. |
| 7,696,489 | B2 | 4/2010 | Pilz et al. |
| 7,863,581 | B2 | 1/2011 | Lozano et al. |
| 7,932,492 | B2 | 4/2011 | Dammons et al. |
| 8,030,621 | B2 | 10/2011 | Lozano et al. |
| 8,080,930 | B2 | 12/2011 | King et al. |
| 8,084,735 | B2 | 12/2011 | Kertesz et al. |
| 8,198,106 | B2 | 6/2012 | Akinwande et al. |
| 8,207,496 | B2 | 6/2012 | Makarov et al. |
| 8,227,765 | B2 | 7/2012 | Syms |
| 8,272,345 | B2 | 9/2012 | Robertson et al. |
| 8,324,593 | B2 | 12/2012 | Lozano et al. |
| 8,368,295 | B2 | 2/2013 | Wei et al. |
| 8,394,877 | B2 | 3/2013 | Asakawa et al. |
| 8,722,323 | B2 | 5/2014 | Wohlstadter et al. |
| 8,785,881 | B2 | 7/2014 | Lozano et al. |
| 8,791,411 | B2 | 7/2014 | Lozano et al. |
| 8,850,792 | B2 | 10/2014 | Marrese-Reading et al. |
| 9,194,379 | B1 | 11/2015 | Biblarz et al. |
| 9,358,556 | B2 | 6/2016 | Velásquez-García et al. |
| 9,460,884 | B2 | 10/2016 | Hopwood |
| 9,478,403 | B2 | 10/2016 | Lozano et al. |
| 9,669,416 | B2 | 6/2017 | Velásquez-García et al. |
| 2005/0133372 | A1 | 6/2005 | Zhou et al. |
| 2005/0233085 | A1 | 10/2005 | Miller et al. |
| 2005/0269559 | A1 | 12/2005 | Zhou et al. |
| 2005/0281379 | A1 | 12/2005 | Qiu et al. |
| 2005/0287421 | A1 | 12/2005 | Simon et al. |
| 2007/0170056 | A1 | 7/2007 | Arnold et al. |
| 2007/0235647 | A1 | 10/2007 | Zona et al. |
| 2008/0011617 | A1 | 1/2008 | Struthers et al. |
| 2008/0131615 | A1 | 6/2008 | Robertson et al. |
| 2008/0307766 | A1 | 12/2008 | Petras et al. |
| 2009/0032724 | A1 | 2/2009 | Lozano et al. |
| 2009/0072750 | A1 | 3/2009 | Akinwande et al. |
| 2009/0114838 | A1 | 5/2009 | Lozano et al. |
| 2009/0130380 | A1 | 5/2009 | Asakawa et al. |
| 2009/0224679 | A1 | 9/2009 | Pan et al. |
| 2009/0283824 | A1 | 11/2009 | Knight et al. |
| 2009/0309481 | A1 | 12/2009 | Chou et al. |
| 2010/0201251 | A1 | 8/2010 | Park et al. |
| 2010/0209788 | A1 | 8/2010 | Yoon et al. |
| 2010/0284735 | A1 | 11/2010 | Sievers et al. |
| 2010/0289413 | A1 | 11/2010 | Eden et al. |
| 2011/0037102 | A1 | 2/2011 | Tchertchian et al. |
| 2011/0079138 | A1 | 4/2011 | Storrie et al. |
| 2011/0079188 | A1 | 4/2011 | Meintschel et al. |
| 2011/0124116 | A1 | 5/2011 | Wohlstadter et al. |
| 2011/0126929 | A1 | 6/2011 | Velasquez-Garcia et al. |
| 2011/0150765 | A1 | 6/2011 | Boyden et al. |
| 2011/0210265 | A1 | 9/2011 | Lozano et al. |
| 2011/0217544 | A1 | 9/2011 | Young et al. |
| 2011/0284735 | A1 | 11/2011 | Van Berkel et al. |
| 2012/0037595 | A1 | 2/2012 | Asakawa et al. |
| 2012/0045863 | A1 | 2/2012 | Hopwood |
| 2012/0104554 | A1 | 5/2012 | Eden et al. |
| 2012/0119079 | A1 | 5/2012 | Ouyang et al. |
| 2012/0144796 | A1 | 6/2012 | Marrese-Reading et al. |
| 2012/0244291 | A1 | 9/2012 | Bisht et al. |
| 2012/0301981 | A1 | 11/2012 | Ozgur et al. |
| 2013/0098774 | A1 | 4/2013 | Lozano et al. |
| 2013/0113370 | A1 | 5/2013 | Tabib-Azar et al. |
| 2013/0228700 | A1 | 9/2013 | Lozano et al. |
| 2013/0241115 | A1 | 9/2013 | Sharma et al. |
| 2013/0256535 | A1 | 10/2013 | Meijer et al. |
| 2013/0319599 | A1* | 12/2013 | Huang ............... D01D 5/0069 156/150 |
| 2014/0054809 | A1 | 2/2014 | Lozano et al. |
| 2014/0110661 | A1 | 4/2014 | Wang et al. |
| 2014/0284406 | A1 | 9/2014 | Brekenfeld et al. |
| 2014/0292180 | A1 | 10/2014 | Park et al. |
| 2014/0353397 | A1 | 12/2014 | Velásquez-García et al. |
| 2014/0353860 | A1 | 12/2014 | Velásquez-García et al. |
| 2015/0060757 | A1 | 3/2015 | Lee et al. |
| 2015/0061487 | A1 | 3/2015 | Sharifi et al. |
| 2015/0170865 | A1 | 6/2015 | Lozano et al. |
| 2015/0255241 | A1 | 9/2015 | Bonam |
| 2016/0096185 | A1 | 4/2016 | Nobuo et al. |
| 2016/0107178 | A1 | 4/2016 | Velásquez-García et al. |
| 2016/0297549 | A1 | 10/2016 | Lozano et al. |
| 2016/0376150 | A1 | 12/2016 | Lozano et al. |
| 2017/0110284 | A1 | 4/2017 | Lozano et al. |

FOREIGN PATENT DOCUMENTS

| | | | |
|---|---|---|---|
| WO | WO 2007/002170 | A2 | 1/2007 |
| WO | WO 2009/023257 | A1 | 2/2009 |
| WO | WO 2009/039338 | A1 | 3/2009 |
| WO | WO 2009/137583 | A2 | 11/2009 |
| WO | WO 2011/079138 | A2 | 6/2011 |
| WO | WO 2012/078043 | A1 | 6/2012 |
| WO | WO 2013/003795 | A1 | 1/2013 |
| WO | WO 2013/016497 | A2 | 1/2013 |

OTHER PUBLICATIONS

Notice of Allowance dated Jan. 31, 2017 for U.S. Appl. No. 13/918,742.

International Search Report and Written Opinion dated Oct. 9, 2014 for PCT/US2014/039851.

International Preliminary Report on Patentability dated Dec. 10, 2015 for Application No. PCT/US2014/039851.

International Search Report and Written Opinion dated Jun. 17, 2010 for PCT/US2009/042990.

International Preliminary Report on Patentability dated Nov. 18, 2010 for Application No. PCT/US2009/042990.

International Search Report and Written Opinion dated Mar. 21, 2014 for PCT/US2013/057067.

International Preliminary Report on Patentability dated Mar. 12, 2015 for Application No. PCT/US2013/057067.

Office Communication dated Feb. 26, 2016 for U.S. Appl. No. 13/918,742.

Bennett, Spinning a yarn, nano-style—more affordable fibres. Materials World Magazine. The Institute of Materials, Minerals and Mining. Jan. 7, 2013. 2 pages. <www.iom3.org/news/spinning-yarn-nano-style-affordable-fibres> Last accessed Jun. 5, 2013.

Burger et al., Nanofibrous materials and their applications. Annu. Rev. Mater. Res. 2006;36:333-68. doi: 10.1146/annurev.matsci.36.011205.123537.

Carretero et al., Numerical simulation of Taylor cone-jets and colloid thruster plumes. 4th International Conference on Spacecraft Proprulsion, Cagliari, Italy. Jun. 2-4, 2004.

Chang et al., Continuous near-field electrospinning for large area deposition of orderly nanofiber patterns. Appl. Phys. Lett.2008; 93(2):123111. 3 pages. DOI: 10.1063/1.2975834.

Chiu et al., Mass spectrometric analysis of colloid thruster ion emission from selected propellants. Journal of Propulsion and Power. 2005;21(3):416-23.

Clampitt et al., Intense field-emission ion source of liquid metals. J of Vaccum Science and Technology. Nov./Dec. 1975;12 (6):1208.

(56) References Cited

OTHER PUBLICATIONS

Cleaver et al. A 100-Kv ion probe microfabrication system with a tetrode gun. Vacuum Sci and Technol. Nov./Dec. 1981;19(4): 1145-8.
Deitzel et al., Controlled deposition of electrospun poly( ethylene oxide) fibers Polymer No. 2001;42:8163-70.
Despois et al., Permeability of open pore microcellular materials. Acta Materialia. Elsevier, Oxford, GB. Mar. 2005; 53(5): 1381-8.
Doshi et al., Electrospinning process and applications of electrospun fibers. J Electrost. 1995;35:151-60.
Driesel et al., In situ observation of the tip shape of auge liquid alloy ion sources using a high voltage transmission electron microscope. J. Vac. Sci. Technol. B. 1996;14(5):3367-80.
Escher et al. Vacuum ion emission from solid electrolytes: an alternative source for focused ion beams. Applied Physics Letters. 2006;89: 053513-1 and 053513-2. 2 pages.
Fernandez De La Mora, The current emitted by highly conductive Taylor cones. J Fluid Mech. 1994;260:155-84.
Fernandez De La Mora, The fluid dynamics of Taylor cones. Annual Review of Fluid Mechanics. 2007; 39: 217-243. doi:10.1146/annurev.fluid.39.050905.110159.
Gassend et al., A microfabricated planar electrospray array ionic liquid ion source with integrated extractor. J. of Microelectromechanical Systems. Jun. 2009; 18(3):679-94.
Gassend et al., Precision in-plane hand assembly of bulk-microfabricated components for high voltage mems arrays applications. J of Microelectromechanical Systems. Apr. 2009;18(2):332-46.
Gibson et al., Transport properties of porous membranes based on electrospun fibers, Colloids and Surfaces A: Physicochemical and Engineering Aspects, No. 187-188, pp. 469-481 (2001).
Guharay et al., Characteristics of focused beam spots using negative ion beams from a compact surface plasma source and merits for new applications. Journal of Vacuum Science and Technology B. 1998; 16(6): 3370-3.
Guzdar et al., Charging of substrates irradiated by particle beams. Applied Physics Letters. Dec. 1, 1997; 71(22): 3302-4.
Hardesty, Making 'nanospinning' practical. MIT News Office. Nov. 20, 2012; 3 pages. <web.mit.edu/newsoffice/2012/making-nanospinning-practical-1120.html?tmpl=component&print=1> Last accessed May 31, 2013.
He et al., Magnetic and photomagnetic properties of polycrystalline wide-gap semiconductor Cd1-xMnxTe thin films. Journal of Electronic Materials. Feb. 1997;26(2):73-7.
Hill et al., High-throughput ionic liquid electrospray sources based on dense monolithic arrays of emitters with integrated extractor grid and carbon nanotube flow control structures. Technical Digest of the 17th International Conference on Solid-State Sensors Actuators, and Microsystems. Barcelona, Spain. Jun. 16-20, 2013. 2644-7.
Ishino et al., Wicking within forests of micropillars, Europhysics Letters. Sep. 2007; 79:56005. 5 pages. doi: 10.1209/0295-5075/79/56005.
Krpoun et al., Tailoring the hydraulic impedance of out-of-plane micromachined electrospray sources with integratedelectrodes. Appl. Phys. Lett., vol. 94, 2009.
Larriba et al., Monoenergentic source of kilodalton ions from Taylor cones of ionic liquids. Journal of Applied Physics. 2007; 101: 084303-1 to 084303-6.
Larrondo et al., Electrostatic fiber spinning from polymer melts—1. Experimental-observations on fiber formation and properties, J Polym. Sci. B 1No. 9, pp. 909-920 (1981).
Larsen et al., Use of coaxial gas jackets to stabilize Taylor cones of volatile solutions and to induce particle-to-fiber transitions. Adv Mater. 2004;16(2): 166-69.
Lee et al., Developing protective textile materials as barriers to liquid penetration using melt electrospinning, Journal of Applied Polymer Science.2006; 102: 3430-7. DOI 10.1002/app.24258.
Legge et al., 18.086 Final Project: Finite Element Modelling of Ionic Liquid Flow Through Porous Electrospray Emitters. May 14, 2008.
Legge et al., Fabrication and characterization of porous metal emitters for electrospray thrusters. IEPC-2007-145 Proc. 30th International Electric Proulsion Conference, Florence, Italy, Sep. 17-20, 2007.
Legge et al., Electrospray propulsion based on emitters microfabricated in porous metals, J. Propul. Power, vol. 27, pp. 485-494, 2011.
Legge, Fabrication and characterization of porous metal emitters for electrospray applications. Brown University (Mechanical Engineering): Department of Aeronautics and Astronautics. May 18, 2008. 140 pages.
Li et al. The focused-ion-beam-microscope—more than a precision ion milling machine. JOM. 2006; 58 (3): 27-31.
Li et al., Electrospinning of nanofibers: reinventing the wheel? Advanced Materials. 2004;16:1151-70.
Lin et al., Preparation of poly( ether sulfone) nanofibers by gas-jet/electrospinning. Journal of Applied Polymer Science. 2008;107: 909-17. DOI 10.1002/app.26445.
Lozano et al., Electrospray emission from nonwetting flat dielectric surfaces. Journal of Colloid and Interface Science. 2004;276(2): 392-9.
Lozano et al., Energy properties of an EMI-IM ionic liquid ion source. J Phys. D: Appl Phys. 2006;39: 126-34. doi:10.1088/0022-3727/39/1/020.
Lozano et al., Experimental Measurements of Colloid Thurster plumes in the Ion-Droplet Mixed Regime. (AIAA-3814) 38th Joint Propulsion Conference. Indianapolis, Indiana. Jul. 7-10, 2002; 1-6.
Lozano et al., Ionic liquid ion sources: characterization of externally wetted emitters, J. Colloid Interf. Sci. 2005; 282: 415-21.
Lozano et al., Ionic liquid ion sources: suppression of electrochemical reactions using voltage alternation. J. Colloid Interf. Sci. 2004; 280: 149-54.
Lozano et al., On the dynamic response of externally wetted ionic lisquid ion sources. J. Phys. D.: Appl Phys. 2005; 38(14):2371-7.
Lozano et al., Performance characteristics of linear ionic liquid electrospray thruster. IEPC-2005-192. 29th International Electric Propulsion Conference. Princeton University (USA). Oct. 31-Nov. 4, 2005;6pgs.
Lukas et al., Self-organization of jets in electrospinning from free liquid surface: A generalized approach J. Appl. Phys. 2008;103:084309. 7 pgs. doi: 10.1063/1.2907967.
McEwen et al., Electrochemical properties of imidazolium salt electrochemical capacitor applications. J. Electrochecm Soc. 1999;146(5): 1687-95.
Muhle et al., A time-of-flight spectrometer for investigations on liquid metal ion sources. J. Phys. D: Appl Physics.1999;32(2): 161-7.
Paruchuri et al., Splitting of a liquid jet. Phys. Rev. Lett. Mar. 30, 2007; 98:134502. 4 pages.
Petrik et al., Production nozzle-less electrospinning nanofiber technology. MRS Proceedings. 1240 1240-WW03-07. 2009. 12 pgs. doi:10.1557/PROC-1240-WW03-07.
Podenok, Electric field enhancement factors around a metallic, end-capped cylinder. NANO: Brief Reports and Reviews. 2006; 1(1):87-93.
Ponce De Leon et al., Batch-microfabricated arrays of electrospinning emitters for high throughput generation of nanofibers. Technical Digest of the 12th International Workshop on Micro and Nanotechnology for Power Generation and Energy Conversion Applications. Atlanta GA, USA. Dec. 2-5, 2012; 227-30.
Prewett et al., Focused ion beams from liquid metal ion sources. Research Studies Press. 1991; 19-30, 78-101 and 151-74.
Quéré, Wetting and roughness. Annu. Rev. Mater. Res. 2008;38:71-99.
Reneker et al., Electrospinning jets and polymer nanofibers. Polymer. 2008; 49: 2387-2425. doi:10.1016/j.polymer.2008.02.002.
Romero-Sanz et al., Source of heavy molecular ions based on Taylor cones of ionic liquids operating in the pure ion evaporation regime, J. Appl. Phys. 2003; 94: 3599-605.
Scipioni et al., Performance of multicusp plasma ion sources for focused ion beam applications. Journal of Vacuum Science and Technology B. 2000; 18(6). 3194-7.

(56) References Cited

OTHER PUBLICATIONS

Seiwert et al., Coating of a textured solid. J. Fluid Mech. 2011;669: 55-63. doi:10.1017/S0022112010005951.
Smith et al. High brightness inductively coupled plasma source for high current focused ion beam applications. Journal of Vacuum Science and Technology B.2006;24(6): 2902-6.
Srinivasan et al., Structure and morphology of small diameter electrospun aramid fibers. Polymer International. 1995; 36: 195-201.
Srivastava et al., Multi-jet electrospinning of conducting nanofibers from microfluidic manifolds. J Appl. Polymer Sci. 2007; 106: 3171-8.
Suzuki et al., Contrast differences between scanning ion and scanning electron microscope images. Journal Vacuum Science and Technology A. 2004; 22(1): 49-52.
Swanson et al., Emission characteristics of gallium and bismuth liquid metal ion sources. J. Vac. Sci. Technol. Nov./Dec. 1979; 16(6): 1864-9.
Szilagyi et al., Electron and Ion Optics, Plenum Press. 1988. 216-50 and 251-63.
Taylor, Disintegration of water drops in an electric field. Proc. R. Soc. London A.1964;280: 383-397.
Teo et al., Uniform patterned growth of carbon nanotubes without surface carbon, Appl. Phys. Lett. 2001; 79: 1534-1536.
Thavasi et al., Electrospun Nanofibers in Energy and Environmental Applications. Energy Environ. Sci. 1 205-221. (2008).
Theron et al., Multiple jets in electrospinning: experiment and modeling, Polymer. 2005; 46:2889-99. doi:10.1016/j.polymer.2005.01.054.
Tomaszewski et al., Investigation of electrospinning with the use of a multi-jet electrospinning head. Fibres & Textiles in Eastern Europe. Oct./Dec. 2005; 13(4): 22-6.
Tseng et al. Recent developments in nanofabrication using focused ion beams. Small. 2005. 1(10):924-39. DOI: 10.1002/smll.200500113.
Vaseashta, Controlled formation of multiple Taylor cones in electrospinning process, Applied Physics Letters. 2007; 90(9): 093115. 3 pgs.
Velasquez-Garcia et al., A Micro-fabricated linear array of electrospray emitters for thruster applications. J. of Microelectromechanical Systems. Oct. 2006; 15(5): 1260-71.
Velasquez-Garcia et al., A planar array of micro-fabricated electrospray emitters for thruster applications. J. of Microelectromechanical Systems. Oct. 2006; 15(5):1272-1280.
Velasquez-Garcia et al., An application of 3-D MEMS packaging: out-of-plane quadrupole mass filters. Journal of Microelectromechanical Systems. Dec. 2008;17(6):1430-8.
Velasquez-Garcia et al., CNT-based MEMS/NEMS gas ionizers for portable mass spectrometry applications. J. of Microelectromechanical Systems. Jun. 2010; 19 (3):484-93. Doi: 10.1109/JMEMS.2010.2045639.
Velásquez-García et al., Fabrication of large arrays of high-aspect-ratio single-crystal silicon columns with isolated vertically aligned multi-walled carbon nanotube tips. Nanotechnology. Oct. 8, 2008;19(40): 405305. doi:10.1088/0957-4484/19/40/405305.
Velasquez-Garcia et al., Precision hand assembly of MEMS sub-systems using DRIB-patterned deflection Spring Structures: An Example of an Out-of-plane Substrate Assembly.J of Microelectromechanical Systems. Jun. 2007; 16(3):598-612. Doi: 10.1109/JMEMS.2007.892931.
Velásquez-García et al., SLA 3-D Printed Arrays of Miniaturized, Internally Fed, Polymer Electrospray Emitters. J of Microelectromechanical Systems. Sep. 15, 2015. PP(99): 1 page. DOI: 10.1109/JMEMS.2015.2475696.
Xiao et al., Prediction and optimization of liquid propagation in micropillar arrays. Langmuir. Oct. 2010; 26(19):15070-5. doi: 10.1021/la102645u.
Yamashita et al., Characteristics of elastomeric nanofiber membranes produced by electrospinning. Journal of Textile Engineering. Jan. 2007; 53(4):137-42. doi: 10.4188/jte.53.137.
Yang et al., Multiple Jets in Electrospinning Proceedings of the 8th International conference on properties and applications of dielectric materials, pp. 940-943 (2006).
Yang et al., Research Progress in Preparation and Application of Gradient-Porous Metal. Apr. 2008. Powder Metallurgy Industry. 18(7).
Yarin et al., Upward needleless electrospinning of multiple nanofibers. Polymer. Apr. 2004; 45(9): 2977-80. doi: 10.1016/j.polymer.2004.02.066.
Zeng et al., Influence of property gradient on the behavior of cellular materials subjected to impact loading. AIP Conference Proceedings. AIP USA. Feb. 15, 2008;18:9-15.
Zhou et al., Gas flow-assisted alignment of super long electrospun nanofibers. J Nanosci. Nanotechnol. 2007; 7(8): 2667-73.
Zhou et al., Mass production of nanofiber assemblies by electrospinning, Polym Int, 2009; 58: 331-342. DOI 10.1002/pi.2521.
Zong et al., Control of structure, morphology and property in electrospun poly(glycolide-co-lactide) non-woven membranes via post-draw treatments. Polymer. 2003; 44:4959-67.
Office Communication dated Sep. 20, 2017 for U.S. Appl. No. 14/892,847.
[No Author Listed], SEFAR, Common metal mesh configurations, Dutch Weaves. 2009; 2 pages.
Kobayashi et al., Growth of large-diameter (4nm) single-wall carbon nanotubes in the nanospace of mesoporous material SBA-15. Carbon. 2011;49:5173-9.
Velásquez-García et al., SLA 3-D printed arrays of miniaturized, internally fed, polymer electrospray emitters. J of Microelectromechanical Systems. Dec. 2015;24(6):2117-2127, doi: 10.1109/JMEMS.2015.2475696.
U.S. Appl. No. 13/918,742, filed Jun. 14, 2013, Velásquez-García et al.
U.S. Appl. No. 14/892,847, filed Nov. 20, 2015, Velásquez-García et al.
U.S. Appl. No. 14/336,814, filed Jul. 21, 2014, Lozano et al.
U.S. Appl. No. 14/661,855, filed Mar. 18, 2015, Lozano et al.
U.S. Appl. No. 14/681,264, filed Apr. 8, 2015, Lozano et al.
PCT/US2014/039851, dated Oct. 9, 2014, International Search Report and Written Opinion.
PCT/US2014/039851, dated Dec. 10, 2015, International Preliminary Report on Patentability.
PCT/US2009/042990, dated Jun. 17, 2010, International Search Report and Written Opinion.
PCT/US2009/042990, dated Nov. 18, 2010, International Preliminary Report on Patentability.
PCT/US2013/057067, dated Mar. 21, 2014, International Search Report and Written Opinion.
PCT/US2013/057067, dated Mar. 12, 2015, International Preliminary Report on Patentability.

* cited by examiner

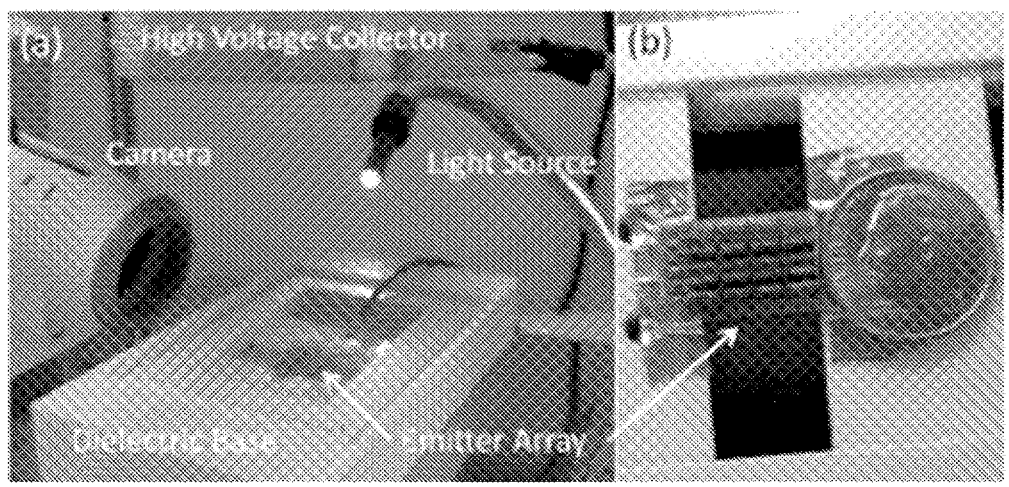
*FIG. 12A*  *FIG. 12B*

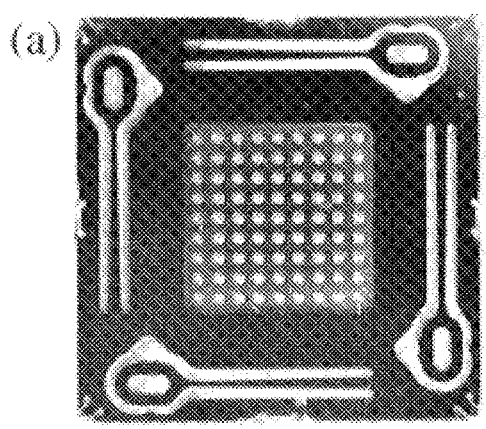 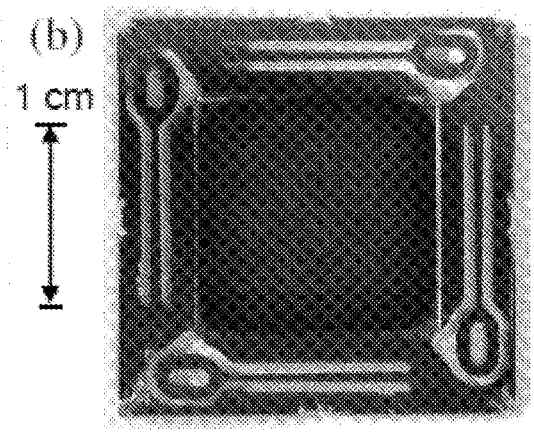
*FIG. 18A*  *FIG. 18B*

ELECTRICALLY-DRIVEN FLUID FLOW AND RELATED SYSTEMS AND METHODS, INCLUDING ELECTROSPINNING AND ELECTROSPRAYING SYSTEMS AND METHODS

RELATED APPLICATIONS

This application is a divisional of U.S. patent application Ser. No. 13/918,759, filed Jun. 14, 2013, and entitled "Electrically-Driven Fluid Flow and Related Systems and Methods, Including Electrospinning and Electrospraying Systems and Methods," which claims priority under 35 U.S.C. § 119(e) to U.S. Provisional Patent Application Ser. No. 61/827,905, filed May 28, 2013, and entitled "High-Throughput Manufacturing of Nanofibers Using Massive Arrays of Electrospinning Emitters" and U.S. Provisional Patent Application Ser. No. 61/827,893, filed May 28, 2013, and entitled "Bio-Inspired Electrospray Emitter Arrays for High-Throughput Ionization of Liquids," each of which applications is incorporated herein by reference in its entirety for all purposes.

GOVERNMENT SPONSORSHIP

This invention was made with government support under Contract No. W31P4Q-11-1-0007 awarded by the Army Contracting Command. The government has certain rights in the invention.

TECHNICAL FIELD

Electrically-driven fluid flow and related systems and methods, including electrospinning and electrospraying systems and methods, are generally described.

BACKGROUND

The ability to use an applied electrical voltage to control fluid flow and/or ionization of a fluid is desirable for a number of applications. Electrospinning is one method by which fluid flow is controlled via the application of an electrical voltage. In many electrospinning systems, a polar, polymer-containing liquid is fed to a tip of an emitting protrusion (e.g., a needle). Application of a sufficiently high voltage results in electrostatic repulsion within components of the liquid. The electrostatic repulsion counteracts the surface tension of the liquid, and a stream of liquid erupts from the surface. If the molecular cohesion of the liquid is sufficiently high, stream breakup does not occur, and a charged liquid jet is formed. Electrospinning systems can be useful, for example, for producing small scale fibers, including nanoscale fibers.

Electrospraying systems offer another example of the use of an electrical voltage to control fluid flow. Generally, in an electrospraying system, a voltage is applied to a liquid (usually free of polymer, in contrast to many electrospinning applications) to produce ions and/or small droplets of charged liquid. In many such electro spraying systems, when the liquid is fed to the tip of the emitting protrusion and the voltage is applied, varicose waves on the surface of the resulting liquid jet lead to the formation of small and highly charged liquid droplets, which are radially dispersed due to Coulomb repulsion.

While electrospinning and electrospraying are known in the art, most systems include a single emitting protrusion, for example, in the form of a single needle. Increasing the throughput of such systems while avoiding degradation in performance has proven to be difficult. Increasing the throughput from a single protrusion has resulted in modest improvement, but has been accompanied by deterioration of the spread in the properties of the emitted liquid (e.g., size, shape, and the like). Increasing throughput by utilizing large arrays with high protrusion density has proven to be challenging.

SUMMARY

Electrically-driven fluid flow, including the electrospinning and electrospraying of fluid, and associated systems and methods are generally described. The subject matter of the present invention involves, in some cases, interrelated products, alternative solutions to a particular problem, and/or a plurality of different uses of one or more systems and/or articles.

Certain embodiments relate to emitters configured for use in electrospraying and/or electrospinning systems. In some embodiments, the emitter comprises an array of protrusions extending from an emitter substrate, at least a portion of the protrusions in the array comprising a plurality of microstructures extending from external surfaces of the protrusions, wherein the microstructures are arranged on the surfaces of the protrusions in an ordered fashion.

In some embodiments, the emitter comprises an emitter substrate; and a protrusion substrate comprising a base that links to the emitter substrate and a plurality of protrusions extending from the base.

Certain embodiments relate to systems. In some embodiments, the system comprises an emitter comprising an array of at least about 9 protrusions extending from an emitter substrate and having an aerial density of at least about 9 protrusions/cm$^2$; and an electrode; wherein, when a voltage is applied across the emitter and the electrode and the emitter is exposed to a fluid, the fluid is essentially simultaneously emitted in substantially continuous streams from at least about 10% of the protrusions in the array toward the electrode.

In some embodiments, methods are described. The method comprises, in some embodiments, applying a voltage across an emitter comprising an array of at least about 9 protrusions extending from an emitter substrate and having an aerial density of at least about 9 protrusions/cm$^2$ and an electrode such that fluid positioned between the emitter and the electrode is essentially simultaneously emitted in substantially continuous streams from at least about 10% of the protrusions in the array toward the electrode.

In certain embodiments, the method comprises etching a fabrication substrate to produce a structure comprising a base, a first set of protrusions extending from the base, and a second set of protrusions extending from external surfaces of the first set of protrusions.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 12A-12B are (A) a perspective view and (B) a top view of an experimental setup of an electrospinning system;

FIG. 18A is an exemplary image of an extractor grid for an array of 81 electrospray emitters within a 1 $cm^2$ area, according to one set of embodiments;

FIG. 18B an exemplary emitter die, according to one set of embodiments, for an array of 81 electrospray emitters within a 1 $cm^2$ area;

DETAILED DESCRIPTION

Figure 1A:
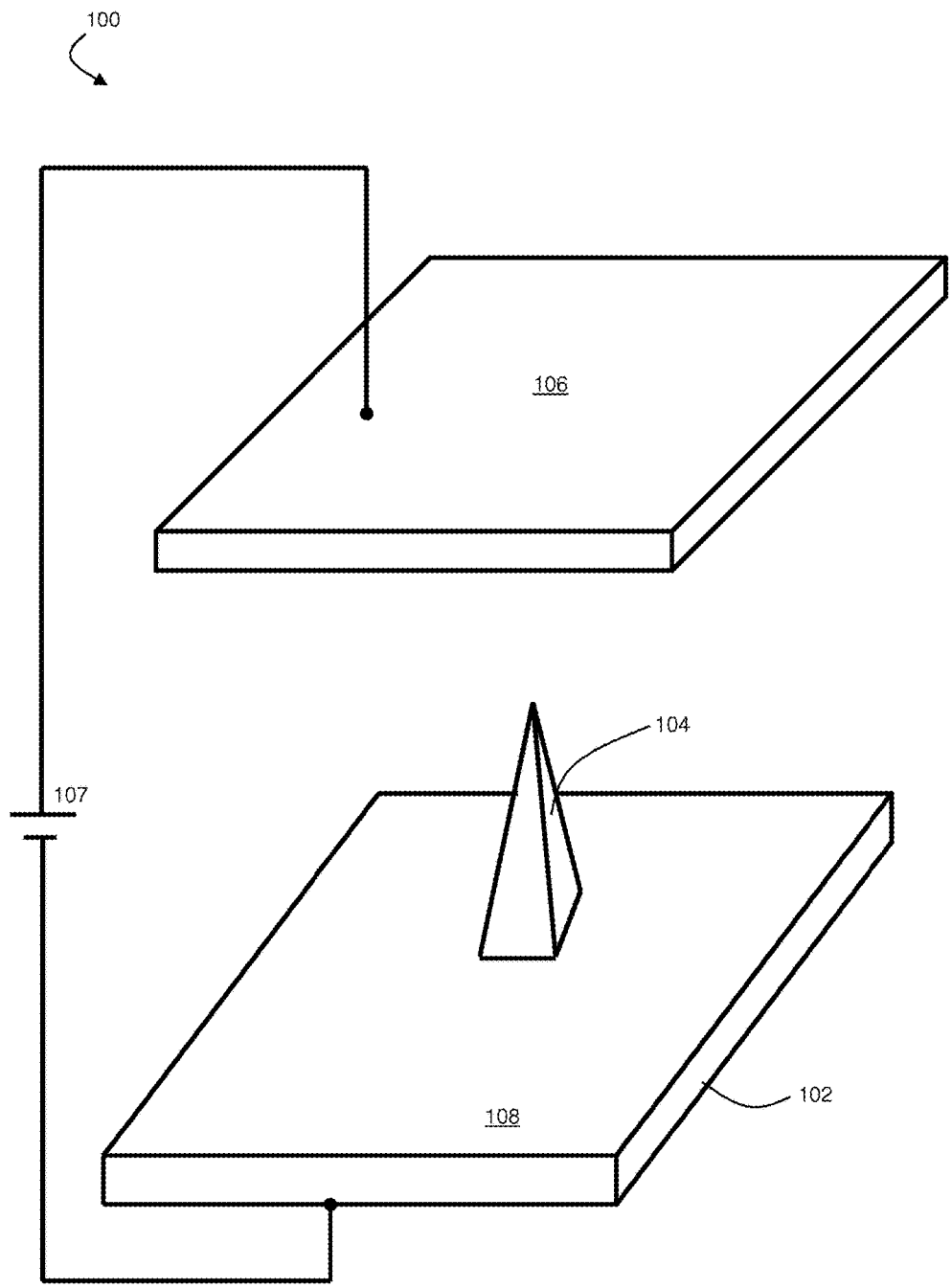
FIG. 1A is an exemplary schematic illustration of a system used to perform electrospray and electrospinning comprising a single emitter protrusion.

Systems and methods in which fluid flow is controlled via the application of an electrical voltage, including electrospinning and electrospraying systems and methods, are generally described. Certain embodiments relate to the discovery that microstructural features (and, in certain instances, nanostructural features) can be arranged on emitter protrusions to achieve desired performance in systems in which electrical voltage is used to drive fluid flow. In certain embodiments, microstructural features are arranged in an ordered fashion such that the flow of fluid to the tips of protrusions occurs at a consistent (and, in certain cases, controlled) rate. Transporting fluid to the tips of the protrusions at a consistent rate can allow one to, for example, produce a consistent discharge of fluid from a plurality of protrusions within an array while maintaining consistent (and, in certain instances, controllable) properties of the emitted fluid (e.g., size, shape, and the like). This can allow one to scale up electrospinning and/or electrospraying systems in which fluid is emitted from the tips of protrusions such that the throughput of fluid through the system is increased while maintaining the ability to produce discharged fluid (e.g., in the form of threads, droplets, ions, and the like) with uniform properties.

According to certain embodiments, the systems and methods described herein can allow one to produce discharged fluid streams and/or droplets with relatively small dimensions simultaneously from multiple protrusions. In certain such embodiments, discharged fluid with relatively small dimensions can be produced while operating the electrospraying or electrospinning system at a relatively low voltage. Without wishing to be bound by any particular theory of operation, the ability to produce discharged fluid having small features at relatively small applied voltages might be explained as follows. In many protrusion-based electrospinning and electrospraying systems, discharge of fluid from the tips of the protrusions is achieved after a threshold voltage is applied across the emitter comprising the protrusions and a counter electrode (also sometimes referred to herein as the "extractor electrode"). It is believed that the application of a voltage above the threshold voltage triggers instability in the fluid at the protrusion tips, producing fluid discharge (e.g., in the form of a substantially continuous stream of the fluid and/or in the form of droplets of the fluid). It is believed that the use of protrusions with smaller tips can allow one to operate at smaller applied voltage. It is also believed that the dimensions of the discharged fluid depend on flow rate (rather than applied voltage), and that slower flow rates generally tend to produce smaller emitted fluid dimensions. Accordingly, restriction of the flow rate to the protrusion tip can allow for the emission of fluid having small features while also allowing for relatively low voltage operation. In some embodiments, the dimensions and layout of the microstructures can be used to control (e.g., restrict) the flow of fluid to the tips of the protrusions in an emitter, which can be useful in producing fibers and droplets with relatively small cross-sectional dimensions. In certain such embodiments, the dimensions and/or arrangement of the microstructures can be selected to produce a desired flow rate to the tips of the protrusions upon the application of a voltage, thereby allowing for the control, in certain instances, of the dimensions of the discharged fluid. In certain such embodiments, the dimensions of the protrusions can also be controlled to allow for low voltage operation, for example, at voltages very close to the fluid instability threshold voltage.

Certain embodiments relate to inventive fabrication techniques that can be used to produce emitters for use in electrospraying and/or electrospinning systems with advantageous properties. For example, certain of the fabrication techniques described herein can allow for the production of emitters comprising a densely-packed array of protrusions. Certain of the fabrication techniques can be used to produce an array of protrusions with consistent sizes and shapes; the use of emitters comprising protrusions with consistent sizes and shapes can be beneficial in systems in which it is desired to produce fluid discharge streams and/or droplets with consistent sizes and shapes. Certain of the fabrication techniques described herein also allow for the production of ordered arrays of microstructures (and, in some cases, nanostructures) on the surfaces of the protrusions without substantially affecting the consistency of the sizes and/or shapes of the protrusions themselves.

FIG. 1A is an exemplary schematic illustration of a conventional system 100 used to perform electrospraying and electrospinning. System 100 comprises an emitter 102 comprising a protrusion 104 and an electrode 106. When a voltage is applied across emitter 102 and electrode 106 (e.g., via voltage source 107, which can be configured to apply a voltage across the emitter and the electrode), fluid fed to protrusion 104 is discharged from the protrusion 104 in the direction of electrode 106. Many conventional electrospraying and electrospinning systems, such as system 100, include a single protrusion from which fluid is emitted. The amount of fluid flux in such systems is generally limited, due to the presence of only a single emitter protrusion.

Figure 1B:
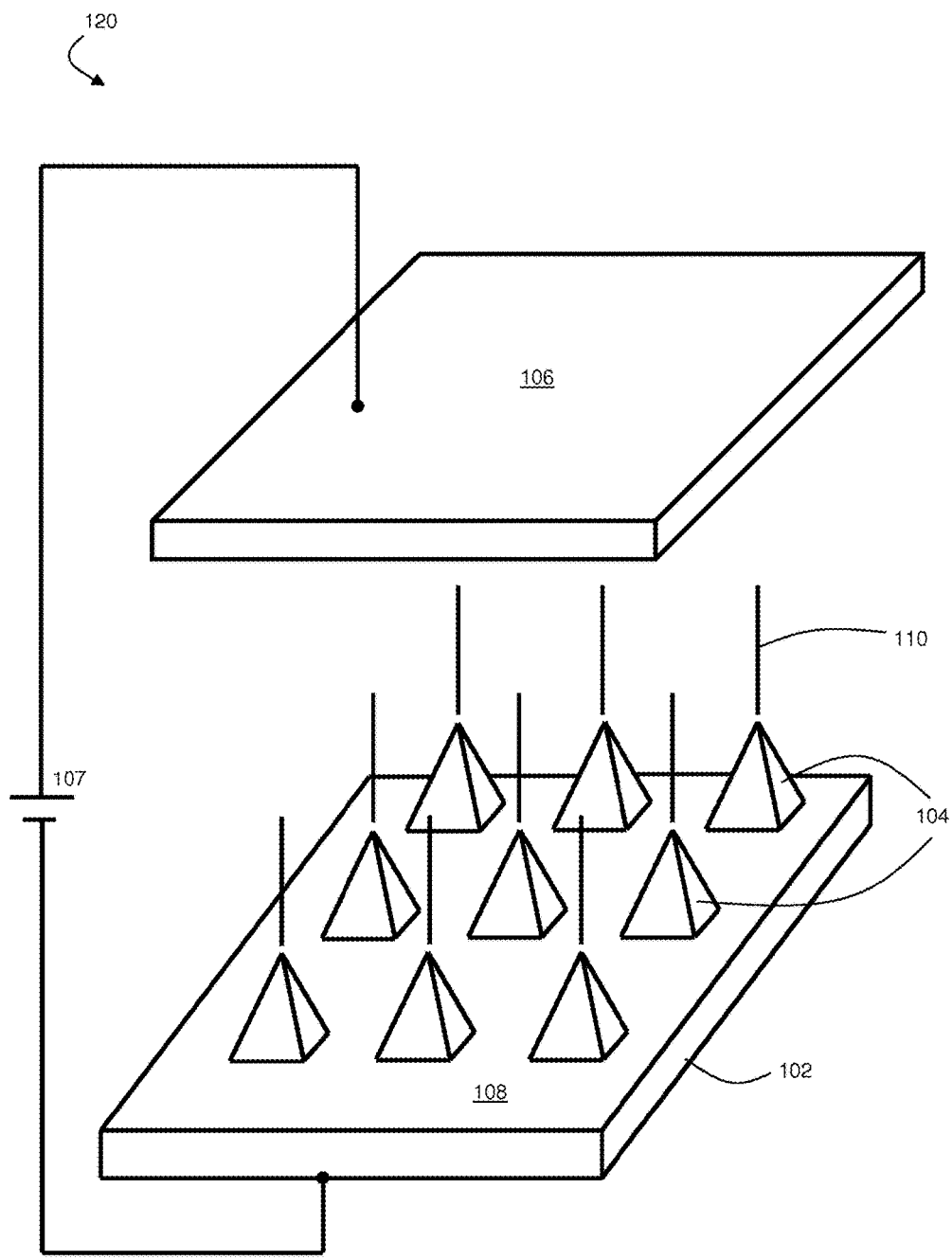
FIG. 1B is an exemplary schematic illustration of a system used to perform electrospray and electrospinning comprising an array of emitter protrusions.

One way to increase the amount of fluid that is discharged in an electrospraying or electrospinning system is to include multiple protrusions from which liquid is emitted. This can allow, in certain embodiments, efficient emission through each protrusion while increasing the throughput by virtue of having a plurality of protrusions operating in parallel. Accordingly, in some embodiments, the electrospraying or electrospinning systems described herein comprise an emitter and an electrode, where the emitter comprises a plurality of protrusions. For example, as illustrated in FIG. 1B, emitter 102 comprises a plurality of protrusions 104. The protrusions can be arranged such that they extend from an emitter substrate. For example, in FIG. 1B, protrusions 104 extend from emitter substrate 108. Specific examples of electrospinning systems and electrospraying systems employing multiple protrusions are described in more detail below.

In some embodiments, the emitter may be exposed to a fluid (e.g., a charged fluid, an ionic liquid, a polymer solution, or any other suitable liquid), and a voltage may be applied across the emitter and the electrode (which is sometimes referred to herein as an extractor electrode). Applying the voltage across the emitter and the electrode may result in the emission of fluid from the tips of at least a portion of the protrusions of the emitter toward the electrode. The fluid that is emitted from the emitter may comprise, for example, ions, solvated ions, droplets, and/or streams (e.g., substantially continuous streams). For example, in certain embodiments in which the system is used to perform electrospraying, the fluid that is emitted from the emitter may be in the form of ions, solvated ions, and/or droplets. In certain embodiments in which the system is used to perform electrospinning, the fluid that is emitted from the emitter may be in the form of a stream (e.g., a substantially continuous stream). Referring to FIG. 1B, for example, electrospraying system 120 may comprise emitter 102, electrode 106, and voltage source 107. In certain embodiments, when emitter 102 is exposed to a fluid, and voltage is applied across emitter 102 and electrode 106, fluid 110 may be emitted from the tips of protrusions 104 toward electrode 106.

In certain embodiments, at least a portion of the protrusions in the electrospinning or electrospraying array comprises a plurality of microstructures extending from external surfaces of the protrusions. In some such embodiments, at least a portion of the microstructures can be nanostructures. Specific examples of microstructures and nanostructures suitable for use in the electrospraying and electrospinning systems described herein are described in more detail below.

The presence of a plurality of microstructures on external surfaces of at least a portion of the protrusions of an emitter array may result in enhanced properties, in certain embodiments. The microstructures may, in some embodiments, be configured to transport fluid from the bases of the protrusions to the tips of the protrusions, where the electric field is generally the strongest, via capillary forces. Without wishing to be bound to a particular theory, the microstructures may be advantageous because they provide a wetting structure on which fluid can spread. Additionally, the microstructures may be advantageous because they provide hydraulic impedance to the fluid flow along the protrusion surface, allowing the flow rate fed to each protrusion to be controlled. The flow rate fed to a protrusion may determine whether the fluid emitted from the protrusion comprises ions, solvated ions, droplets, and/or streams as well as the size and shape of the emitted ions, solvated ions, droplets, and/or streams. In some embodiments, the presence of the microstructures on the surface of the protrusions may allow high emitter current to be achieved at low voltages, while maintaining good array emission uniformity.

In certain embodiments, the microstructures on the exterior surfaces of the emitter protrusions can be arranged in an ordered fashion. The ability to arrange the microstructures in an ordered fashion can be important, in certain embodiments, because it can allow one to control the degree of hydraulic impedance provided by the microstructures which, as mentioned above, can allow one to control the flow rate of the fluid provided to the tips of the emitter protrusions and allow for consistent performance of the electro spraying or electro spinning device.

As used herein, the term "ordered" means not random. Materials (e.g., microstructures) may be ordered, for example, by forming the materials into a predetermined pattern and/or by allowing the material to transform such that is ordered, such as via self-assembly methods.

In certain embodiments, ordered microstructures may be produced over a protrusion, for example, by etching a portion of the material from which the protrusion is produced to form an ordered set of microstructural features. For example, in certain embodiments, the microstructures illustrated in FIG. 2B can be formed by etching the material from which the protrusion is formed, as described in more detail below. The etching can be performed, for example, via microfabrication. In some embodiments, ordered microstructures can be formed over a protrusion by depositing a layer of the microstructures (e.g., a layer of nanostructures, such as carbon nanotubes) over a protrusion and subsequently removing the microstructures from at least one portion of the protrusion. As one example, in certain embodiments, microstructures may be formed (e.g., deposited, grown, or otherwise formed) over the protrusions (e.g., over an intermediate material, such as a catalyst, positioned over the protrusions) and subsequently selectively removed from at least a portion of the external surfaces of the protrusions (e.g., using an etchant and a mask) such that the microstructures are present only over desired portions of the protrusions. In still other embodiments, a catalyst material used to grow the microstructures may be formed over the protrusions and subsequently selectively removed from at least one portion of the external surfaces of the protrusions (e.g., using an etchant and a mask) such that the catalyst material is present only over desired portions of the protrusions. The microstructures can subsequently be grown over the ordered catalyst material to produce an ordered set of microstructures.

In some embodiments, the ordered microstructures may be patterned over protrusions. This can be achieved, for example, by selectively forming the ordered microstructures over a first portion of exposed surfaces of the protrusions while not forming microstructures over a second portion of the exposed surfaces of the protrusions.

In some embodiments, the microstructures may be positioned such that the spacing between the microstructures can be somewhat regular. For example, in certain embodiments, the microstructures can each have a nearest neighbor distance, and the standard deviation of the nearest neighbor distances may be less than about 100%, less than about 50%, less than about 20%, or less than about 10% of the average of the nearest neighbor distances. As used herein, the term "nearest neighbor distance" is understood to be the distance from the center of a structure to the center of the structure's nearest neighbor. In some embodiments, the microstructures may be arranged substantially periodically.

The standard deviation (lower-case sigma) of a plurality of values is given its normal meaning in the art, and can be calculated as:

$$\sigma = \sqrt{\frac{\sum_{i=1}^{n}(V_i - V_{avg})^2}{n-1}} \quad [1]$$

wherein $V_i$ is the $i^{th}$ value among n total values, $V_{avg}$ is the average of the values, and n is the total number of values. The percentage comparisons between the standard deviation and the average of a plurality of values can be obtained by dividing the standard deviation by the average and multiplying by 100%. As an illustrative example, to calculate the percentage standard deviation of a plurality of nearest neighbor distances for 10 microstructures, one would calculate the nearest neighbor distance for each microstructure ($V_1$ through $V_{10}$), calculate $V_{avg}$ as the number average of the nearest neighbor distances, calculate a using these values and Equation 1 (setting n=10), dividing the result by $V_{avg}$, and multiplying by 100%.

A variety of microstructures can be used in association with certain of the embodiments described herein. As used herein, the term "microstructure" refers to any structure having at least one cross-sectional dimension, as measured between two opposed boundaries of the nanostructure, of less than about 1 millimeter. In some embodiments, the microstructures comprise nanostructures. As used herein, the term "nanostructure" refers to any structure having at least one cross-sectional dimension, as measured between two opposed boundaries of the nanostructure, of less than about 1 micron. A variety of types of suitable microstructures and nanostructures are described in more detail below.

In certain embodiments, at least a portion of (e.g., at least about 10% of, at least about 50% of, at least about 75% of, at least about 90% of, at least about 99% of, or substantially all of) the protrusions may be configured, in certain embodiments, such that a significant portion of (e.g., at least about 10% of, at least about 50% of, at least about 75% of, at least about 90% of, at least about 99% of, or substantially all of) the fluid expelled from the protrusions during operation of the system is externally surface directed from the protrusions toward the electrode. Generally, fluid is externally surface directed from a protrusion when the fluid travels along the external surface of the protrusion. Such protrusions can be said to be "externally fed." The use of externally fed protrusions can be advantageous, in some embodiments, because clogging of passageways within the protrusions—which might be observed in internally fed protrusions, such as nozzles—can be avoided. In some embodiments, the externally fed protrusions do not contain internal fluid passageways. Generally, external fluid passageways are those that are open to the external environment along their lengths, while internal passageways are isolated from the external environment along their lengths. In some embodiments, the externally fed protrusions are non-porous.

In some embodiments, the protrusions may be substantially uniform in shape. In some cases, the protrusions may be substantially uniform in size. In some cases, the standard deviation of the maximum cross-sectional dimensions of the protrusions may be less than about 100%, less than about 50%, less than about 20%, less than about 10%, less than about 5%, or less than about 1% of the average maximum cross-sectional dimensions of the protrusions. As used herein, the "maximum cross-sectional dimension" refers to the largest distance between two opposed boundaries of an individual structure that may be measured. In certain cases, the standard deviation of the volumes of the protrusions may be less than about 100%, less than about 50%, less than about 20%, less than about 10%, less than about 5%, or less than about 1% of the average volume of the protrusions. In cases in which the protrusion is an integral part of the emitter substrate from which it extends, the lower boundary of the protrusion (used to calculate the volume of the protrusion) corresponds to a hypothetical extension of the external surface of the substrate on which the protrusion is positioned. One advantage of using protrusions that are similar in size and shape, in certain instances, is that flow can be more easily controlled. This can result in the formation of continuous threads (for electrospinning systems) and/or droplets (for electrospraying systems) that are more uniform in size and shape.

In some embodiments, the protrusions may have tips with relatively sharp tips. The use of protrusions having sharp tips may, in certain embodiments, enhance the magnitude of the electric field near the protrusion tip, which can aid in creating instability in the fluid and, in turn, lead to discharge of the fluid from the protrusion tip. In some embodiments, at least a portion (e.g., at least about 50%, at least about 75%, at least about 90%, or at least about 99%) of the protrusions have a tip comprising a radius of curvature of less than 5 about microns, less than about 1 micron, less than about 500 nm, less than about 100 nm, less than about 50 nm, or less than about 10 nm. In certain cases, the standard deviation of the radii of curvature of the protrusion tips may be less than about 100%, less than about 50%, less than about 20%, less than about 10%, less than about 5%, or less than about 1% of the average of the radii of curvature of the protrusion tips.

In certain embodiments, the emitter protrusions are arranged in an array. The array may, in some embodiments, comprise at least about 9 protrusions, at least about 10 protrusions, at least about 20 protrusions, at least about 50 protrusions, at least about 100 protrusions, at least about 1,000 protrusions (and/or, in certain embodiments, at least about 5,000 protrusions, at least about 10,000 protrusions, or more). The protrusions within the array may be arranged randomly or according to a pattern. In some embodiments, the protrusions within the array can be ordered in a substantially periodic pattern. In certain embodiments, the protrusions are arranged in an array such that the array extends in at least two orthogonal directions. Such arrays may be substantially planar or substantially non-planar (e.g., curved). In some embodiments, the protrusions may be perpendicular to the emitter substrate to within about 10°, within about 5°, or within about 1°.

The emitters described herein can be formed of a variety of suitable materials. In some embodiments, the emitter substrate and the array of protrusions extending from the emitter substrate can be formed of the same material. In other embodiments, the emitter substrate and the array of protrusions are formed of different materials.

In some embodiments, the emitter itself can be capable of transporting current, and can therefore itself be an electrode. In certain embodiments, the emitter can be fabricated from a material that is only slightly electronically conductive (or substantially not electronically conductive). In some such embodiments, transport of the electrosprayed fluid toward the collector electrode can be achieved by applying an electrical voltage between the fluid and the collector electrode.

In some embodiments, at least a portion of the emitter substrate and/or the protrusions may be formed of a semiconductor. Non-limiting examples of suitable semiconductor materials include silicon, germanium, silicon carbide, and/or III-V compounds (such as GaN, GaAs, GaP, and/or InP). In certain cases, at least a portion of the emitter substrate and/or the protrusions may comprise a dielectric material. The emitter could also be fabricated, in certain embodiments, from a metal.

Figure 2A:
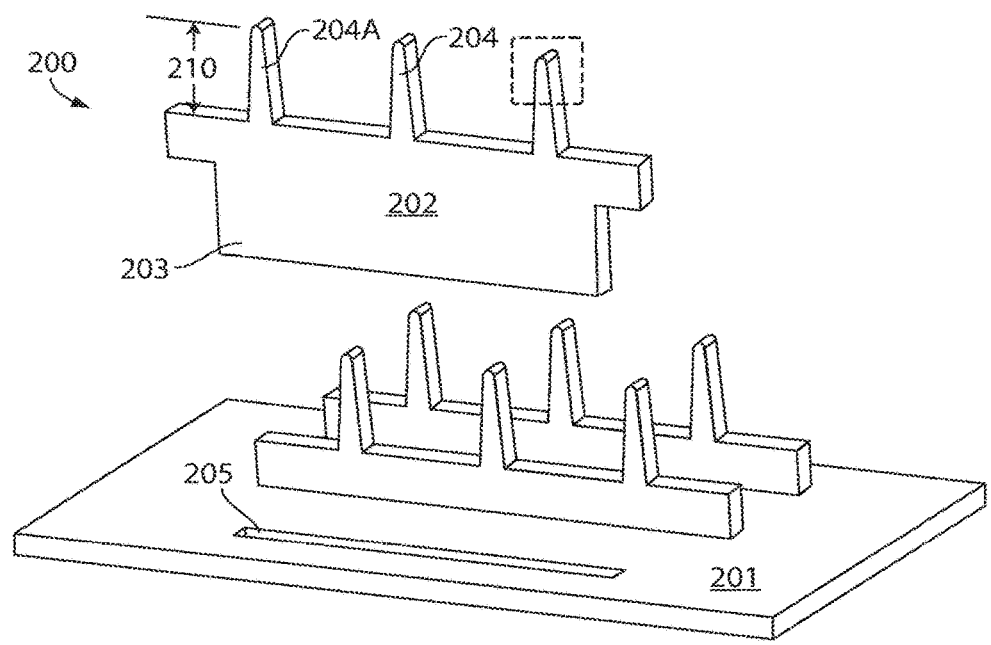
FIG. 2A is a perspective-view schematic illustration of an emitter comprising an array of protrusions, according to certain embodiments.

Certain embodiments relate to electrospinning systems and emitters that can be used in electrospinning systems. FIG. 2A is an exemplary schematic illustration of emitter 200, which can be used in certain of the systems described herein. While emitter 200 is described primarily for use in systems in which electrospinning is performed, it should be understood that emitter 200 could also be used in systems in which electrospraying is performed. In FIG. 2, emitter 200 comprises emitter substrate 201. Emitter 200 also comprises protrusion substrate 202 comprising base 203 and a plurality of protrusions 204 extending from base 203.

Generally, the term "emitter substrate" is used to describe a substrate that supports the protrusions from which fluid is emitted in the electrospinning and electrospraying devices described herein. In certain embodiments (including certain of the embodiments described below with respect to FIG. 6A) the protrusions can be in direct contact with the emitter substrate. In other embodiments, including the embodiment illustrated in FIG. 2A, the protrusions and emitter substrate are in indirect contact (e.g., via protrusion substrate base 203).

In certain embodiments, base 203 links to emitter substrate 201. For example, the emitter substrate may comprise a linking surface area and the protrusion substrate base may comprise a linking surface area configured to fasten to the linking surface area of the emitter substrate. The linking surface area of the emitter substrate and/or the protrusion substrate may correspond to, for example, an indentation into which a portion of the other of the base and the protrusion substrate can be positioned. For example, as illustrated in FIG. 2A, emitter substrate 201 comprises an indentation 205 into which protrusion substrate base 203 can be fitted. In other embodiments, the protrusion substrate base 203 can comprise an indentation into which a portion of the emitter substrate can be fitted. In some embodiments, the base of the protrusion substrate and the emitter substrate are linked via a tongue and groove fitting.

In some embodiments, the emitters described herein comprise a plurality of protrusion substrate bases linked to the emitter substrate. For example, as illustrated in FIG. 2A, emitter 200 comprises three protrusion substrates. In other embodiments, two, four, five, or more protrusion substrates can be linked to an emitter substrate. The protrusion substrates in FIG. 2A each include three protrusions to form a 3 by 3 array of protrusions. In other embodiments, the protrusion substrates comprise two, four, five, or more protrusions, and can be arranged to form an array including any desired number of protrusions. In some embodiments, the longitudinal axis of at least some of the protrusions is substantially perpendicular to the emitter substrate.

In some embodiments, the protrusion substrate may be formed of a semiconductor. Non-limiting examples of suitable semiconductor materials include silicon, germanium, silicon carbide, and/or III-V compounds (such as GaN, GaAs, GaP, and/or InP). In some cases, at least a portion of the protrusion substrate may comprise a dielectric material or a metal. The protrusion substrate may, in certain embodiments, be microfabricated.

In some cases, the protrusions extending from the protrusion substrate can be relatively narrow. The use of narrow protrusions can allow one to arrange a relatively large number of protrusions within a relatively small area, which can be useful in scaling up the electrospinning system. In some embodiments, at least a portion of (e.g., at least about 50% of, at least about 75% of, at least about 90% of, at least about 99% of, or substantially all of) the protrusions extending from the protrusion substrate have maximum cross-sectional widths (measured perpendicular to the longitudinal axes of the protrusions) of less than about 10 millimeters. In some such embodiments, at least a portion of (e.g., at least about 50% of, at least about 75% of, at least about 90% of, at least about 99% of, or substantially all of) the protrusions extending from the protrusion substrate have maximum cross-sectional widths (measured perpendicular to the longitudinal axes of the protrusions) of at least about 100 microns.

In certain embodiments, the protrusions may be relatively tall. Generally, the height of a protrusion corresponds to the distance between the portion of the protrusion in contact with the protrusion substrate base and the tip of the protrusion, and is measured parallel to the longitudinal axis of the protrusion. For example, in FIG. 2A, the height of protrusion 204A corresponds to dimension 210. Taller protrusions may be more effective at anchoring emission jets to emitter tips. Accordingly, in certain embodiments, at least a portion of (e.g., at least about 50% of, at least about 75% of, at least about 90% of, at least about 99% of, or substantially all of) the protrusions extending from the protrusion substrate have a height of at least about 50 microns, at least about 100 microns, at least about 1 millimeter, at least about 2 millimeters, or at least about 5 millimeters (and/or, in certain embodiments, up to about 50 millimeters, or taller).

In some embodiments, a sharp tip may provide electric field enhancement, allowing the fluid to ionize at low voltage. In some embodiments, flow rate to emitter tip may be maximized by optimizing microstructure height and microstructure diameter-to-pitch.

In some embodiments, a relatively large number of protrusions can be arranged within a relatively small area, which can be useful in scaling up the electrospinning system. In certain embodiments, the array includes at least about 9 protrusions, at least about 10 protrusions, at least about 20 protrusions, at least about 50 protrusions, at least about 100 protrusions, at least about 1,000 protrusions, at least about 5,000 protrusions, at least about 10,000 protrusions, or at least about 100,000 protrusions. In certain embodiments, the array includes at least about 9 protrusions/cm$^2$, at least about 10 protrusions/cm$^2$, at least about 100 protrusions/cm$^2$, at least about 1,000 protrusions/cm$^2$, or at least about 10,000 protrusions/cm$^2$ (and/or, in certain embodiments, up to about 100,000 protrusions/cm$^2$, or more).

In some embodiments of the invention relating to electrospinning, a plurality of microstructures may be present on external surfaces of at least a portion of the protrusions. A variety of microstructures can be used in association with certain of the embodiments described herein. As used herein, the term "microstructure" refers to any structure having at least one cross-sectional dimension, as measured between two opposed boundaries of the microstructure, of less than about 1 mm. In some embodiments, at least a portion of the microstructures may have at least one cross-sectional dimension of less than about 500 microns, less than about 100 microns, or less than about 10 microns. In some embodiments, the microstructures can have a minimum cross-sectional dimension of at least about 1 micron.

In certain embodiments, the microstructures can be elongated microstructures. For example, in some embodiments, the microstructures can have aspect ratios greater than about 10, greater than about 100, greater than about 1,000, or greater than about 10,000 (and/or up to 100,000:1, up to 1,000,000:1, or greater).

In some embodiments, a protrusion may contain a relatively large number of nanostructures. For example, a protrusion may contain at least about 100, at least about 1,000, at least about 10,000, or at least about 100,000, or more nanostructures.

Figure 2B:
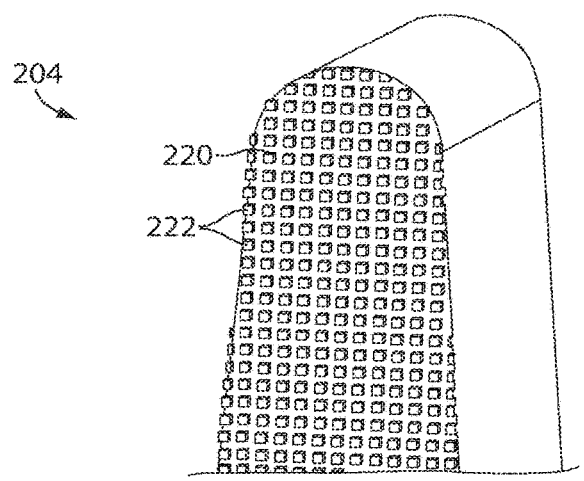
FIG. 2B is, according to some embodiments, a perspective-view schematic illustration of a plurality of microstructures on the external surface of a protrusion.

FIG. 2B is an exemplary perspective view schematic illustration of a portion of the external surface of a protrusion 204 of FIG. 2A. In FIG. 2B, surface 220 of protrusion 204 includes a plurality of microstructures 222. Surface 220 of protrusion 204 in FIG. 2B includes a plurality of micropillars arranged in an array. The invention is not limited to such microstructures, however, and in other embodiments, the microstructures could correspond to microtubes, microfibers, microwires, microwhiskers, microchannels, or any other suitable microstructures. The microstructures may, in some cases, comprise hexagonally-packed micropillars. In some embodiments, microstructures may comprise nano structures.

In some cases, a layer of material may be positioned over the microstructures. For example, in some embodiments, a coating (e.g., a substantially conformal coating) may be positioned over the microstructures. Non-limiting examples of suitable materials for use in layers positioned over the microstructures (e.g., coatings) include silicon carbide, nitride, oxide, or polysilicon. In certain embodiments, the coating may affect spreading behavior. For example, different behaviors of spreading, such as Cassie-Baxter, Wenzel, and hemi-wicking may be obtained by varying microstructure geometry and surface coating. In certain embodiments, the coating may contribute to fluid replenishment rate and may be advantageous in allowing steady operation of the emitters.

Figure 3:
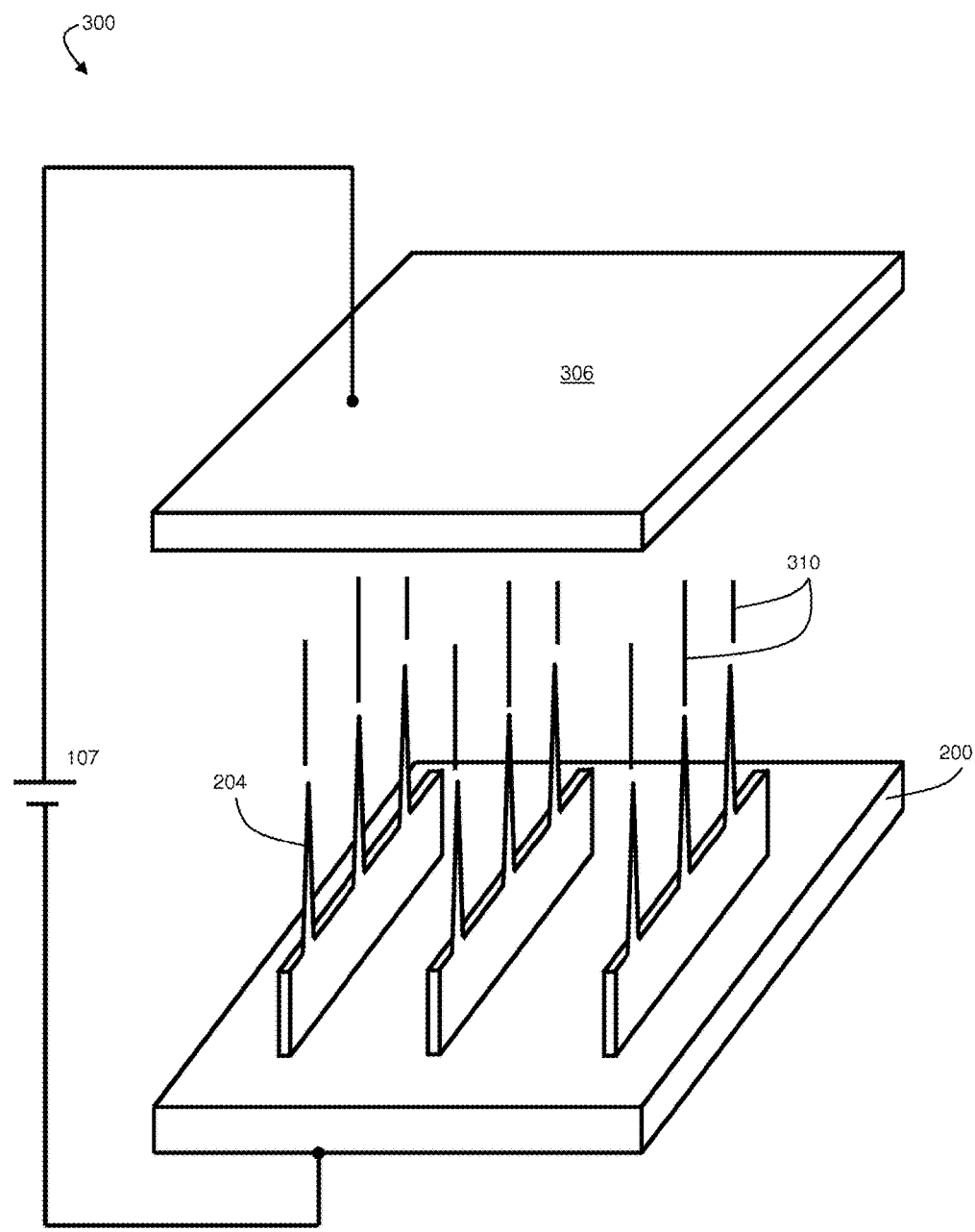
FIG. 3 is an exemplary perspective view schematic illustration of a system for performing electrospinning and/or electrospraying, according to certain embodiments.

Some embodiments relate to methods of performing electrospinning using certain of the emitter and systems described herein. FIG. 3 is a perspective view schematic illustration of a system 300 in which emitter 200 of FIG. 2A is used to perform an electrospinning operation. In some embodiments, the electrospinning method comprises exposing an emitter to a fluid and applying voltage across the emitter and an electrode. Referring to FIG. 3, for example, system 300 comprises emitter 200 (which can correspond to, for example, emitter 200 of FIG. 2A), electrode 306, and voltage source 107. In certain embodiments, emitter 200 is exposed to a fluid, and voltage is applied across emitter 200 and electrode 306. In some embodiments, the voltage is applied such that fluid positioned between the emitter and the electrode is emitted in substantially continuous streams from at least some of the protrusions in the emitter toward the second electrode. For example, referring to FIG. 3, in some embodiments, when voltage source 107 is used to apply a voltage between emitter 200 and electrode 306, fluid streams 310 may be emitted from the tips of protrusions 204 toward electrode 306.

In some embodiments, fluid may be emitted from a relatively large percentage of the protrusions of the emitter. In some such embodiments, the fluid is emitted substantially simultaneously from a relatively large percentage of the protrusions of the emitter. Not wishing to be bound by any particular theory, it is believed that the ability to tailor the shape, size, and packing density of the microstructures on the external surfaces of the protrusions can allow one to control the flow of fluid from the bases of the protrusions to the tips of the protrusions such that stable fluid flow can be achieved simultaneously from multiple (and, in certain cases, all) protrusions simultaneously. In some embodiments, fluid may be essentially simultaneously emitted from at least about 10%, at least about 20%, at least about 30%, at least about 40%, at least about 50%, at least about 60%, at least about 70%, at least about 80%, at least about 90%, at least about 99%, or about 100% of the protrusions. In some embodiments, fluid may be emitted in a substantially continuous stream from at least about 10%, at least about 20%, at least about 30%, at least about 40%, at least about 50%, at least about 60%, at least about 70%, at least about 80%, at least about 90%, or about 100% of the protrusions. In some embodiments, fluid may be emitted substantially simultaneously in substantially continuous streams from at least about 10%, at least about 20%, at least about 30%, at least about 40%, at least about 50%, at least about 60%, at least about 70%, at least about 80%, at least about 90%, or about 100% of the protrusions.

In some embodiments, fluid can be emitted in a substantially continuous stream from a relatively large number of protrusions in a stable and controlled manner. In some embodiments, fluid may be emitted in a substantially continuous stream simultaneously from at least about 10%, at least about 20%, at least about 30%, at least about 40%, at least about 50%, at least about 60%, at least about 70%, at least about 80%, at least about 90%, or about 100% of the protrusions for a continuous period of at least about 30 seconds, a period of at least about 1 minute, at least about 5 minutes, at least about 1 hour, or at least about 1 day (and/or, in certain embodiments, up to 1 month, up to 1 year, or substantially indefinitely). In some embodiments, fluid may be emitted in a direction that is substantially perpendicular to the emitter substrate. In some embodiments, fluid may be emitted in a substantially continuous stream in a direction that is substantially perpendicular to the emitter substrate. In certain cases, fluid may be emitted in a direction that is substantially parallel to the longitudinal axes of the protrusions. In some embodiments, fluid may be emitted in a substantially continuous stream from at least about 10%, at least about 20%, at least about 30%, at least about 40%, at least about 50%, at least about 60%, at least about 70%, at least about 80%, at least about 90%, or about 100% of the protrusions in a direction that is substantially perpendicular to the emitter substrate. In certain embodiments, fluid may be emitted in a substantially continuous stream from at least about 10%, at least about 20%, at least about 30%, at least about 40%, at least about 50%, at least about 60%, at least about 70%, at least about 80%, at least about 90%, or about 100% of the protrusions in a direction that is substantially parallel to the longitudinal axes of the protrusions.

In some embodiments, the emitters described herein can be used to produce emissions of fluid in a substantially continuous stream with relatively small cross-sectional dimensions. Not wishing to be bound by any particular theory, it is believed that the ability to tailor the shape, size, and packing density of the microstructures on the external surfaces of the protrusions can allow one to control the flow of fluid from the bases of the protrusions to the tips of the protrusions such that fluid can be emitted in very thin streams. In some embodiments, substantially continuous streams having maximum cross-sectional diameters of less than about 1 micron, less than about 500 nm, less than about 200 nm, less than about 100 nm, less than about 50 nm, or less than about 10 nm (and/or, in certain embodiments, down to about 1 nm or less) can be emitted from at least about 10%, at least about 20%, at least about 30%, at least about 40%, at least about 50%, at least about 60%, at least about 70%, at least about 80%, at least about 90%, or about 100% of the protrusions (in some embodiments, simultaneously). The thin emitted streams may also have relatively consistent sizes. In certain embodiments, the standard deviation of the cross-sectional diameters of the continuous streams may be less than about 100%, less than about 50%, less than about 20%, less than about 10%, or less than about 1% of the average of the cross-sectional diameters of the continuous streams. Nanofibers produced using the electrospinning systems described herein may have any of the properties described herein of the streams of fluid emitted from the protrusions.

In some embodiments, fluid comprising a polymer may be emitted from the protrusions. Any suitable fluid can be used for electrospinning. In some embodiments, the fluid comprises a liquid. In some embodiments, the liquid comprises a polymer suspension or solution. Polymer suspensions or solutions can be used, for example, when production of nanofibers is desired. In one non-limiting illustration of how nanofibers can be formed using such fluid, a polymer may be suspended in a carrier fluid to form a polymer suspension. The polymer suspension may be used as the fluid in the electrospinning system such that the polymer suspension is emitted from the protrusions of the emitter. Upon being emitted from the emitter, the carrier fluid of the polymer suspension may evaporate, leaving behind a hardened polymer. In some such embodiments, the polymer may polymerize and/or cross-link before, during, and/or after the carrier fluid leaves the polymer suspension. Any suitable polymer can be used in the electrospinning polymer suspensions and solutions described herein. Non-limiting examples of suitable polymers include polyethylene oxide, polyacrylonitrile, polyethylene terephthalate, polystyrene, polyvinyl chloride, Nylon-6, polyvinyl alcohol, Kevlar, polyvinylidene fluoride, polybenzimidazole, polyurethanes, polycarbonates, polysulfones, and polyvinyl phenol. In some embodiments, the polymer within the polymer suspension or polymer solution may have a relatively high molecular weight. For example, in some embodiments, the polymer within the polymer suspension or polymer solution may have a molecular weight of more than about 10,000 g/mol, more than about 100,000 g/mol, more than about 200,000 g/mol, or more than about 500,000 g/mol (and/or, in certain embodiments, up to about 1,000,000 g/mol, or higher).

In some embodiments, the fluid used in the electrospinning system may be polar.

One advantage of the electrospinning systems and methods described herein is that they can be used to controllably emit fluids having relatively high viscosities from a plurality of emitter protrusions simultaneously. Not wishing to be bound by any theory, it is believed that the use of protrusions with relatively large heights and the ability to tailor the layout of the microstructures can assist in the emission of relatively viscous fluids. In certain embodiments, the viscosity of the fluid used in the electrospinning system at 25° C. can be at least about 1 Pa-s, at least about 10 Pa-s, at least about 50 Pa-s, at least about 100 Pa-s, or at least about 1,000 Pa-s (and/or, in certain embodiments, up to about 10,000 Pa-s, or greater).

The electrospinning systems described herein can be operated at relatively low voltages, in certain embodiments. Some embodiments may comprise a voltage source configured to apply voltage across the emitter and the electrode. In some embodiments, the voltage applied between the emitter and the electrode of the electrospinning system may be less than about 100 kV, less than about 50 kV, less than about 20 kV, less than about 10 kV, less than about 5 kV, less than about 2.5 kV, less than about 1 kV, or less than about 500 V (and/or, in certain embodiments, as little as about 100 V, or less) while fluid discharge having any of the properties described herein is generated. In some embodiments, when any of the above voltages are applied across the emitter and the electrode, fluid may be essentially simultaneously emitted from at least about 10%, at least about 20%, at least about 30%, at least about 40%, at least about 50%, at least about 60%, at least about 70%, at least about 80%, at least about 90%, or about 100% of the protrusions. In certain embodiments, during operation of the electrospinning system, the current per protrusion tip may be greater than about 1 microamp, greater than about 3 microamps, or greater than about 5 microamps (and/or, in certain embodiments, up to about 10 microamps, or more).

In some embodiments, the flow rate of the fluid at a plurality of protrusions is at least about $5\times10^{-13}$ m$^3$/s per protrusion, at least about $5\times10^{-11}$ m$^3$/s per protrusion, or at least about $5\times10^{-9}$ m$^3$/s per protrusion (and/or, in certain embodiments, up to about $5\times10^{-7}$ m$^3$/s per protrusion, or greater).

Methods of fabricating emitters configured for use in, for example, electrospinning systems are also provided herein. FIGS. 4A-4I are a series of cross-sectional schematic diagrams outlining an exemplary process for fabricating an emitter (e.g., for use in an electrospinning system), such as emitter 200 illustrated in FIG. 2A. In some embodiments, the method comprises etching a fabrication substrate to produce a structure comprising a base, a first set of protrusions extending from the base, and a second set of protrusions extending from external surfaces of the first protrusions. In some embodiments, the first set of protrusions corresponds to the emitter protrusions (e.g., protrusions 204 in FIG. 2A). In certain embodiments, the second set of protrusions comprises the microstructural features formed on the external surfaces of the emitter protrusions (e.g., microstructural features 222 in FIG. 2B). In some embodiments, etching the fabrication substrate may comprise performing reactive ion etching. In certain cases, etching the fabrication substrate may comprise performing deep reactive ion etching.

In some embodiments, the method may comprise first etching the fabrication substrate to produce the second set of protrusions (e.g., the microstructural features), and subsequently etching the fabrication substrate to produce the structure comprising the base and the first set of protrusions (e.g., the emitter protrusions) extending from the base such that the first set of protrusions includes the second set of protrusions extending from the external surfaces of the first set of protrusions. In other embodiments, the method may comprise first etching the fabrication substrate to produce the structure comprising the base and the first set of protrusions extending from the base, and subsequently etching the structure comprising the base and the first set of protrusions to produce a second set of protrusions extending from the external surfaces of the first set of protrusions. For example, the structure comprising the base and the first set of protrusions can be etched and released from the fabrication substrate (e.g., while held in place by a backing substrate attached to the fabrication substrate). Subsequently, the released structures comprising the base and the first set of protrusions can be etched to produce the microstructures. In certain embodiments, including the embodiment illustrated below in FIGS. 4A-4M, the first and second sets of protrusions can be etched at the same time.

In some embodiments, the first and second etching steps may be performed using the same type of etching procedure. For example, the first and second etching steps may be performed using reactive ion etching (e.g., deep reactive ion etching). In some embodiments, the first and second etching steps may be performed using different types of etching procedures.

Figure 4A:
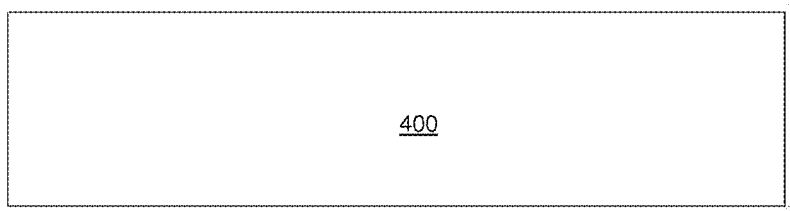
FIGS. 4A-4M are cross-sectional schematic diagrams illustrating a process for fabricating a protrusion substrate comprising a plurality of microstructures, according to one set of embodiments.
Figure 4B:
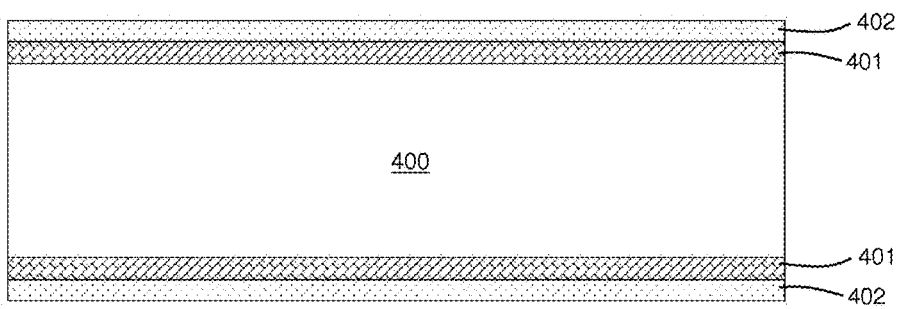
Figure 4C:
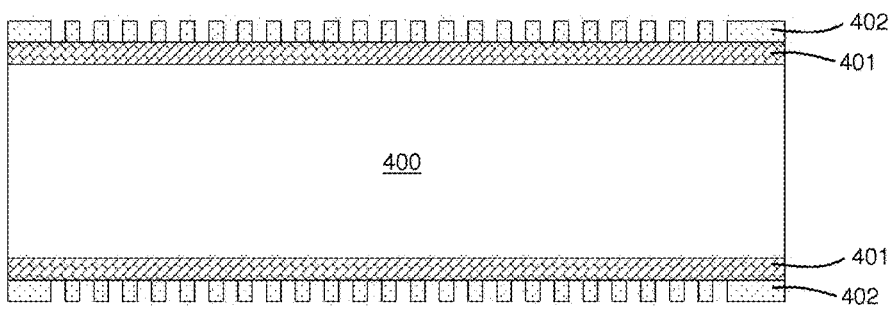
Figure 4D:
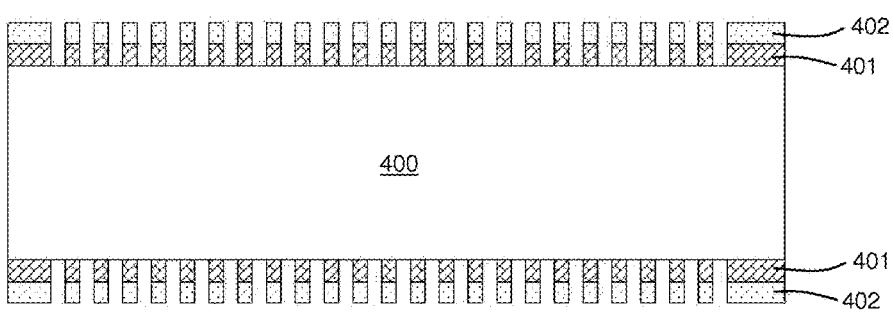
Figure 4E:
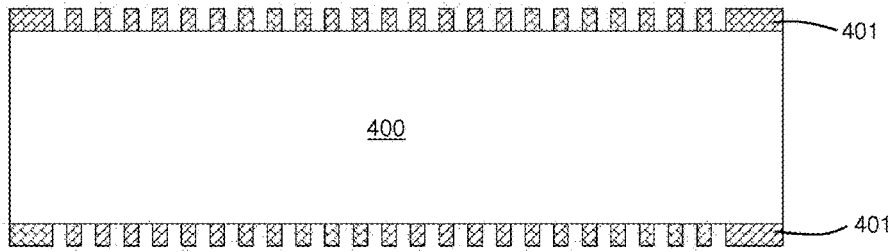
Figure 4F:
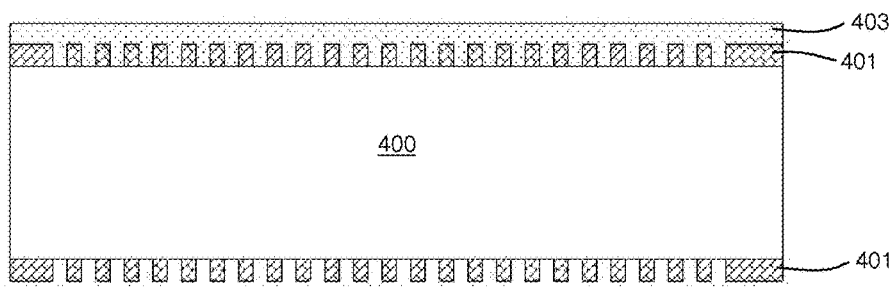
Figure 4G:
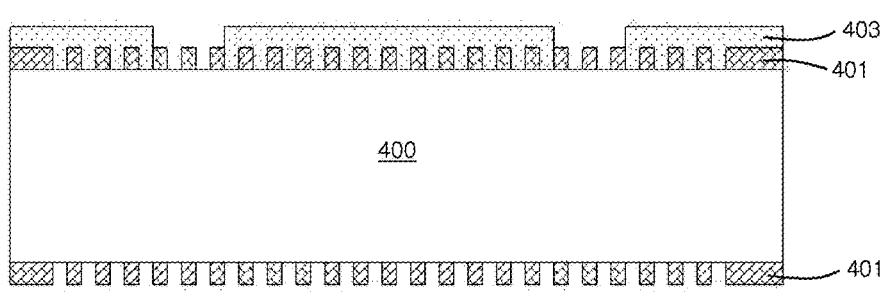
Figure 4H:
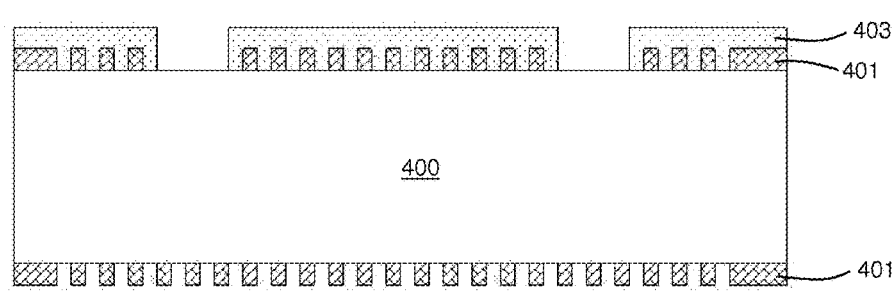

FIGS. 4A-4M are cross-sectional schematic diagrams illustrating an exemplary fabrication process for forming an emitter, such as emitter 200 in FIG. 2A. As illustrated in FIG. 4A, a fabrication substrate 400 is provided. Fabrication substrate 400 can correspond to, for example, any wafer suitable for use in a microfabrication process. For example, in some embodiments, fabrication substrate 400 corresponds to a silicon wafer. Substrate etching mask 401 (e.g., silicon oxide) can be formed on both sides of the fabrication substrate and patterned, for example, using first photoresist layer 402, as illustrated in FIGS. 4B-4D. The pattern in first photoresist layer 402 can correspond to the desired pattern of microstructures on the emitter protrusions. Once the substrate etching mask has been patterned, first photoresist layer 402 can be removed, as illustrated in FIG. 4E. Subsequently, second photoresist layer 403 can be formed over substrate etching mask 401, as illustrated in FIG. 4F. Second photoresist layer 403 can be patterned, as illustrated in FIG. 4G. The pattern in the second photoresist layer can correspond to an outline of the protrusion substrate, including the protrusion substrate base and the emitter protrusions. An exemplary mask that can be used to form this pattern is shown in FIG. 4O.

Figure 4I:
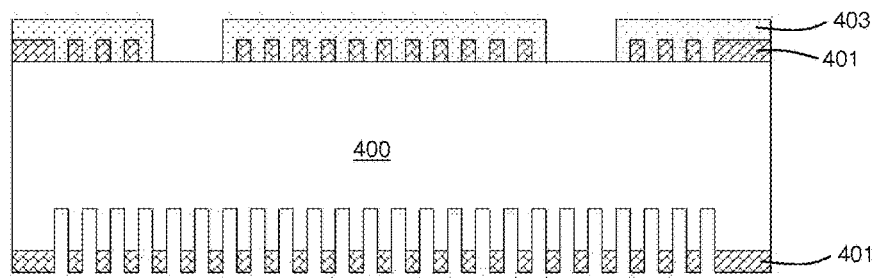
Figure 4J:
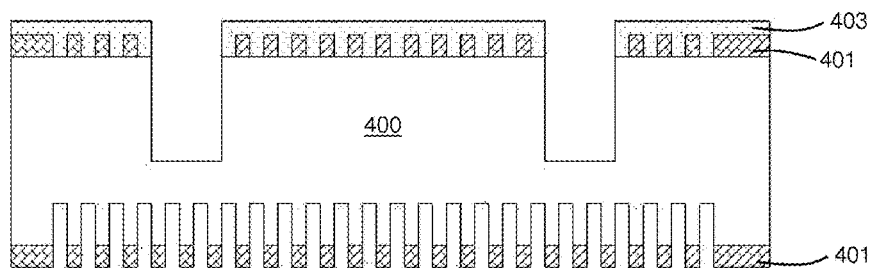
Figure 4K:
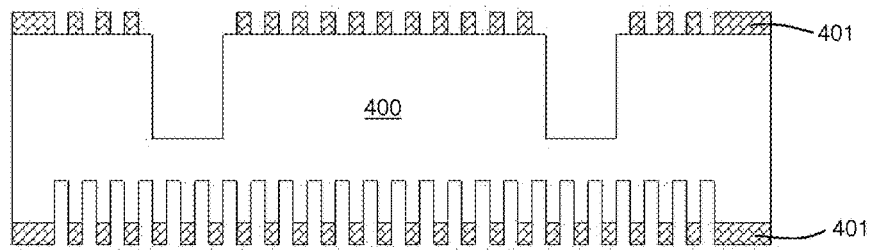
Figure 4L:
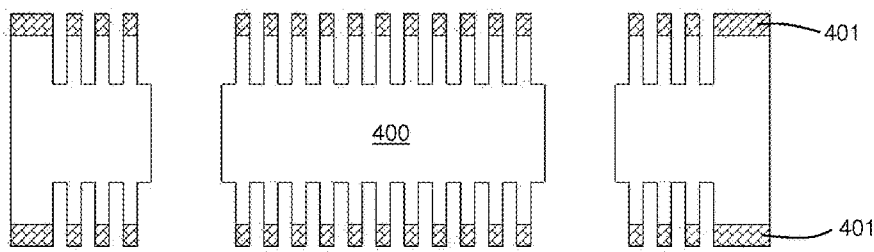
Figure 4M:
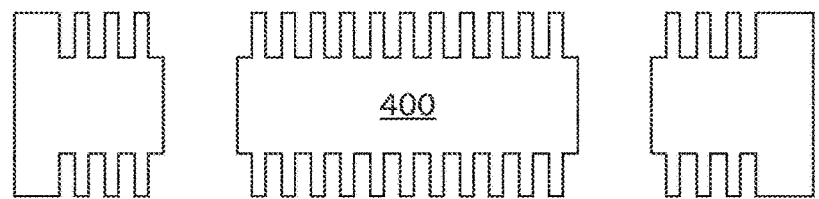
Figure 4N:
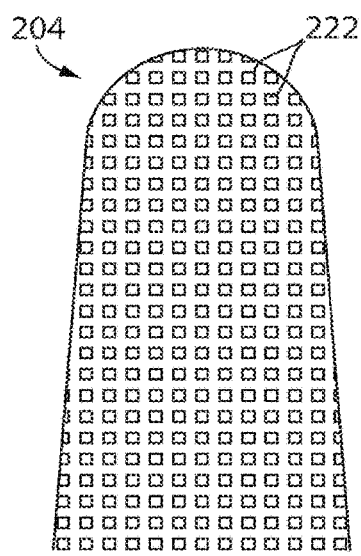
FIG. 4N is a top-view schematic illustration of the protrusion illustrated in FIG. 4M, according to one set of embodiments.
Figure 4O:
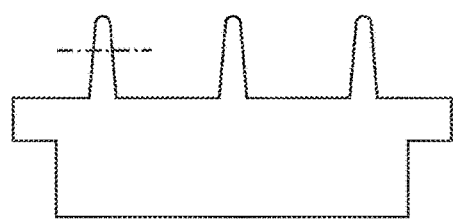
FIG. 4O is a top-view schematic illustration of a mask that can be used to fabricate a protrusion substrate, according to certain embodiments.

Referring to FIG. 4I, the back side of the fabrication substrate can be etched (for example, using a deep reactive ion etch) to form a plurality of microstructures on the back size of the fabrication substrate. Subsequently, as illustrated in FIG. 4J, the front side of the fabrication substrate can be etched (for example, using a deep reactive ion etch) to a depth such that the remaining thickness of the fabrication substrate is essentially the same as the desired height of the front side microstructures. Next, as illustrated in FIG. 4K, second photoresist layer 403 can be removed, as illustrated in FIG. 4K. Subsequently, another etching step (e.g., a deep reactive ion etching step) can be performed to form the front side microstructures and to release the protrusion substrate, as illustrated in FIG. 4L. Finally, first mask layer 401 can be removed to form the structure in FIG. 4M. FIG. 4N is a top side schematic illustration of the structure illustrated in FIG. 4M.

Figure 5A:
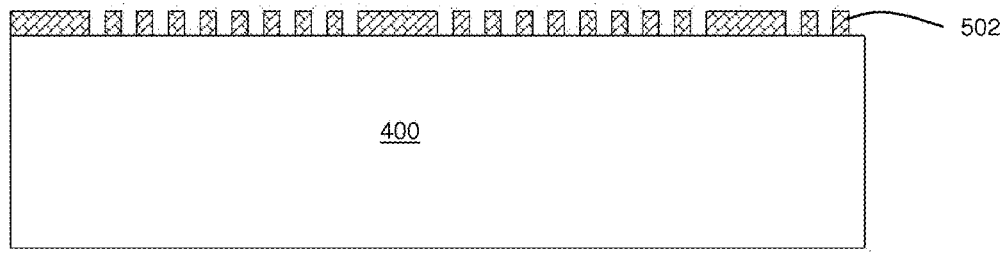
FIGS. 5A-5D are cross-sectional schematic diagrams illustrating a process for fabricating a plurality of microstructures on a protrusion, according to one set of embodiments.
Figure 5B:
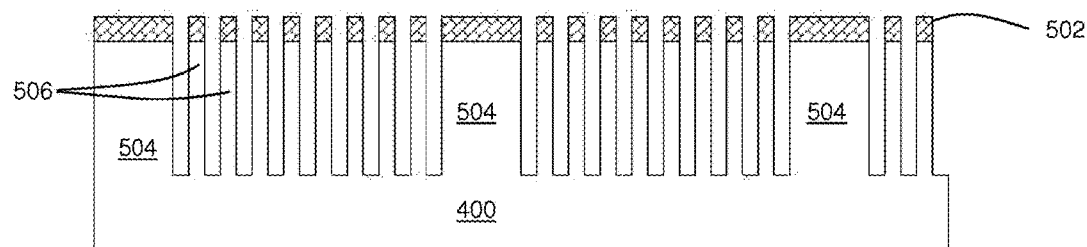
Figure 5C:
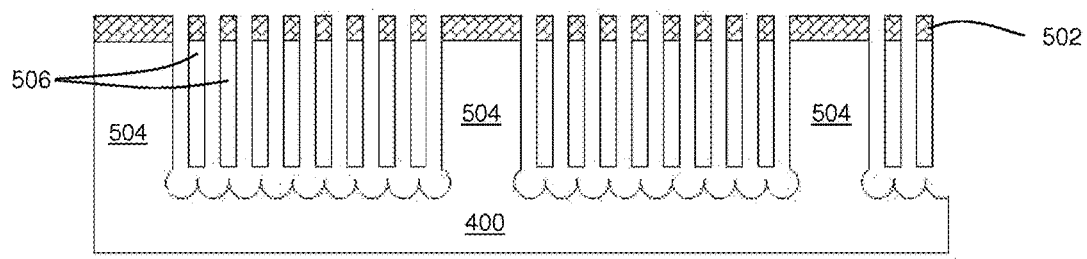
Figure 5D:
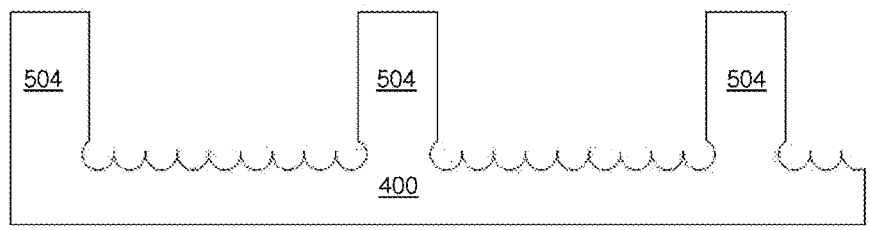

While the microstructures illustrated in FIGS. 4A-4M have nearest neighbor distances that are relatively close to the cross-sectional dimensions of the nanostructures, other spacings can be achieved, including nearest neighbor distances that are smaller than or larger than the cross-sectional dimensions of the nanostructures. FIGS. 5A-5D are cross-sectional schematic illustrations outlining an exemplary process for producing relatively widely spaced microstructures. In FIG. 5A, nested mask 502 (e.g., a silicon oxide mask) has been formed over fabrication substrate 400 (e.g., a silicon wafer). In FIG. 5B, an anisotropic etching step (e.g., a deep reactive ion etching step) has been performed to form microstructures 504 and sacrificial features 506. In FIG. 5C, an isotropic etch is used to undercut sacrificial features 506, leaving behind microstructures 504. Nested mask 502 can then be removed to form the structure illustrated in FIG. 5D.

Figure 6A:
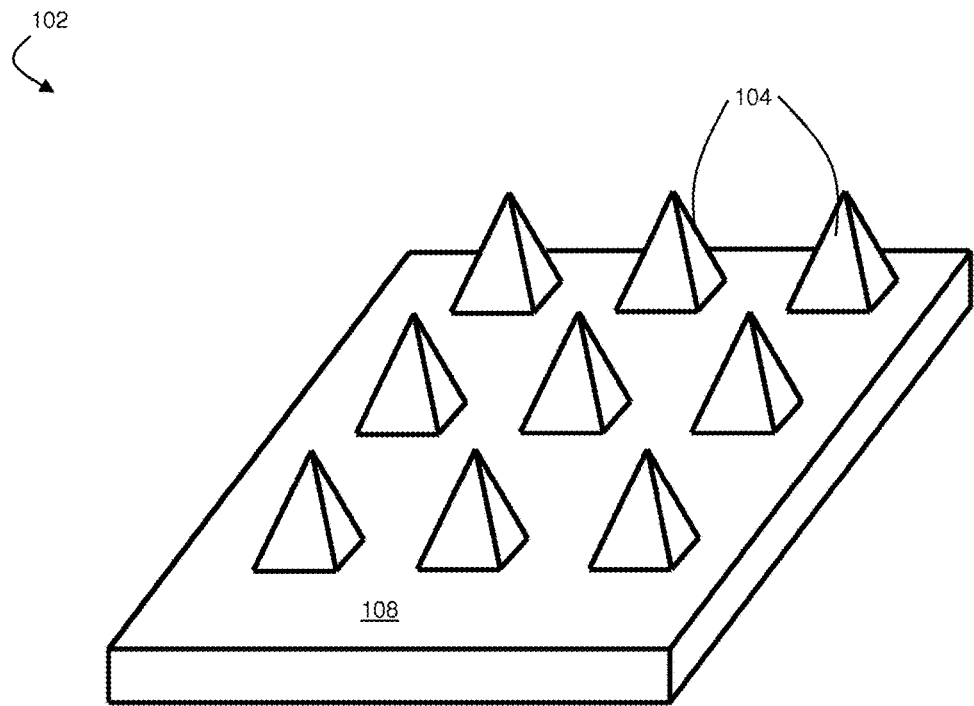
FIG. 6A is, according to some embodiments, a perspective view schematic diagram of an emitter substrate comprising an array of protrusions.
Figure 6B:
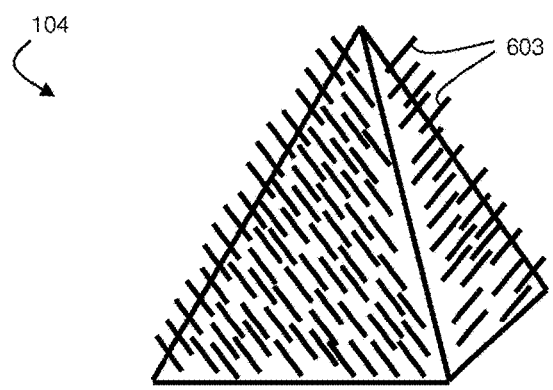
FIG. 6B is a perspective view schematic illustration of a protrusion within an emitter, comprising a plurality of nanostructures, according to certain embodiments.

In certain embodiments, emitters and systems useful for performing electrospraying are provided. Such systems can comprise, in certain embodiments, a plurality of protrusions extending from an emitter substrate, and a plurality of nanostructures extending from the external surface of the protrusions. For example, FIG. 6A is an exemplary schematic illustration of emitter 102 comprising emitter substrate 108 and protrusions 104 extending from emitter substrate 108. The protrusions illustrated in FIG. 6A are arranged in a 3 by 3 array. However, arrays containing more or fewer protrusions are also possible, as described in more detail below. FIG. 6B is an exemplary schematic illustration of a protrusion 104 of emitter 102 in FIG. 6A. As illustrated in FIG. 6B, nanostructures 603 extend from the external surfaces of protrusions 104. In some embodiments, a protrusion may contain a relatively large number of nanostructures. For example, a protrusion may contain at least about 100, at least about 1,000, at least about 10,000, or at least about 100,000, or more nano structures.

A variety of nanostructures can be arranged on the surfaces of protrusions in certain of the emitters described herein. In certain embodiments, the nanostructures can be elongated nanostructures. For example, in some embodiments, the nanostructures can have aspect ratios greater than about 10, greater than about 100, greater than about 1,000, or greater than about 10,000 (and/or up to 100,000:1, up to 1,000,000:1, or greater).

In some embodiments, at least a portion of the nanostructures may comprise nanotubes (e.g., single-walled nanotubes, multi-walled nanotubes), nanofibers, nanowires, nanopillars, nanowhiskers, and the like. As used herein, the term "nanotube" is given its ordinary meaning in the art and refers to a substantially cylindrical nanostructure containing a different material in its interior than on its exterior. In certain embodiments, the nanotubes can be hollow. In some embodiments, the nanotube can be formed of a single molecule. In some embodiments, the nanotubes comprise a fused network of primarily six-membered atomic rings. It should be understood that the nanotube may also comprise rings or lattice structures other than six-membered rings. In some embodiments, the nanotubes may be metallic, semi-conducting, or insulating. In some embodiments, at least a portion of the nanostructures are carbon nanotubes (e.g., single-walled carbon nanotubes and/or multi-walled carbon nanotubes). In some embodiments, at least a portion of the nanostructures are non-carbon nanotubes. In some embodiments, at least a portion of the nanostructures are inorganic nanotubes. The non-carbon nanotube material may be selected from polymer, ceramic, metal and other suitable materials. For example, the non-carbon nanotube may comprise a metal such as Co, Fe, Ni, Mo, Cu, Au, Ag, Pt, Pd, Al, Zn, or alloys of these metals, among others. In some instances, the non-carbon nanotube may be formed of a semi-conductor such as, for example, Si. In some cases, the non-carbon nanotubes may be Group II-VI nanotubes, wherein Group II elements are selected from Zn, Cd, and Hg, and Group VI elements are selected from O, S, Se, Te, and Po. In some embodiments, non-carbon nanotubes may comprise Group III-V nanotubes, wherein Group III elements are selected from B, Al, Ga, In, and Tl, and Group V elements are selected from N, P, As, Sb, and Bi. As a specific example, the non-carbon nanotubes may comprise boron-nitride nanotubes.

In some embodiments, at least a portion of the nanostructures are carbon-based nanostructures. As used herein, a "carbon-based nanostructure" comprises a fused network of aromatic rings wherein the nanostructure comprises primarily carbon atoms. In some embodiments, the carbon-based nanostructure comprises at least about 75 wt % carbon, at least about 90 wt % carbon, or at least about 99 wt % carbon. In some instances, the nanostructures have a cylindrical, pseudo-cylindrical, or horn shape. A carbon-based nanostructure can comprises a fused network of at least about 10, at least about 50, at least about 100, at least about 1,000, at least about 10,000, or, in some cases, at least about 100,000 aromatic rings.

In certain cases, at least some of the nanostructures may have a length of at least about 10 nm, at least about 100 nm, at least about 1 micrometer, or at least about 10 micrometers (and/or, in certain embodiments, up to about 50 microns, up to about 100 microns, up to about 1 millimeter, or greater). In some embodiments, at least some of the nanostructures can be substantially cylindrical and can have a diameter of less than about 1 micron, less than about 500 nm, less than about 200 nm, less than about 100 nm, less than about 50 nm, or less than about 10 nm (and/or, in certain embodiments, as little as 1 nm, or less).

The nanostructures may be formed from any suitable material. In some embodiments, at least a portion of the nanostructures may comprise carbon. In certain embodiments, at least a portion of the nanostructures comprise silicon. The nanostructures may comprise, in certain embodiments, both silicon and carbon (e.g., in the form of silicon carbide).

In some cases, a layer of material may be positioned over the nanostructures. For example, in some embodiments, a coating (e.g., a substantially conformal coating) may be positioned over the nanostructures. The coating can be used, in certain embodiments, the alter the wetting properties of the exposed surface of the nanostructures, which can be helpful in ensuring that the fluid that is to be discharged from the electrospraying emitter is substantially evenly-coated over the emitter. Non-limiting examples of suitable materials for use in layers positioned over the nanostructures (e.g., coatings) include metals (e.g., gold, platinum, tungsten, and the like), dielectric materials, and/or polymeric materials. In certain embodiments, the layer positioned over the nanostructures comprises at least one self-assembled monolayer.

Nanostructures may be deposited on the protrusions of an emitter using any of a variety of methods. In certain embodiments, depositing a plurality of nanostructures on an external surface of a protrusion involves an additive process in which new material is added to the protrusion (in contrast to methods by which nanostructures are formed on a protrusion by reacting a portion of the protrusion on or near the exposed surface of the protrusion). In some embodiments, depositing a plurality of nanostructures on an external surface of a protrusion comprises performing a chemical reaction to form a plurality of nanostructures on a substrate. For example, in some cases, nanostructures may be deposited on an external surface of a protrusion via chemical vapor deposition (CVD). In some such embodiments, nanostructures may be deposited on an external surface of a protrusion using plasma-enhanced chemical vapor deposition (PECVD). The use of CVD processes (including PECVD process) may, in certain cases, ensure that the nanostructures conformally coat the protrusions and/or that the nanostructures are firmly attached to the surfaces of the protrusions. In some embodiments, precursor gases for use in the PECVD technique may include, but are not limited to, ammonia, methane, hydrogen, and/or acetylene.

In some embodiments, depositing a plurality of nanostructures on an external surface of a protrusion comprises non-reactively accumulating material on the surface of a protrusion. For example, precursor material could be, in some embodiments, precipitated from a solution onto one or more protrusions to form nanostructures.

In some embodiments, the nanostructures positioned over the protrusions may be exposed to further surface treatment. The surface treatment may be used, for example, to modify the wetting properties of the nanostructures, which can be useful in ensuring that the liquid that is to be discharged from the protrusions is substantially evenly distributed across the external surfaces of the protrusions. In some embodiments, at least a portion of the protrusions may be exposed to plasma, such as an oxygen plasma. For example, in some embodiments, the nanostructures are exposed to a short, low-power $O_2$ plasma treatment. Such treatment may enhance the wetting characteristics of the nano structures.

In some embodiments in which elongated nanostructures are employed, the nanostructures may be arranged such that the long axes of the nanostructures are substantially aligned relative to each other. The term "long axis" is used to refer to the imaginary line drawn parallel to the longest length of the nanostructure and intersecting the geometric center of the nanostructure. In some cases, the nanostructures may be fabricated by uniformly growing the nanostructures on the surface of a protrusion, such that the long axes are aligned and non-parallel to the protrusion surface (e.g., substantially perpendicular to the protrusion surface). In some cases, the long axes of the nanostructures are oriented in a substantially perpendicular direction with respect to the surface of a protrusion, forming a nanostructure "forest." It should be understood that the use of aligned nanostructures is not necessary, and in some embodiments, at least a portion of the nanostructures may not be substantially aligned.

Generally the hydraulic impedance produced by a coating of nanostructures depends on the diameters of the nanostructures and their packing density. Thus, in some embodiments, the spacings and/or the dimensions of the nanostructures described herein may be tailored to achieve a flow rate needed for a desired fluid emission regime (e.g., a regime in which ions are emitted from the protrusions, a regime in which droplets are emitted from the protrusions, or a regime in which both droplets and ions are emitted from the protrusions). For example, emission in the ionic regime may be achieved with a low flow rate and high hydraulic impedance, while emission in the mixed ionic/droplet regime may be achieved with higher flow rate and lower hydraulic impedance. Hydraulic impedance may be increased by increasing the diameter of the nanostructures and the packing density of the nanostructures. Nanostructure diameter and packing density may be tuned by adjusting parameters of the growth process, including choice of catalyst material, anneal temperature, growth temperature, growth time, and choice of process gases. Those of ordinary skill in the art, given the present disclosure, would be capable of adjusting nanostructure growth conditions to produce nanostructures having suitable dimensions and packing densities for achieving a desired flow regime.

In certain cases, the protrusions extending from the emitter substrate in emitters designed for electrospraying systems can be relatively small. For example, in some embodiments, the protrusions extending from the emitter in FIG. 6A can be relatively small in scale, for example, relative to the protrusions extending from emitter 200 in FIG. 2A. The use of small protrusions can allow one to arrange a relatively large number of protrusions within a relatively small area, which can be useful in scaling up the electrospraying system. In some embodiments, at least a portion of (e.g., at least about 50% of, at least about 75% of, at least about 90% of, at least about 99% of, or substantially all of) the protrusions extending from the emitter substrate have maximum cross-sectional dimensions of less than about 1 millimeter. In some such embodiments, at least a portion of (e.g., at least about 50% of, at least about 75% of, at least about 90% of, at least about 99% of, or substantially all of) the protrusions extending from the emitter substrate have maximum cross-sectional dimensions of at least about 1 micron, at least about 10 microns, or at least about 50 microns. In some cases, at least a portion of the protrusions may have a height (measured relative to the external surface of the emitter substrate on which the protrusions are formed) of less than about 5 mm, less than about 1 mm, less than about 500 microns, less than about 400 microns, less than about 300 microns, less than about 200 microns, less than about 100 microns, or less than about 50 microns. In some cases, at least a portion of the protrusions may have a height of at least about 50 microns, at least about 100 microns, at least about 200 microns, at least about 300 microns, at least about 400 microns, at least about 500 microns, at least about 1 mm, at least about 2 mm, or at least about 5 mm. In some embodiments, at least a portion of the protrusions are microstructures, having at least one cross-sectional dimension of less than about 1 mm, less than about 100 micrometers, or less than about 10 micrometers (and/or, in some embodiments, as little as about 1 micrometer, or smaller).

In some embodiments, a relatively large number of protrusions can be arranged within a relatively small area, which can be useful in scaling up the electrospraying system. In certain embodiments, the array of protrusions within an electro spraying emitter includes at least about 10 protrusions/cm$^2$, at least about 100 protrusions/cm$^2$, at least about 1,000 protrusions/cm$^2$, at least about 1,900 protrusions/cm$^2$, or at least about 10,000 protrusions/cm$^2$ (and/or, in certain embodiments, up to about 100,000 protrusions/cm$^2$, or more).

Certain embodiments relate to methods of using certain of the electrospraying systems described herein. In some embodiments, an electrospraying method comprises exposing an emitter to a fluid and applying voltage across the emitter and the electrode. Applying the voltage results, in some embodiments, in emission of fluid (e.g., in the form of droplets and/or ions) from at least a portion of the tips of the protrusions of the emitter toward the electrode.

Any suitable fluid can be used as the electrosprayed fluid. In some embodiments, the electrosprayed fluid comprises a charged fluid. In some embodiments, the fluid used in the electrospraying system may be polar. In some embodiments, the electrosprayed fluid comprises a liquid. In some embodiments, the electrosprayed liquid comprises an ionic liquid. Ionic liquids can be used as the electrosprayed liquid, for example, when the production of ions is desired. Non-limiting examples of ionic liquids suitable for use in the electrospraying systems described herein include 1-ethyl-3-methylimidazolium tetrafluoroborate (EMI-BF$_4$), 1-ethyl-3-methylimidazolium bis(trifluoromethylsulfonyl)imide (EMI-Im), 1-butyl-3-methylimidazolium tetrachloroferrate (bmim[FeCl$_4$]), and 1-butyronitrile-3-methylimidazolium tetrachloroferrate (nbmim[FeCl$_4$]).

In some embodiments, a charged fluid may be emitted from protrusions within the electrospraying system. The fluid emitted from protrusions within the electrospraying system may comprise ions, solvated ions, and/or droplets. In some embodiments in which droplets are emitted from protrusions of the electrospraying system, the droplets may have relatively consistent maximum cross-sectional dimensions and/or volumes. For example, in some embodiments, the droplets emitted from the protrusions of the electrospraying system can each have maximum cross-sectional dimension, and the standard deviation of the maximum cross-sectional dimensions of the droplets may be less than about 100%, less than about 50%, less than about 20%, or less than about 10% of the average of the maximum cross-sectional dimensions of the droplets. In some embodiments, the droplets emitted from the protrusions of the electrospraying system can each have a volume, and the standard deviation of the volumes of the droplets may be less than about 100%, less than about 50%, less than about 20%, or less than about 10% of the average of the volumes of the droplets. In certain embodiments, droplets emitted from protrusions are monodisperse.

The electrospraying systems described herein can be operated at relatively low voltages, in certain embodiments. In some embodiments, the voltage applied between the emitter and the electrode (e.g., extractor electrode) of the electrospraying system may be less than about 100 kV, less than about 50 kV, less than about 10 kV, less than about 5 kV, less than about 2.5 kV, less than about 1 kV, less than about 500 V, less than about 100 V, or less than about 50 V (and/or, in some embodiments, as little as 10 V, or less) while fluid discharge having any of the properties described herein is generated. In certain embodiments, during operation of the electrospraying system, the current per protrusion tip may be greater than about 1 microamp, greater than about 3 microamps, or greater than about 5 microamps (and/or, in certain embodiments, up to about 10 microamps, or more).

Figure 6C:
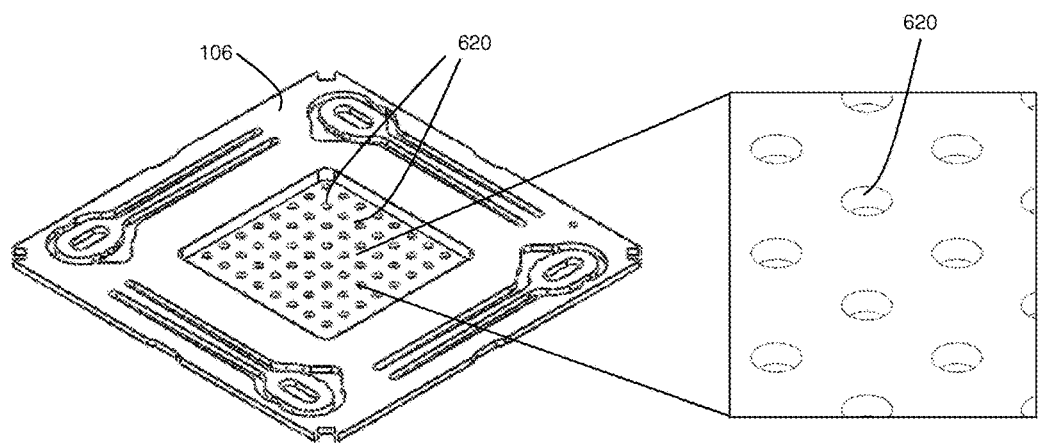
FIG. 6C is an exemplary schematic illustration of an extractor electrode comprising a plurality of apertures.

In some embodiments, the extractor electrode die may contain an array of apertures. For example, FIG. 6C is a schematic illustration of an extractor electrode 106 comprising a plurality of apertures 620. The apertures may be, in certain embodiments, substantially circular, substantially rectangular (e.g., substantially square), or any other shape. As illustrated in FIG. 6C, apertures 620 are substantially circular in cross-section. In certain embodiments, the use of substantially circular apertures can be advantageous, although such aperture shapes are not required. In some embodiments, the apertures may have maximum cross-sectional dimensions of less than about 1 mm, less than about 500 microns, less than about 400 microns, less than about 200 microns, less than about 100 microns, less than about 50 microns, or less than about 10 microns in diameter.

Figure 6D:
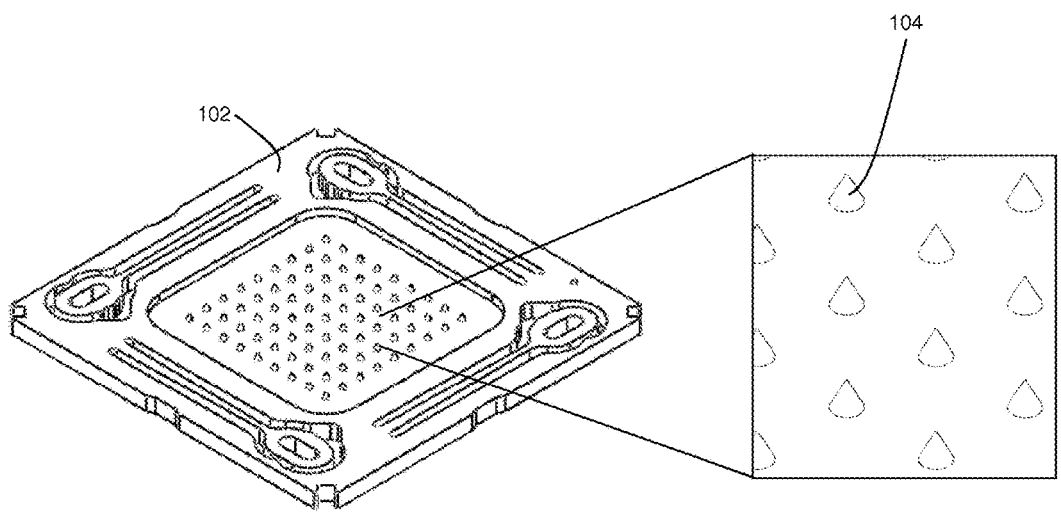
FIG. 6D is an exemplary schematic illustration of an emitter comprising a plurality of protrusions.
Figure 6E:
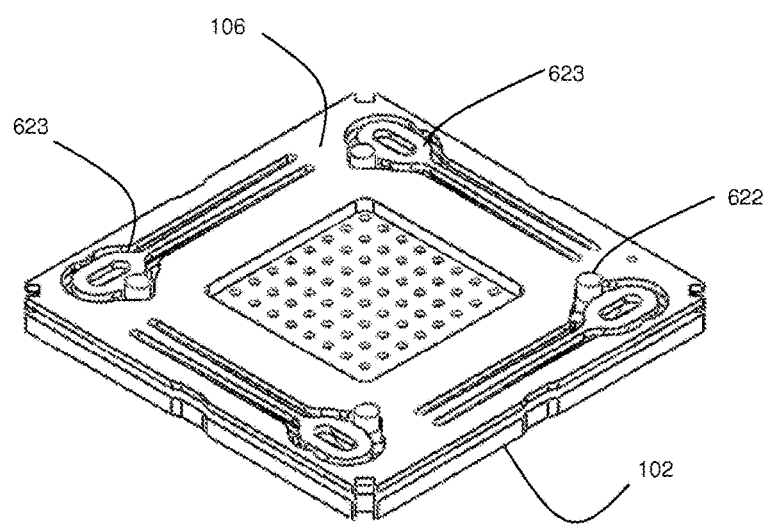
FIG. 6E is a perspective view schematic illustration of an electrospraying system in which an extractor electrode is positioned over an emitter.
Figure 6F:
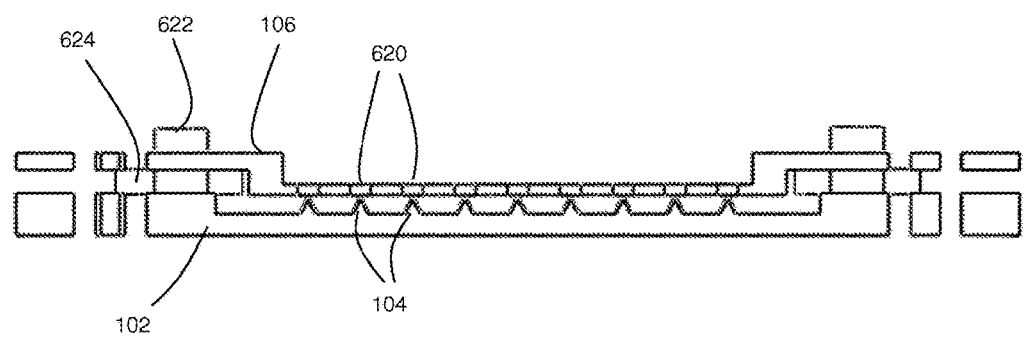
FIG. 6F is a cross-sectional schematic illustration of the electrospraying system shown in FIG. 6E, which comprises an extractor electrode positioned over an emitter.

The emitter and the extractor electrode can be arranged such that the extractor electrode is positioned over the emitter. For example, FIG. 6E is a perspective view illustration of an electrospraying system in which extractor electrode 106 illustrated in FIG. 6C is positioned over emitter 102 illustrated in FIG. 6D. FIG. 6F is a cross-sectional schematic illustration of the arrangement shown in FIG. 6E. In some embodiments, the apertures within the array can be spatially arranged such that their positions substantially correspond to the positions of the protrusions on the emitter. For example, referring to FIG. 6F, apertures 620 of extractor electrode are positioned such that they overlie protrusions 104 of emitter 102. In some embodiments, the gap between the emitter and the extractor electrode may be less than about 500 microns, less than about 100 microns, less than about 50 microns, or less than about 10 microns. The emitter and the extractor electrode may be held together, in certain embodiments, via a pin, dowel, or other connector. For example, in FIG. 6F, dowel 622 (e.g., a ceramic dowel) is inserted through openings in the emitter and the extractor electrode, which maintains the alignment of the emitter and the extractor electrode. In certain embodiments, the emitter and/or the extractor electrode comprise deflection springs that clamp onto the connector (e.g., dowel) pins to enable precision alignment of the two components. For example, in FIG. 6E, extractor electrode 106 comprises deflection springs 623. In some embodiments, a spacer (e.g., a polyimide spacer) can also be included between the emitter and the extractor electrode, which can be used to maintain consistent spacing between the two components. For example, in FIG. 6F, spacer 624 is positioned between emitter 102 and extractor electrode 106. In some embodiments, when the two dies are assembled, each protrusion tip sits underneath an aperture.

Certain embodiments relate to methods of fabricating electrospraying systems and components for use therein. In some embodiments, a method of making an emitter is described. The method comprises, in some embodiments, etching a fabrication substrate to produce a plurality of protrusions extending from the fabrication substrate. In some such embodiments, the method further comprises depositing a plurality of nanostructures on external surfaces of the protrusions.

Figure 7A:
FIGS. 7A-7H are, according to one set of embodiments, cross-sectional schematic diagrams illustrating a process for fabricating an emitter substrate comprising a plurality of protrusions.

FIGS. 7A-7H are a series of cross-sectional schematic diagrams outlining an exemplary process for fabricating an emitter (e.g., for use in an electrospraying system). As shown in FIG. 7A, the process begins with fabrication substrate 701. Fabrication substrate 701 can correspond to, for example, any wafer suitable for use in a microfabrication process. For example, in some embodiments, fabrication substrate 701 corresponds to a silicon wafer.

Figure 7E:
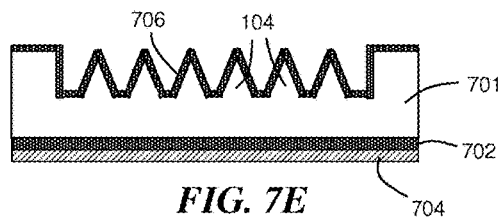
Figure 7B:
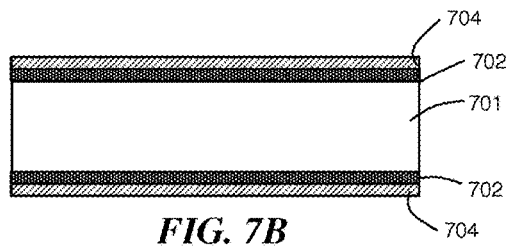
Figure 7F:
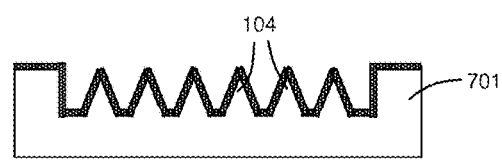
Figure 7C:
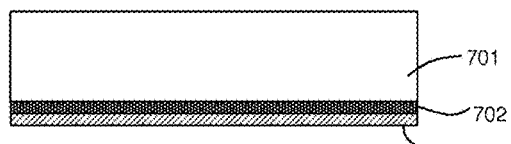
Figure 7G:
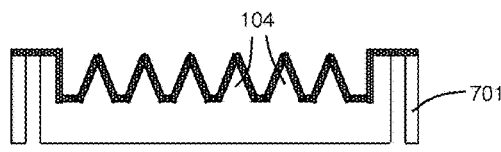
Figure 7D:
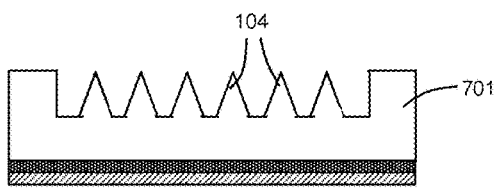
Figure 7H:
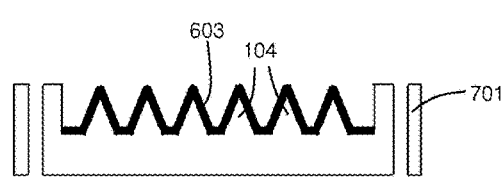

In some embodiments, fabrication substrate is etched to produce a plurality of protrusions (which can correspond to protrusions 104 in FIGS. 6A, 6B, 6D, and 6F) extending from the fabrication substrate. In some embodiments, etching the fabrication substrate to produce the protrusions comprises reactive ion etching (RIE). In certain cases, the reactive ion etching may comprise deep reactive ion etching (DRIE). Etching the fabrication substrate to produce the protrusions can be achieved, for example, using an etch mask. Referring to FIG. 7B, for example, etch masks 702 (e.g., a silicon oxide layer with, for example, a thickness of about 500 nm) can be formed on the front and back sides of fabrication substrate 701. In certain embodiments, additional masking materials (e.g., a silicon-rich silicon nitride layer 704 with a thickness of, for example, 250 nm) can be deposited. In some embodiments, deep reactive ion etching—using, for example, a photoresist mask (not illustrated)—is then used to create protrusions 104, as shown in FIG. 7D. In certain embodiments, and as illustrated in FIG. 7E, the protrusions on the front side of the fabrication substrate are oxidized, resulting in oxide layer 706. Optionally, and as shown in FIG. 7F, masking layers 702 and 704 can be removed from the back side of the fabrication substrate 701. In some embodiments, and as illustrated in FIG. 7G, additional features (e.g., alignment features) can be etched from the back side of the fabrication substrate (e.g., via deep reactive ion etching or any other suitable etching technique). Optionally, in some embodiments, oxide layer 706 is removed from the front side of the fabrication substrate.

As noted above, the method of making the emitter further comprises, in certain embodiments, depositing a plurality of nanostructures on external surfaces of the protrusions. For example, referring to FIG. 7H, nanostructures 603 can be deposited on the exposed surface of protrusions 104.

As noted elsewhere, deposition of the nanostructures can comprise performing a chemical reaction to form the nanostructures, precipitating a material to form the nanostructures, or otherwise adding material to the protrusions to form the nanostructures. In some embodiments, nanostructures are formed over the protrusions via catalytic growth. For example, the fabrication process may comprise depositing a catalyst over the fabrication substrate after etching the fabrication substrate to produce the plurality of protrusions and prior to depositing the plurality of nanostructures on the external surfaces of the protrusions. Subsequently, after the catalyst has been deposited, the nanostructures can be catalytically grown. As one specific example, in some embodiments, nanostructures 603 can correspond to carbon nanotubes, which can be catalytically grown after depositing a metal film (e.g., a Ni/TiN film) over protrusions 104.

In some embodiments, the process of forming the emitter may comprise removing at least a portion of the catalyst after depositing the catalyst over the fabrication substrate. In some such embodiments, the catalyst can be removed in order to form an ordered catalyst layer. The ordered catalyst layer can be used to produce nanostructures that are positioned over the protrusions in an ordered fashion, as described in more detail above. In other embodiments, substantially no portions of the catalyst are removed prior to deposition of the nanostructures, and order can be introduced to the nanostructures by removing at least a portion of the deposited nano structures.

Figure 7I:
FIGS. 7I-7P are, according to one set of embodiments, cross-sectional schematic diagrams illustrating a process for fabricating an extractor electrode.
Figure 7M:
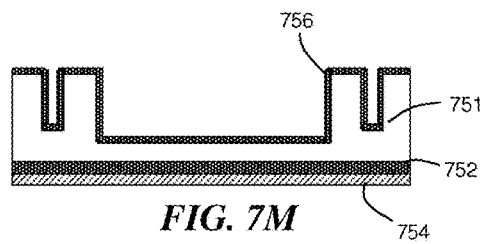
Figure 7J:
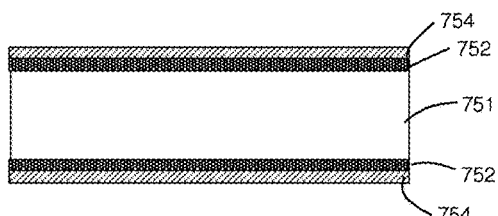
Figure 7N:
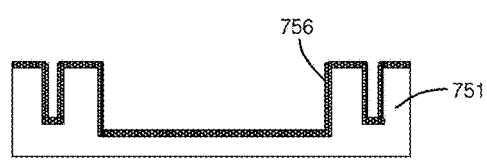
Figure 7K:
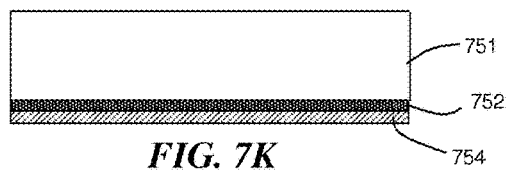
Figure 7O:
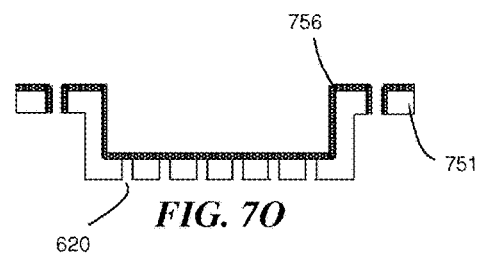
Figure 7L:
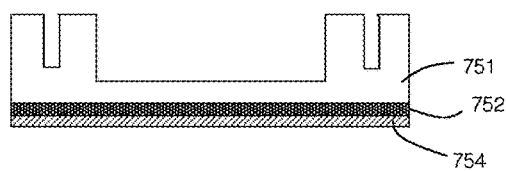
Figure 7P:
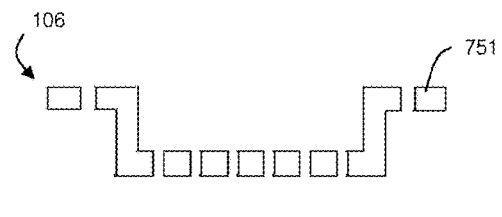

FIGS. 7I-7P are a series of cross-sectional schematic diagrams outlining an exemplary process for fabricating an extractor electrode, such as extractor electrode 106 illustrated in FIGS. 6C, 6E, and 6F. As shown in FIG. 7I, the exemplary process begins with substrate 751. Substrate 751 can correspond to, for example, any wafer suitable for use in a microfabrication process. For example, in some embodiments, substrate 751 corresponds to a silicon wafer. One or more masks can be formed on substrate 751. For example, in FIG. 7I, a silicon oxide mask 752 (e.g., with a thickness of about 500 nm) is positioned over both sides of substrate 751. In FIG. 7J, a silicon nitride mask 754 is positioned over the silicon oxide mask 752. Next, as illustrated in FIG. 7K, the front side oxide and nitride masks can be removed. Subsequently, an etching step (e.g., a deep reactive ion etching step using, for example, a photoresist mask, which is not illustrated) can be used to create the front side features of the extractor electrode, as illustrated in FIG. 7L. As shown in FIG. 7M, the front side of substrate 751 can be oxidized (e.g., via the formation of silicon oxide mask 756) to protect the front side features. Subsequently, as illustrated in FIG. 7N, the back side silicon oxide and silicon nitride masks can be removed. A second etching step (e.g., a second deep reactive ion etching step using, for example, a photoresist mask, which is not illustrated) can then be performed to form the back side features, such as apertures 620, as shown in FIG. 7O. The front side silicon oxide mask 756 can then be removed, as illustrated in FIG. 7P. In certain embodiments, the exposed surfaces of the resulting electrode can be coated with an electronically conductive material (e.g., a metal such as gold).

The systems and methods described herein have a variety of uses. For example, certain of the devices described herein can be used to produce fibers (e.g., nanofibers) made of a variety of suitable materials including, but not limited to, polymer, ceramic, semiconductor, and/or metallic materials, and/or combinations of these. Such fibers can be useful in, for example, advanced energy storage and power conversion systems. Nanofibers can be especially attractive for energy applications because their low dimensionality gives them unique properties. As one particular example, dye-sensitized solar cells can benefit from the reduction of grain boundaries within 1-dimensional structures, which can improve charge conduction. Porous nanofibers mats can allow for better infiltration of viscous polymer gels containing dye sensitizers. Also, the high surface-to-volume ratio of nanofibers can make nanofiber mats particularly useful as scaffolds for catalyst dispersion in fuel cells. The electrospinning devices described herein can also be used to conformally coat three-dimensional complex shapes with thin layers to produce, for example, complex multi-layered structures and/or structures including thin layers with variations in thickness across the surface. Electrospun fibers can also be used to produce a broad range of other devices including, but not limited to, flexible electronics, filtration systems, tissue (e.g., in tissue engineering applications), ultracapacitors, and nano-reinforced composite materials.

Certain of the devices described herein can be used to perform electrospraying to produce droplets and/or ions for a variety of applications. For example, certain of the systems and methods can be used to produce nanoparticles (e.g., comprising a polymer, metal, ceramic, or combinations of these and/or other materials). Certain of the systems and methods described herein can be used for the efficient high-throughput generation of ions, which can be used, for example, for mass-efficient nanosatellite electric propulsion, multiplexed focused ion beam imaging, and/or high-throughput nanomanufacturing.

The following examples are intended to illustrate certain embodiments of the present invention, but do not exemplify the full scope of the invention.

Example 1

This example describes the design, fabrication, and experimental characterization of an externally-fed, silicon batch fabricated MEMS electrospinning planar array with as many as 9 steady-operating emitting protrusions in 1 cm². The device could be used to simultaneously generate multiple nanofiber jets using a bias voltage of 20 kV or less by using an array of pointed emitting protrusions that enhance the local electric field to trigger the ionization of a polymer solution at the emitting protrusion tips. The surfaces of the emitting protrusions were patterned with a microstructure that allowed for the delivery of polymer solution to the emitting protrusion tips without the need for external pumping. Scanning electron microscope (SEM) images confirmed fiber diameters on the order of 150 nm.

Figure 8:
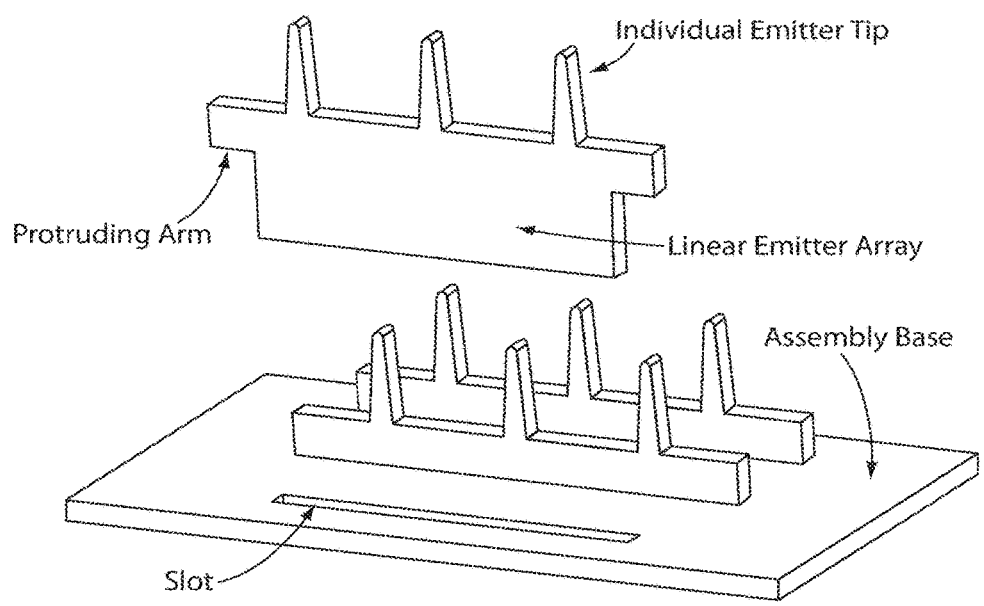
FIG. 8 is a perspective view schematic illustration of an electrospinning system, according to certain embodiments.

The devices described in this example included a hierarchically structured, externally-fed MEMS electrospinning array. One-dimensional (in this case, linear) arrays of mesoscale spikes, which serve as emitting protrusions, were assembled into a slotted base to form two-dimensional (in this case, planar) arrays, as shown in FIG. 8. Micro-scale structures on the surfaces of the emitting protrusions allowed for the delivery of fluid to the field-enhancing spike-tips where the fluid was spun into fibers. Using this technology, MEMS planar arrays with as many as 9 electrospinning emitting protrusions with 3-mm pitch were developed.

Figure 9A:
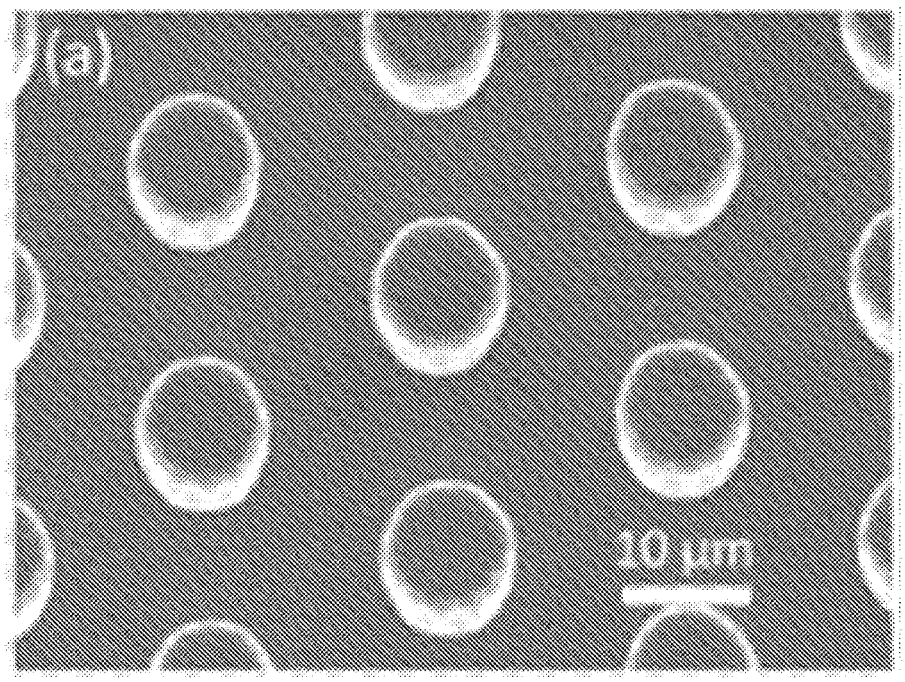
FIG. 9A is a scanning electron microscope (SEM) image of a plurality of micropillars on an emitter protrusion, according to one set of embodiments.
Figure 9B:
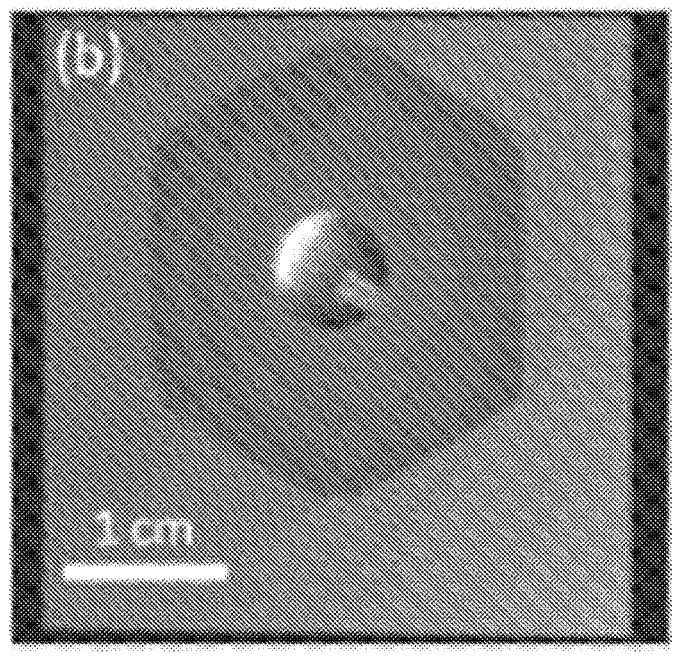
FIG. 9B is an image illustrating the hemi-wicking spread of a droplet through microstructured features of an emitter protrusion, according to some embodiments.

The MEMS multiplexed electrospinning sources used externally-fed emitting protrusions to circumvent the clogging and pumping problems that pressure-fed electrospinning sources often exhibit. In order to operate continuously, fluid is generally replenished to the emitting protrusion tips via free surface flow. A hydrophilic emitting protrusion surface is useful to enable fluid spreading. On a smooth surface, complete spreading can generally only be achieved with contact angles approaching zero, which are rare. However, for roughened surfaces, surface energy minimization relaxes the spreading condition to:

$$\cos(\theta) \geq \cos(\theta_{crit}) = \frac{1-\varphi}{r-\varphi} \quad [2]$$

where the roughness r is defined as the ratio of actual area to apparent area and is the ratio of dry area to apparent area in the spreading region. For a roughness structure of hexagonally packed micropillars (FIGS. 9A-9B), these quantities are easily calculated in terms of the diameter d, height h, and pitch p of the pillars. Capillary forces in these "micropillar forests" can "hemi-wick" liquid in a process that is analogous to capillary rise in a closed tube. The dynamics of hemi-wicking through the micropillar forest can be solved for numerically or approximated using Darcy's Law. For the relatively viscous solutions used in electrospinning, the dynamics are sufficiently slow that it is prudent to "prime" the emitting protrusions by coating them with polymer just prior to operation; this allows a liquid film to quickly impregnate the micropillars, which can then support a secondary film outside of the roughness. Under the influence of the electric field, this secondary layer contributes significantly to overall fluid replenishment rate, allowing steady operation of the emitting protrusions.

Figure 10A:
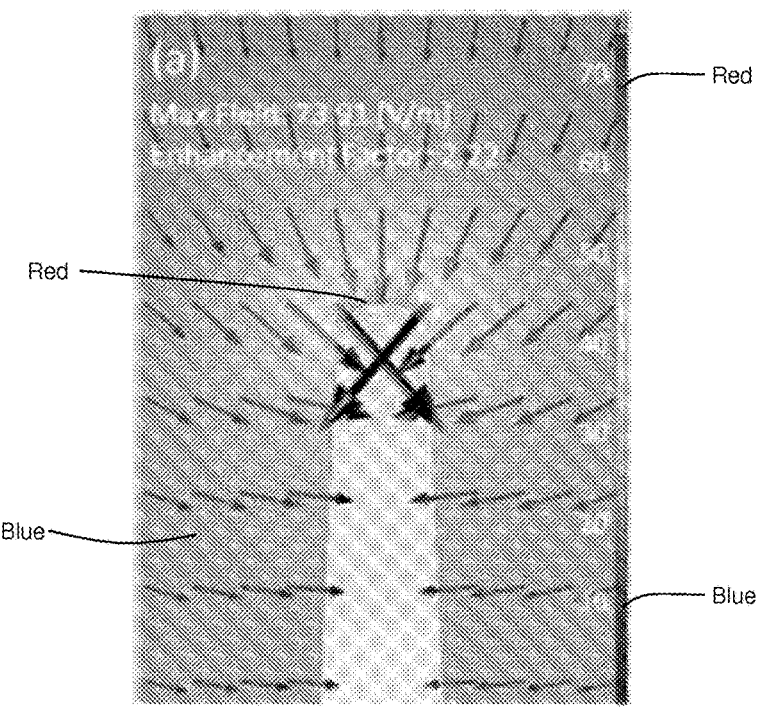
FIGS. 10A-10B are, according to one set of embodiments, (A) a front view and (B) a side view of an electric field simulation in which 1 Volt has been applied across an emitter and extractor electrode spaced 3 cm apart.
Figure 10B:
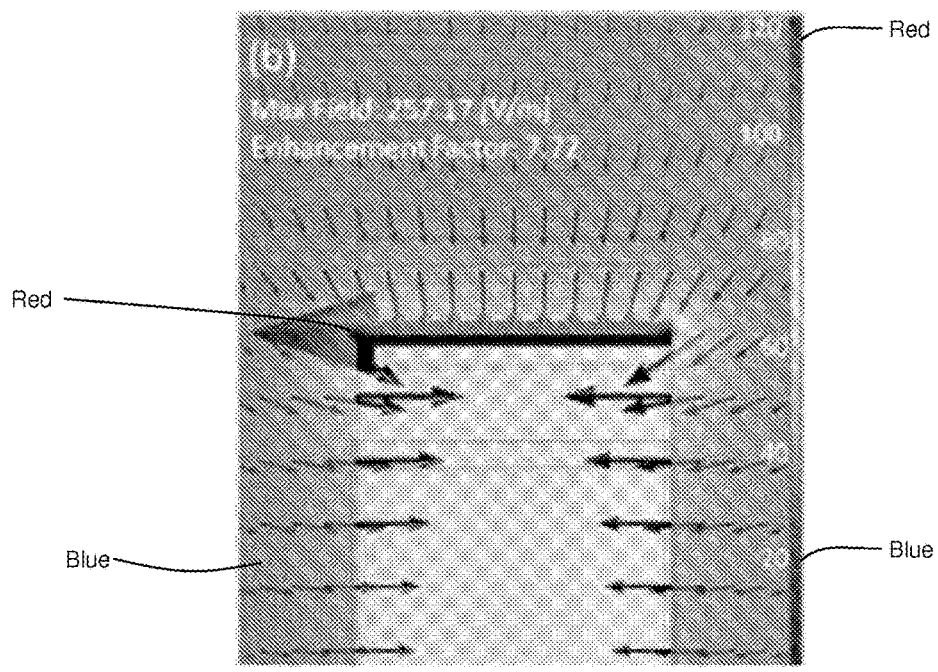

The MEMS multiplexed electrospinning source described in this example uses high aspect ratio emitting protrusions that act as field enhancers to ionize the polymer solution at low voltage. The emitting protrusions trigger nanofiber generation when the electrostatic pressure surpasses the pulling due to surface tension, a condition given by:

$$\frac{1}{2}\varepsilon_o \cdot E_s^2 \geq \frac{2 \cdot \gamma}{R_c} \quad [3]$$

where $\varepsilon_o$ is the electrical permittivity of free space, $E_s$ is the electric field at the surface of the tip, $\gamma$ is the surface tension of the liquid, and $R_c$ is the radius of curvature of the liquid free surface, which is on the order of the tip radius. $E_s \approx \beta V$, where V is the bias voltage and $\beta$ is the field factor; therefore, spikes with high field factor achieve ionization of the liquid with less voltage. For ideal spiked structures of length L and tip radius r, $\beta$ should grow linearly with the aspect ratio L/r. The spike tips the MEMS multiplexed electrospinning source described in this example contained moderate curvature r in one direction and no curvature in the other direction except at the edges where the curvature is very high. COMSOL Multiphysics was used to simulate the electrostatics for this type of geometry and determine the field factor of the spike. The results revealed that the sharp edge curvature overpower the moderate curvature defined by the tip radius, such that variations in tip radius have only a minor effect on the field enhancement (FIGS. 10A-10B). Therefore, it is expected that electrospinning of nanofibers will be concentrated at the sharp edge where the micropillar forest terminates.

Figure 11A:
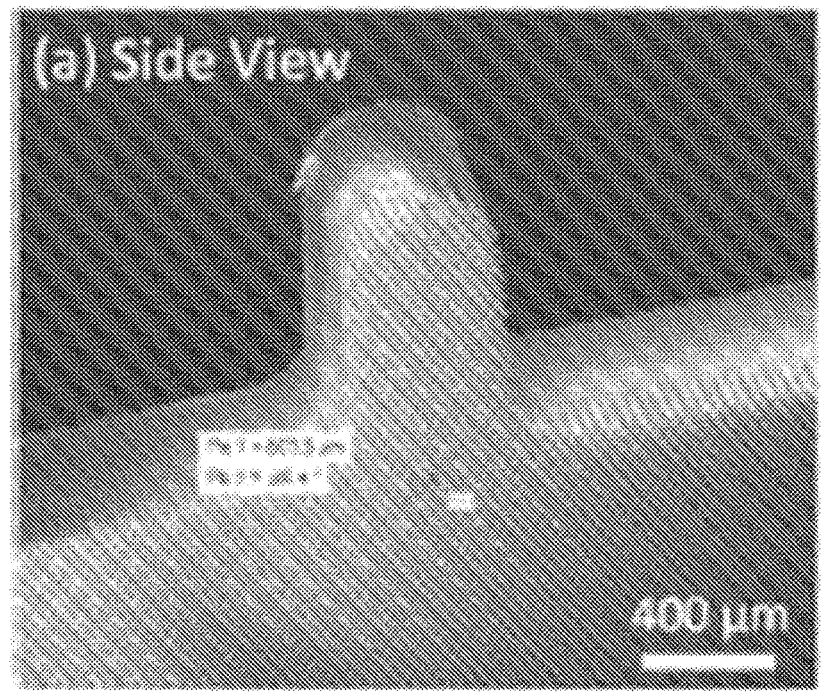
FIGS. 11A-11B are, according to one set of embodiments, (A) side view and (B) top view SEM images of an emitter protrusion including microstructured features.
Figure 11B:
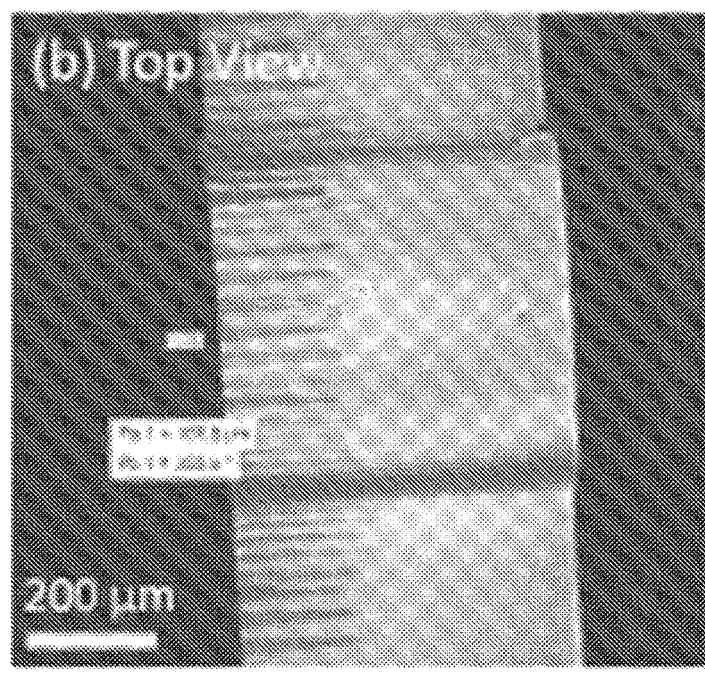

MEMS electrospinning emitting protrusion arrays were batch-microfabricated from 500 micrometer-thick, 6-inch double side polished silicon wafers. Deep reactive ion etching (DRIE) and a nested mask composed of a developed photoresist film on top of a reactive ion etching (RIE)-patterned silicon oxide film were used to etch the surface microstructure and extract the linear arrays of spikes from the silicon substrate. The resulting structure is shown in FIGS. 11A-11B. The slotted base piece was also microfabricated using DRIE, with the slot widths tapered for a sliding interference fit so that assembly of the emitting protrusions could be achieved with mild force using a pair of tweezers. Good vertical alignment was maintained with protruding arms on the linear emitting protrusion arrays that contact the top of the base on both sides of the slot. A single linear emitting protrusion array had an active length of 1 cm with 1 to 5 emitting protrusions measuring 0.5 to 5 mm in height and 50 to 250 micrometers in tip radius. The micropillar surface roughness included pillars with diameters of 5 to 35 micrometers, pitches of 20 to 40 micrometers, and heights of 100 to 200 micrometers.

Polyethylene oxide (PEO) with an average molecular weight of 600,000 g/mol was dissolved in deionized water at a concentration of 6% w/v. This solution was further diluted to yield concentrations between 2 and 6 w/v % in water/ethanol mixtures ranging from 100/0 v/v to 60/40 v/v. Assembled planar emitting protrusion arrays were secured with to a grounded electrical contact on a support rig made of polyphenylene sulfide (PPS), a chemically resistant dielectric. DC high voltage was biased between the emitting protrusion array and a collector, which was placed between 1 and 15 cm away from the emitting protrusions (FIGS. 12A-12B). Polymer solution was deposited over the emitting protrusions with a pipette, and the voltage was increased until the initiation of fiber emission. Video images were recorded of full arrays and individual emitting protrusions during electrospinning to monitor the fiber production process.

Figure 13A:
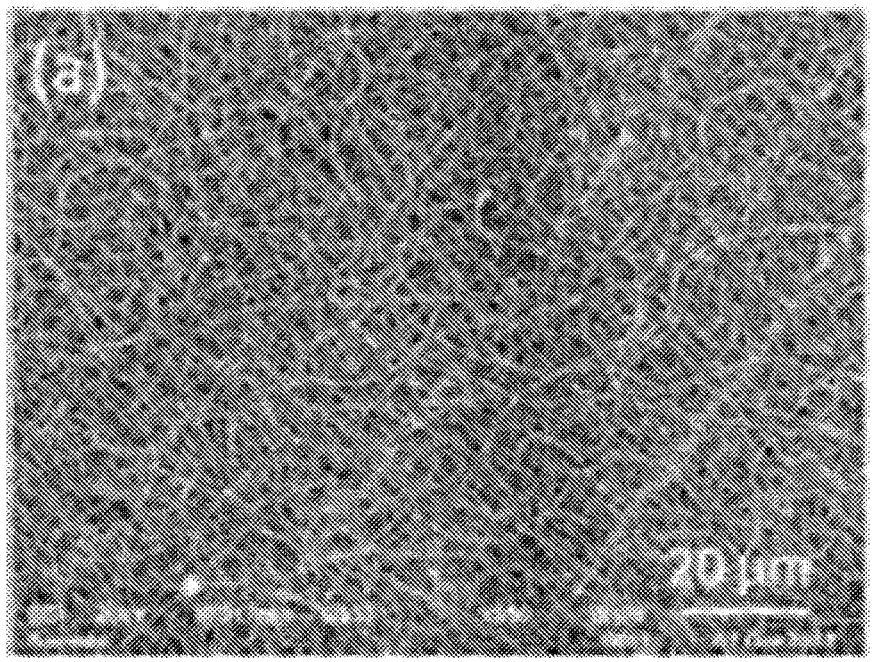
FIGS. 13A-13B are SEM images of an exemplary unwoven fiber mat produced using an exemplary electrospinning system.
Figure 13B:
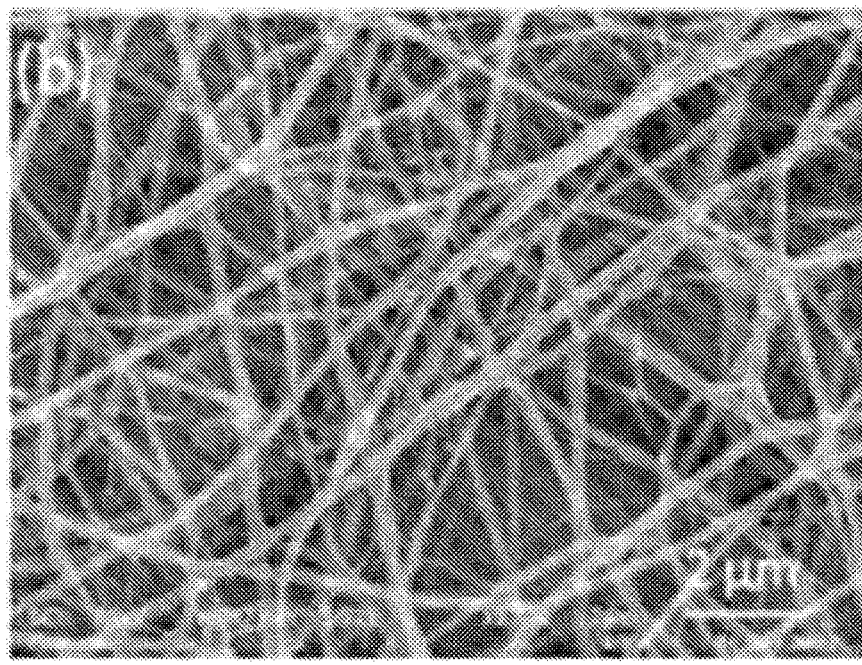

The MEMS devices demonstrated successful electrospinning of PEO nanofibers, like those shown in FIGS. 13A-13B, with diameters of a few hundred nanometers or less. Electrospinning of higher concentration solutions with higher viscosity resulted in thicker, more uniform fibers. Several different regimes of electrospinning were also noted, which seemed to be determined by combinations of emitter geometry, wetting characteristics, and electric field strength.

In all cases, the starting voltage for fiber emission proved to be greater than what was required to maintain electrospinning from already flowing jets, so in our tests we often lowered the voltage below the starting value once the process had initiated. In general, this resulted in more uniform, controlled emission.

Figure 14A:
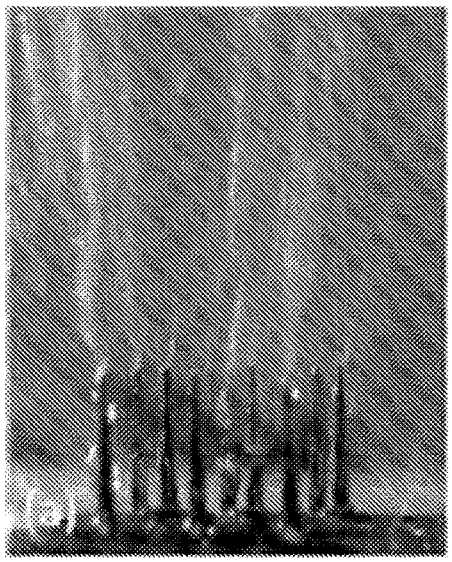
FIGS. 14A-14D are photographs of (A) a 3×3 array of 5-millimeter tall emitters, (B) a Taylor cone emission, (C) a single stream emission, and (D) a multiple-stream emission during an exemplary electrospinning experiment.
Figure 14B:
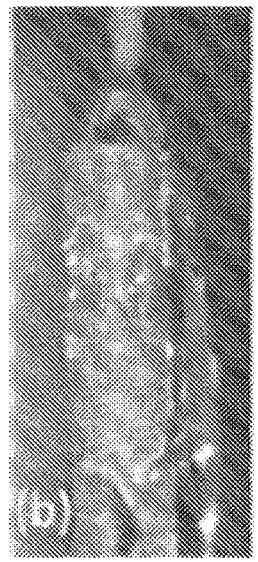
Figure 14C:
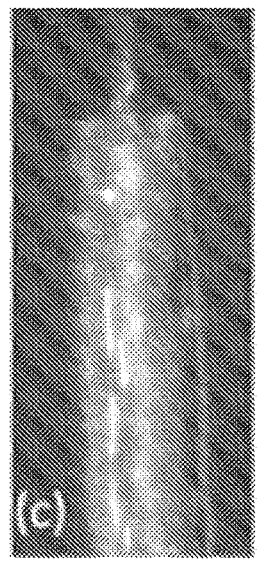
Figure 14D:
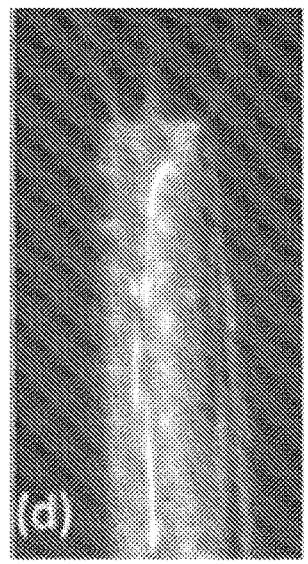

In one emission regime observed for shorter, closely-packed emitting protrusions, mobile emission jets roamed over the array area during the course of the electrospinning process. Jets occasionally pinned to individual emitting protrusion tips, but did not stay anchored for long and also emitted directly from the liquid free-surface. Electrospinning in this regime exhibited extensive chaotic whipping instability. Taller emitting protrusions were much better at anchoring emission jets to the emitting protrusion tips, and they activated at lower voltages. Not wishing to be bound by any particular theory, it is believed that the longer emitting protrusions were activated at lower voltages due to stronger electric field enhancement. FIG. 14A shows an array of nine 5 mm-tall emitting protrusions, each generating one or more jets from its tip; they are also able to support Taylor cones typical of traditional needle electrospinning sources that produce initially wider fibers (FIG. 14B) that narrow due to whipping on their way to the collector. This regime was characterized by chaotic electrostatic whipping instability, but offered more control due to the improved jet anchoring.

Figure 15A:
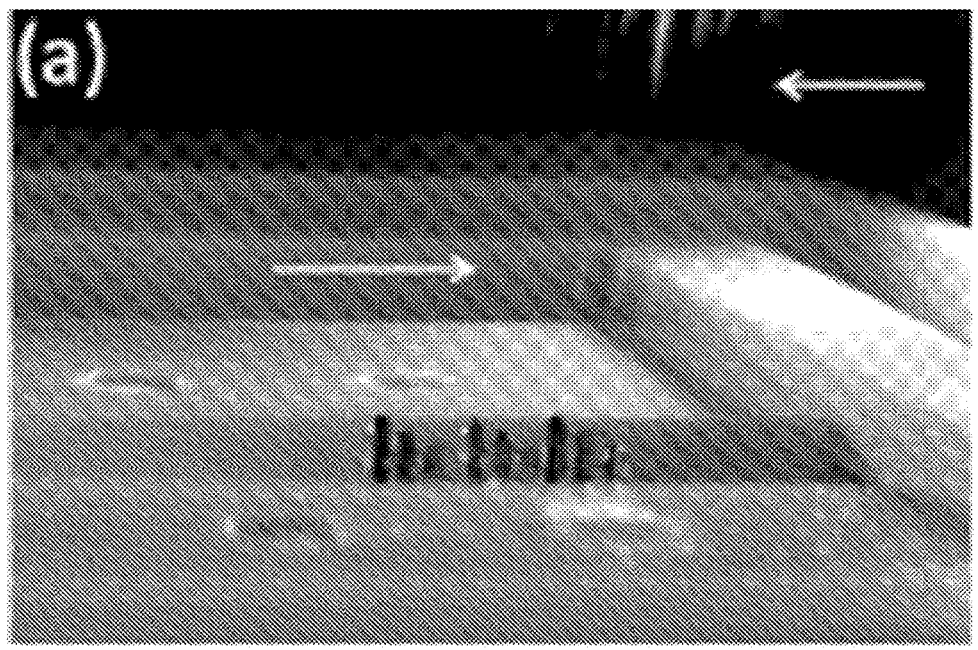
FIGS. 15A-15B are, according to one set of embodiments, photographs of emission from 5-millimeter tall emitting protrusions.
Figure 15B:
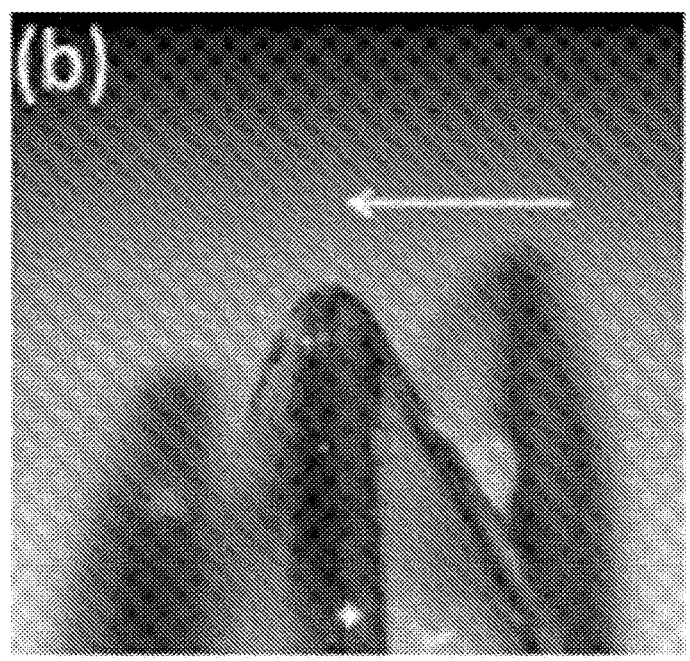

The 5 mm-tall electrospinning emitting protrusions could also support a more stable regime of emission at shorter working distances and lower voltages. However, such emission was more difficult to maintain, especially uniformly across the array. It was highly sensitive, not only to the operating voltage and alignment of the emitter and extractor electrode, but to the specific electric field profile as influenced by surrounding objects. Sometimes the strong field enhancement characteristic of shorter working distances produced a corona discharge, which seemed to inhibit electrospinning. FIG. 15A captures stable emission from a 5 mm-tall array that sits in a bath of polymer solution and is partially shielded by the dielectric base. Only part of the array actually emitted fibers, but they were finer upon emission (FIG. 15B) and therefore, they required less whipping and stretching to reach desirable diameters. For an identical solution of 2.8% w/v PEO in 60/40 ethanol/water spun from 5 mm spikes, a sample of chaotically whipped fibers had an average diameter of 166 nm while a sample of stable fibers averaged 209 nm. Reliably producing such narrow fibers without whipping can minimize jet-to-jet interaction and greatly increase the density with which emitting protrusions may be packed.

Example 2

This example describes the design, fabrication, and experimental characterization of an externally-fed, batch-microfabricated electrospray emitting protrusion array including an integrated extractor grid and carbon nanotube flow control structures. In this example, the electrospray emitting protrusion is used for low voltage and high-throughput electrospray of the ionic liquid 1-ethyl-3-methylimidazolium tetrafluoroborate (EMI-BF$_4$) in vacuum. The conformal carbon nanotube forest on the emitting protrusions provided a highly effective wicking structure to transport liquid up the emitting protrusion surface to the emission site at the tips of the emitting protrusions. Arrays containing as many as 81 emitting protrusions in 1 cm$^2$ were tested and emission currents as high as 5 microamps per emitting protrusion in both polarities were measured, with a start-up bias voltage as low as 520 V. Imprints formed on the collector electrode and per-emitting protrusion IV characteristics showed excellent emission uniformity.

The design described in this example features a hierarchical structure that brings together structures with associated characteristic lengths that span five orders of magnitude: mesoscale deflection springs for precision assembly of an extractor electrode die to an emitting protrusion array die to attain low beam interception, micro-sharp emitting protrusion tips for low voltage electrospray emission, and a nanostructured conformal CNT wicking structure that controls the flow rate fed to each emitting protrusion to attain high emitting protrusion current while maintaining good array emission uniformity.

The emitter die and extractor die are fabricated separately, and are assembled together using deflection springs that clamp onto dowel pins and provide precise alignment of the two components. The electrode separation distance is tuned using insulating spacers. In general, this distance should be small for a low start-up voltage, which is given by $$V_{start} = \sqrt{\frac{\gamma \cdot R}{\varepsilon_o}} \ln\left[\frac{2G}{R}\right] \quad [4]$$

where $\gamma$ is the surface tension, R is the emitting protrusion tip radius, $\varepsilon_o$ is the permittivity of free space, and G is the distance from the emitting protrusion tip to the edge of the extractor aperture. After operation, the emitter and the extractor electrode are easily disassembled, cleaned and replenished with liquid.

Internally-fed emitting protrusions supply liquid to the emission site through a capillary channel; this implementation is not ideal for ion emission because capillary channels typically provide low hydraulic impedance and internally fed emitting protrusions can be prone to clogging, which causes device failure. The electrospray emitting protrusions described in this example are instead externally-fed, using a dense plasma-enhanced chemical vapor deposited (PECVD) CNT forest conformally grown on the surface of the emitting protrusions. The CNT forest acts as a wicking material to transport the ionic liquid from the base of the emitting protrusions to the emitting protrusion tips where it is ionized due to the strong electric fields present there. The ionic liquid tested in this example (EMI-BF$_4$), does not generally spread well onto the surface of an uncoated silicon emitting protrusion array; the contact angle of EMI-BF$_4$ on silicon is about 38°. However, EMI-BF$_4$ was found to be highly wetting on a CNT-coated silicon emitting protrusion surface. A drop of EMI-BF$_4$ was found to spontaneously spread across the emitting protrusion array, impregnating the surface and coating the emitting protrusion tips.

In addition to its useful wetting properties, the CNT forests were found to provide hydraulic impedance to the ionic liquid as it flowed up the surface of the emitting protrusions. Electrospray emission can occur in the ionic regime rather than a mixed ionic/droplet regime if the flow rate to the emission site is sufficiently low. A porous medium can limit the flow across the emitting protrusion surface in order to match the low flow rate for ionic emission. CNT films have been found to be particularly useful, in certain cases, because their porosity (determined by CNT diameter and packing density) is highly tunable by changing the growth parameters. The flow rate in the ionic regime is related to the measured current I by $$Q = \frac{I\langle M\rangle}{Ne\rho} \quad [5]$$

where $\langle M\rangle$ is the average molar mass of the emitted particles, N is Avogadro's number, e is the elementary charge, and $\rho$ is the density of the liquid. For EMI-BF$_4$ ($\langle M\rangle$ of about 0.2 kg/mol, $\rho$=1300 kg/m$^3$), about 5 microamps of current per emitting protrusion corresponds to Q=8×10$^{-15}$ m$^3$/s. Flow through a porous medium is governed by Darcy's law:

$$\vec{q_s} = -\frac{K_{ps}}{\mu}\nabla P \quad [6]$$

where $\vec{q_s}$ is the volumetric flow rate per unit area, $\nabla P$ is the fluid pressure gradient from the base to the tip of the emitting protrusion, $K_{ps}$ is the permeability of the medium, and $\mu$ is the fluid viscosity. The CNT film was modeled as an array of pillars in order to calculate its permeability, which is a function of the CNT diameter distribution and the packing density. The CNT growth conditions were selected to obtain a permeability of about 10$^{-13}$ m$^2$, which provided sufficient impedance for the flow rate to meet the conditions for the ionic regime.

Figure 16:
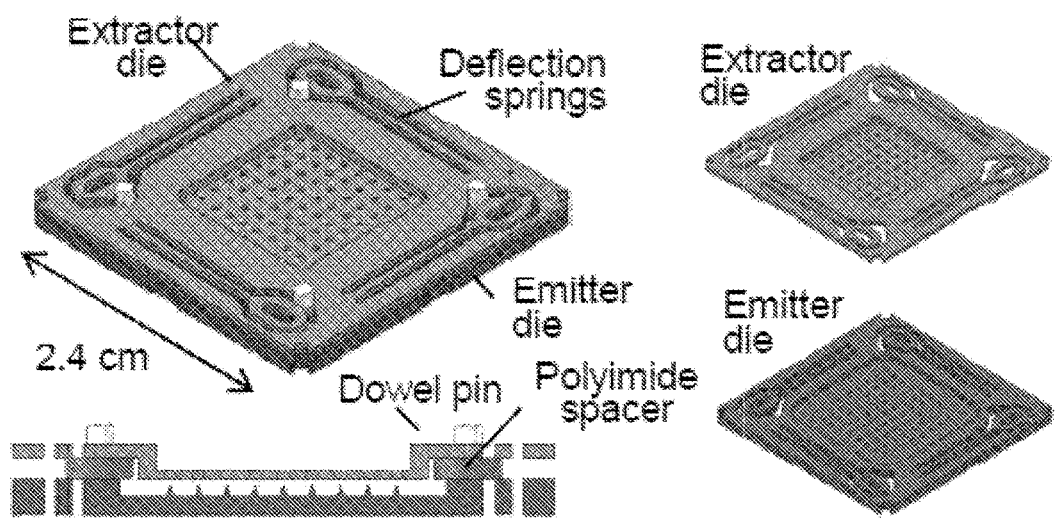
FIG. 16 is a set of exemplary schematic illustrations of an electrospray extractor grid die, an exemplary electrospray emitter die, and the assembly of the extractor and emitter dies into an electrospray diode using dowel pins and insulating spacers, according to one set of embodiments.
Figure 17A:
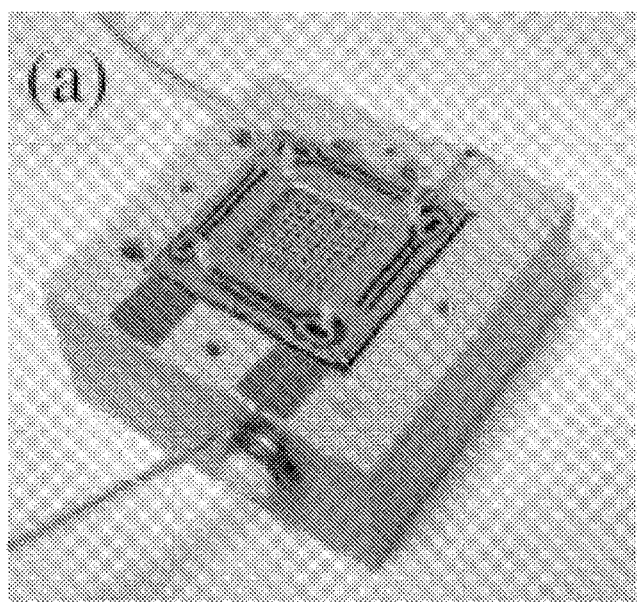
FIG. 17A is a photograph of an exemplary assembled electrospray emitter, according to certain embodiments.
Figure 17B:
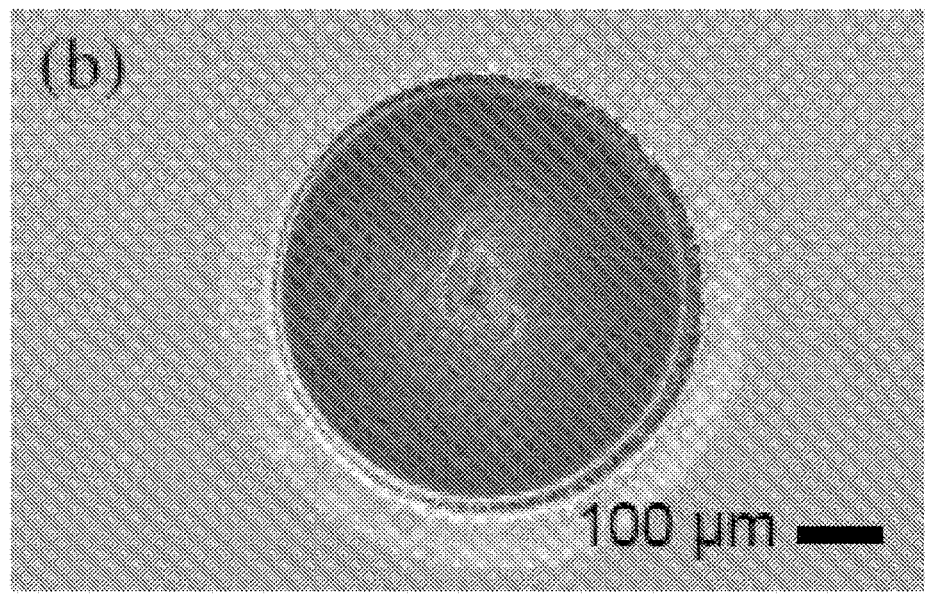
FIG. 17B is an SEM image illustrating the alignment of an emitter protrusion tip and an extractor aperture, according to one set of embodiments.

The electrospray source included two dies, an emitter die and an extractor grid die (FIG. 16). Each die was 2.4 cm by 2.4 cm and 1 mm thick. The emitter dies contained arrays of 4, 9, 25, 49, and 81 emitting protrusions in a 1 cm$^2$ area. The emitting protrusions were 300-350 micrometers tall. The extractor grid die contained a matching array of 500 micrometer diameter circular apertures that were 250 micrometers thick. Both dies contained four deflection springs that were clamped onto dowel pins to obtain precise alignment of the two components. When the two dies were assembled (FIG. 17A), each emitting protrusion tip was aligned precisely underneath a grid aperture (FIG. 17B). Four thin polyimide spacers electrically insulated the two dies and set the emitter-to-extractor separation distance.

The extractor grid (FIG. 18A) and emitter (FIG. 18B) dies were fabricated using contact lithography starting with 1 mm thick, double-side polished doped silicon wafers. The extractor grid dies were fabricated using two (2) deep reactive-ion etching (DRIE) steps. First, the springs and a 750 micrometer-deep recess for the apertures were etched on the front side of the wafer; then, a second, back-side DRIE step was used to create 600 micrometer-deep recesses around the springs and the array of apertures. A thin film of titanium/gold was sputtered onto the grid dies to increase their electrical conductivity.

Figure 19A:
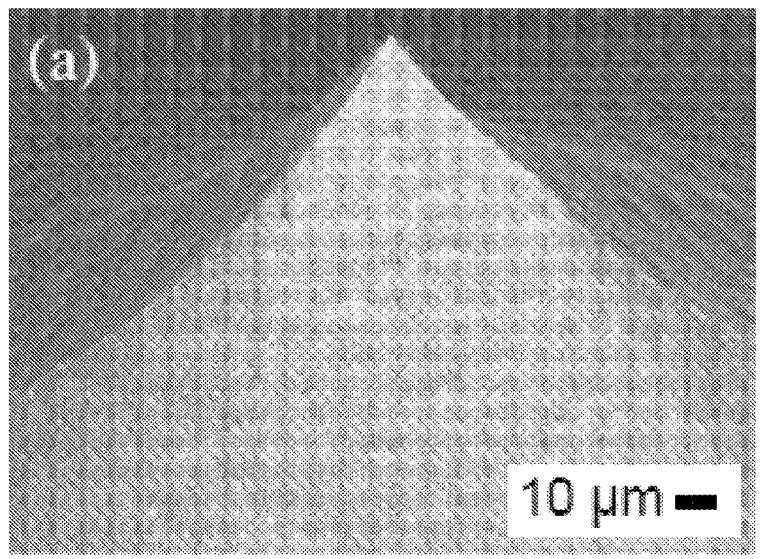
FIG. 19A is, according to certain embodiments, an exemplary SEM image of an electrospray protrusion.
Figure 19B:
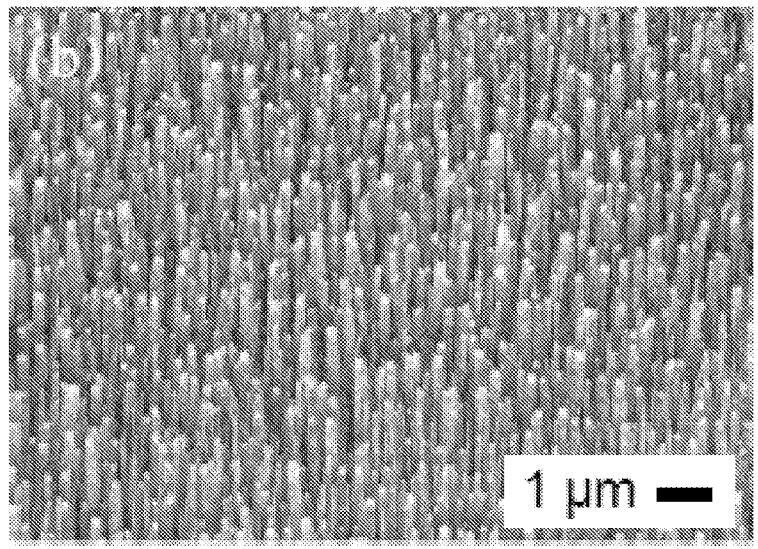
FIG. 19B is an exemplary SEM image of aligned carbon nanotubes (CNTs) on the external surface of an exemplary electrospray protrusion, according to some embodiments.

The emitter dies were fabricated by first etching the array of emitting protrusion tips on the front side of the wafer using isotropic SF$_6$ reactive-ion etching (RIE). An array of three-notched dots, 292 micrometers in diameter, patterned in photoresist was used as the masking material. The silicon underneath the notched dots was gradually undercut during the RIE step until sharp tips were formed. Next, a DRIE step was used to etch the springs on the back side of the wafer. To complete the emitter die, a CNT film was grown on the surface of the emitting protrusions. Titanium nitride and nickel films were sputtered onto the 1 cm by 1 cm active area of the emitting protrusions using a shadow mask. CNTs were grown using plasma-enhanced chemical vapor deposition (PECVD), with ammonia and acetylene as precursors. The CNTs were about 2 micrometers tall and averaged 115 nm in diameter. The CNTs conformally coated the surface of the emitting protrusions and the entire active area of the emitter dies, as shown in FIGS. 19A-19B. The PECVD process ensured that the CNTs were firmly attached to the surfaces of the emitting protrusions; no detachment was observed after application of the ionic liquid or after repeated cleaning and reassembly of the electrospray sources.

Figure 20:
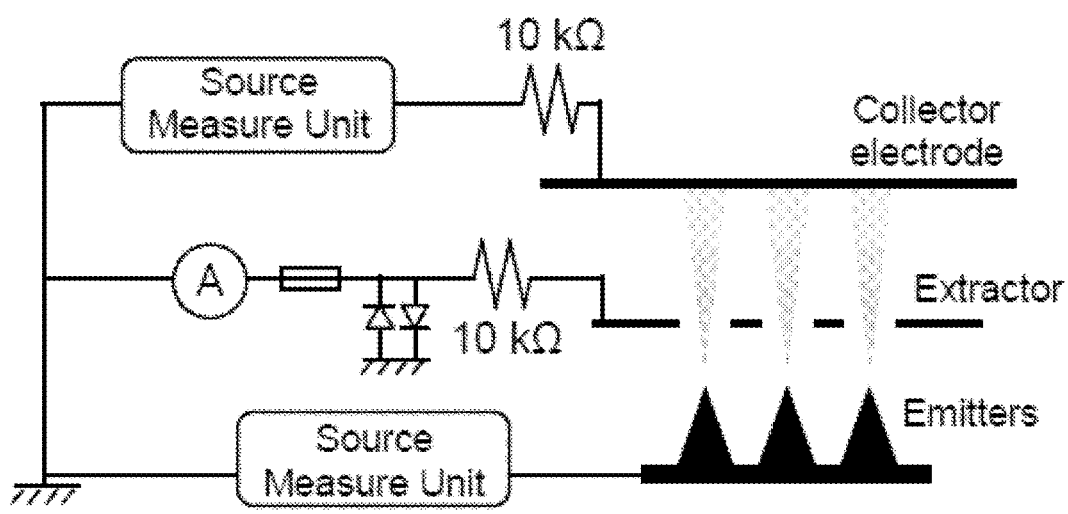
FIG. 20 is, according to one set of embodiments, a schematic of an electro spray testing circuit.

The electrospray sources were tested in a vacuum chamber at a pressure of about 10$^{-6}$ Torr. For each test, a 0.5 microliter drop of EMI-BF$_4$ was deposited on the surface of the emitting protrusions, which spread spontaneously to coat the surface of the emitting protrusion arrays. The liquid stopped spreading once it reached the outer edge of the CNT-coated emitter active area and did not wet the surrounding silicon, thereby avoiding a potential electrical short due to liquid bridges forming between the emitter and the extractor electrode at the dowel pins. The emitter and extractor dies were assembled together by clamping the deflection springs onto four acetal dowel pins, with polyimide spacers separating the emitter and the extractor electrode. A triode configuration was used to characterize the performance of the electrospray sources, in which a silicon collector electrode, placed 3.5 mm from the emitter die, was used to measure the emission current and also to collect imprints of the emission. The circuit used to test the devices is shown in FIG. 20. A Bertan 225-10R source-measure unit (SMU) was used to bias the emitter up to ±2000 V, alternating the polarity to avoid a build-up of ions of either polarity. A Keithley 6485 picoammeter was used to measure the current intercepted by the extractor grid, and a Keithley 237 SMU was used to measure the collector current. A pair of diodes and a fuse were used to protect the picoammeter from current surges. The extractor electrode was held at 0 V and the collector electrode was biased up to 1000 V with opposite polarity relative to the polarity of the emitted beam (e.g., a positively biased emitter die would face a negatively biased collector). Data were collected using LabView run on a personal computer.

The performance of the electrospray sources with different array sizes was characterized. In all devices, three different phases of emission were observed: an initial overwet phase, a steady phase, and a depletion phase. With fresh liquid applied to the emitter surface, emission was initially noisy and unstable, punctuated by current surges that were thought to be due to droplet emission. Subsequently, emission became more steady and was marked by output current as high as 5 microamps per emitting protrusion. After more than five minutes of operation, the liquid on the surface of the emitters began to deplete, and beyond a certain bias voltage the current stopped increasing. Once the liquid was replenished, the devices could be reused.

Figure 21:
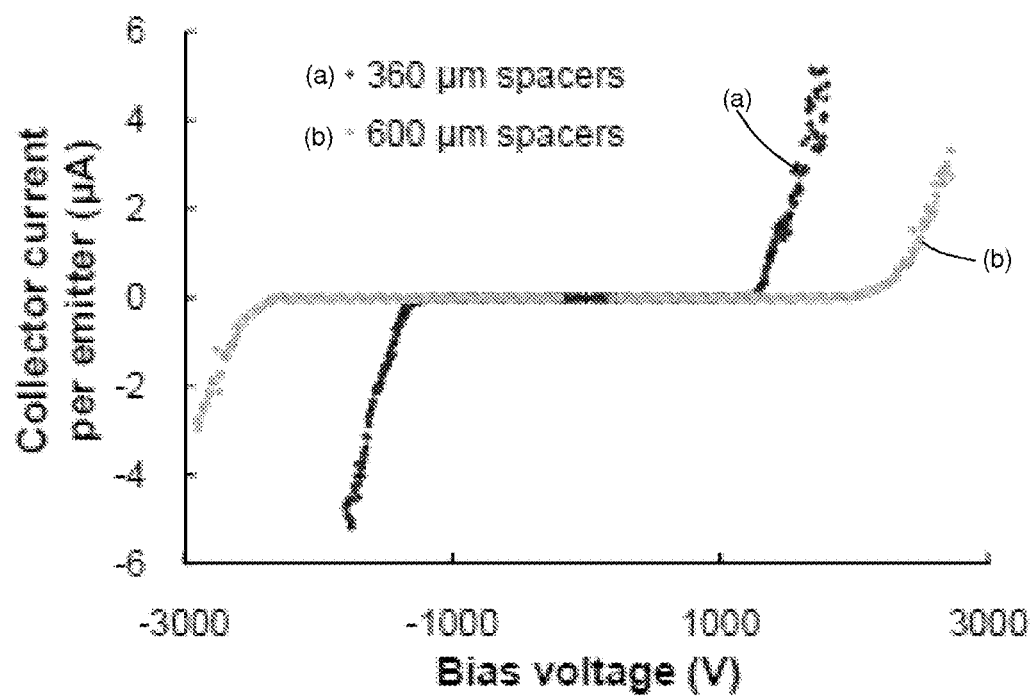
FIG. 21 is an exemplary plot of collector current per emitter as a function of emitter-to extractor bias voltage for an emitter comprising a 7 by 7 array of protrusions, with 360 µm and 600 µm emitter-to-extractor spacing electrode, according to one set of embodiments.

The current-voltage characteristics of a 7 by 7 emitting protrusion array during the steady emission phase are shown in FIG. 21, with 600 micrometer (G=320 micrometer) and 360 micrometer (G=250 micrometer) separation between the emitter and extractor electrodes. Thinner spacers 240 micrometers thick were also tested, but these led to liquid shorts forming between the emitter and extractor electrodes shortly after emission began. The curves showed a strong non-linear dependence between the current and the bias voltage. The emission current increased exponentially for current below 0.5 μA, and then increased essentially linearly with a slope of 90 nA/V. Assuming the start-up voltage corresponds to the voltage at which the collector current per emitting protrusion reaches 5×10$^{-6}$ microamps, the start-up voltage was 520 V for the 360 micrometer spacers and 1200

V for 600 micrometer spacers. It was clear that reducing the gap between the electrodes reduced the operating voltage.

Figure 22:
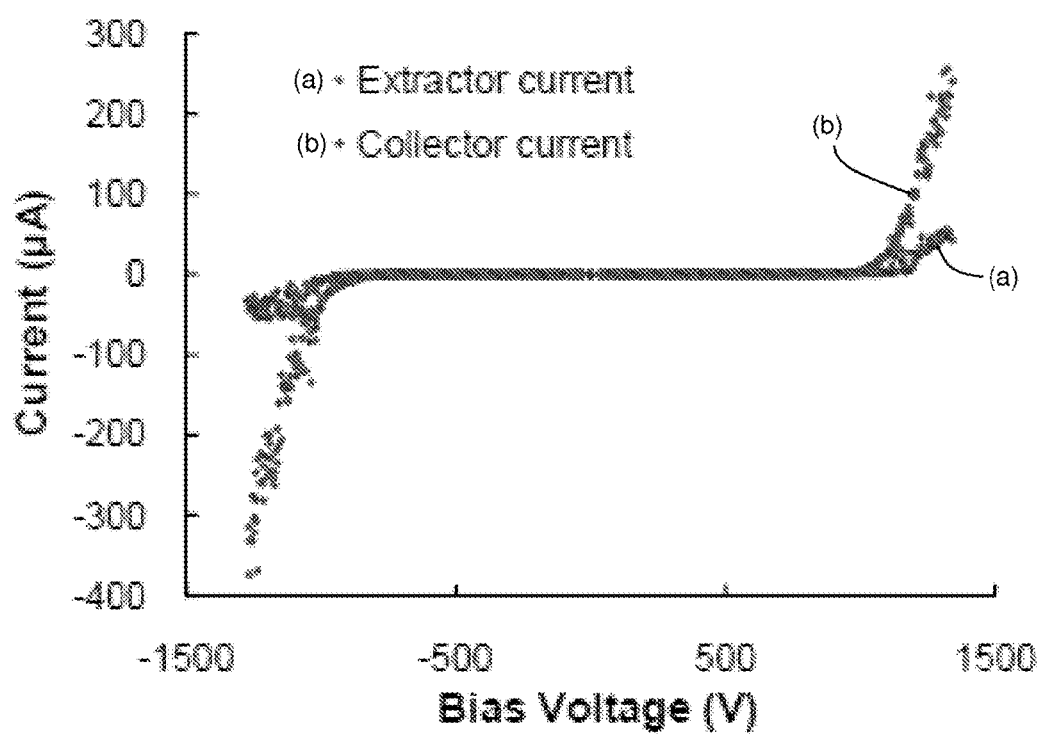
FIG. 22 is, according to certain embodiments, an exemplary plot of collector current as a function of emitter-to-extractor bias voltage for an emitter comprising a 9 by 9 array of emitting protrusions.

For currents above 50 nanoamps per emitting protrusion, the devices typically exhibited about 80% transmission in both polarities. The extractor and emitter current for a 9 by 9 emitter array are plotted in FIG. 22, showing an intercepted current on the extractor electrode consistently lower than 20%. This interception current could be reduced by increasing the aperture diameter (at the cost of having to increase the bias voltage), or by applying a larger bias voltage to the collector electrode.

Figure 23:
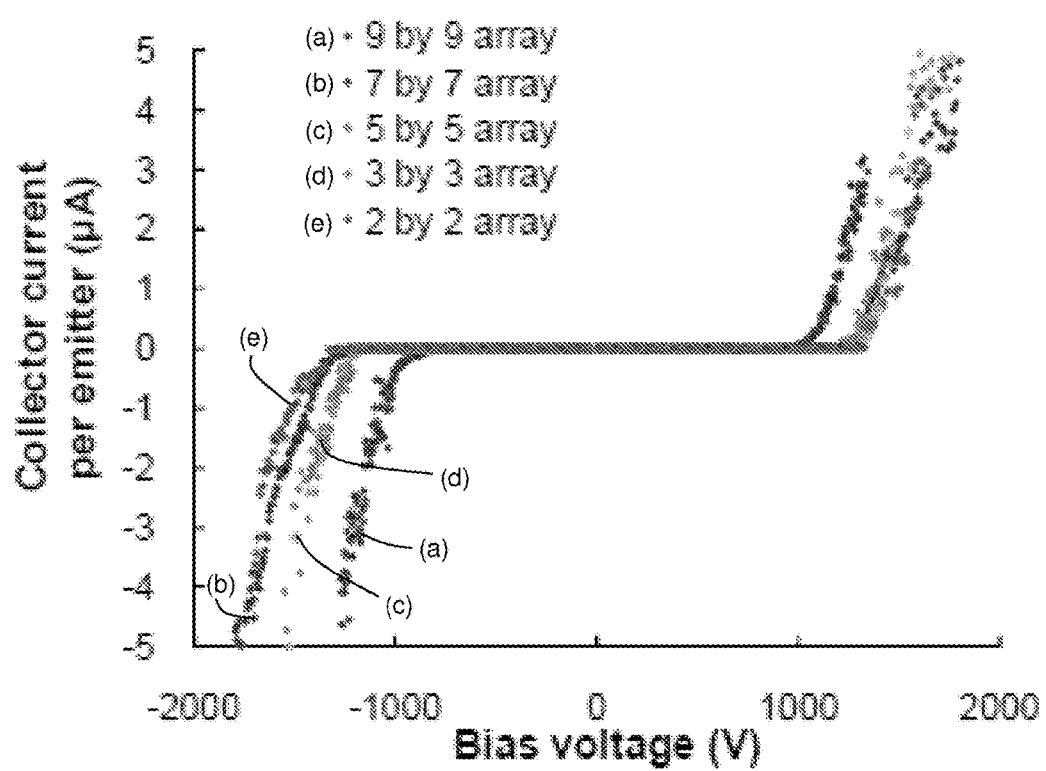
FIG. 23 is, according to one set of embodiments, an exemplary plot of collector current per emitter as a function of emitter-to-extractor bias voltage for five different emitter arrays.
Figure 24A:
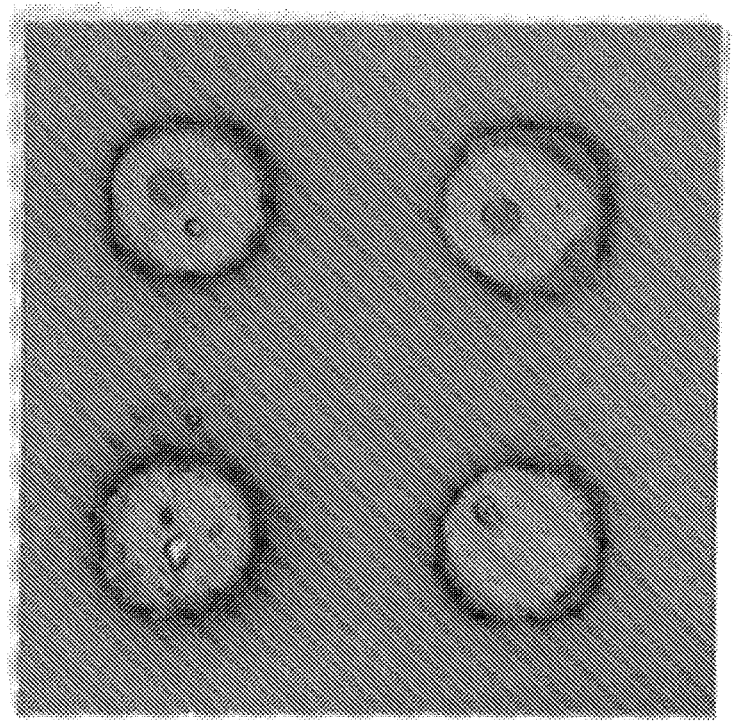
FIGS. 24A-24B are, according to one set of embodiments, exemplary electrospray imprints on a 2 cm by 2 cm silicon collector electrode for (A) an emitter comprising a 2 by 2 array of protrusions and (B) an emitter comprising a 7 by 7 array of protrusions.
Figure 24B:
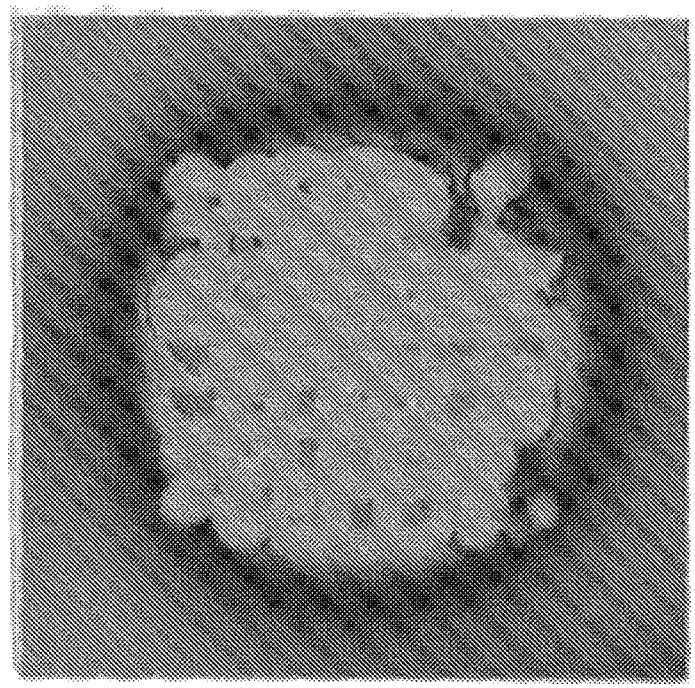

Current-voltage characteristics in the steady phase for all five emitter array sizes are shown in FIG. 23, using 360 micrometer-thick spacers between the emitter and extractor electrodes in all cases. Symmetric emission was obtained in both polarities with as much as 5 microamps per emitting protrusion tip. Similar curve shapes and slopes indicated that the emitting protrusions operated uniformly in each of the different-sized arrays. Lower start-up voltage was observed for the 9 by 9 emitting protrusion array because the etched emitting protrusions were about 50 micrometers taller than in the other arrays. Imprints (FIGS. 24A-24B) on the collector electrode confirmed that the emitting protrusions turned on uniformly across the arrays, with patterns on the collector plates that matched the emitting protrusion array layouts. To calculate the beam divergence angle, the imprints from the 2 by 2 emitter array were used as a reference. The imprint from a single emitting protrusion had a diameter of about 5.8 mm, and the collector was spaced 3.7 mm from the emitting protrusion tips, corresponding to a beam divergence semi-angle of 38°.

Example 3

Figure 25A:
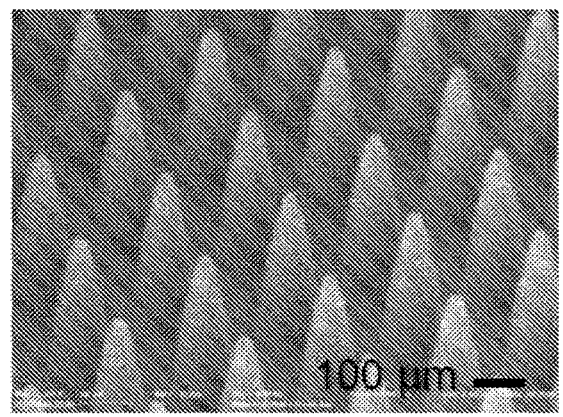
FIGS. 25A-25C are SEM images of arrays of protrusions over which carbon nanotubes are arranged.
Figure 25B:
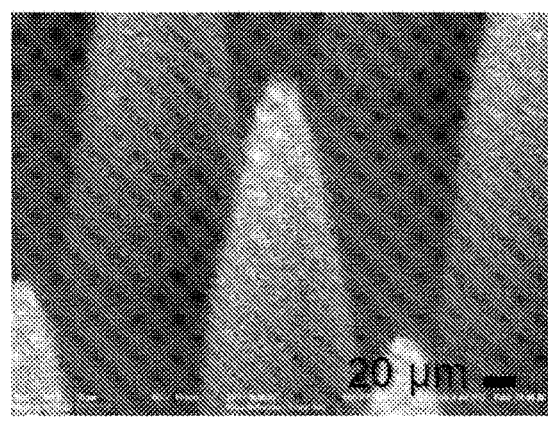
Figure 25C:
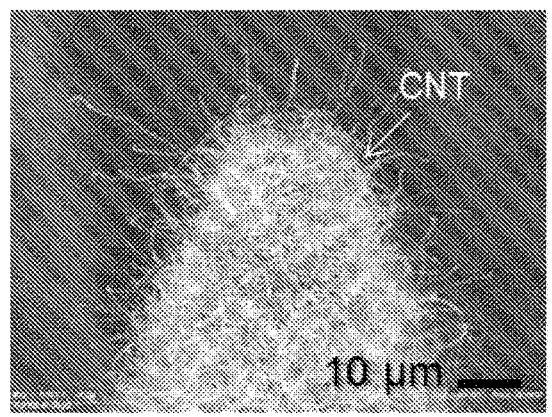

This example described the fabrication of an emitter comprising a dense array of protrusions (1900 emitters in 1 cm$^2$) and an electrospraying system using the same. The emitter was fabricated using a similar process as outlined in Example 2, using alternating RIE and DRIE steps (rather than DRIE steps alone). The masking material included an array of three-notched dots, patterned in photoresist. The silicon underneath the notched dots was gradually undercut until sharp tips were formed. Next, a DRIE step was used to etch springs on the back side of the wafer. To complete the emitter dies, a CNT forest was grown on the surface of the emitters. A 50 nm thick titanium nitride film and a 20 nm thick nickel film were sputtered onto the 1 cm by 1 cm active area of the emitting protrusions using a shadow mask. CNTs were grown using a plasma enhanced chemical vapor deposition (PECVD) technique with ammonia and acetylene as precursor gases. The CNTs were 2 microns tall, averaged 115 nm in diameter, and conformally coated the surface of the protrusions and the entire active area of the emitter dies. SEM images of the resulting protrusion arrays are shown in FIGS. 25A-25C.

Figure 26:
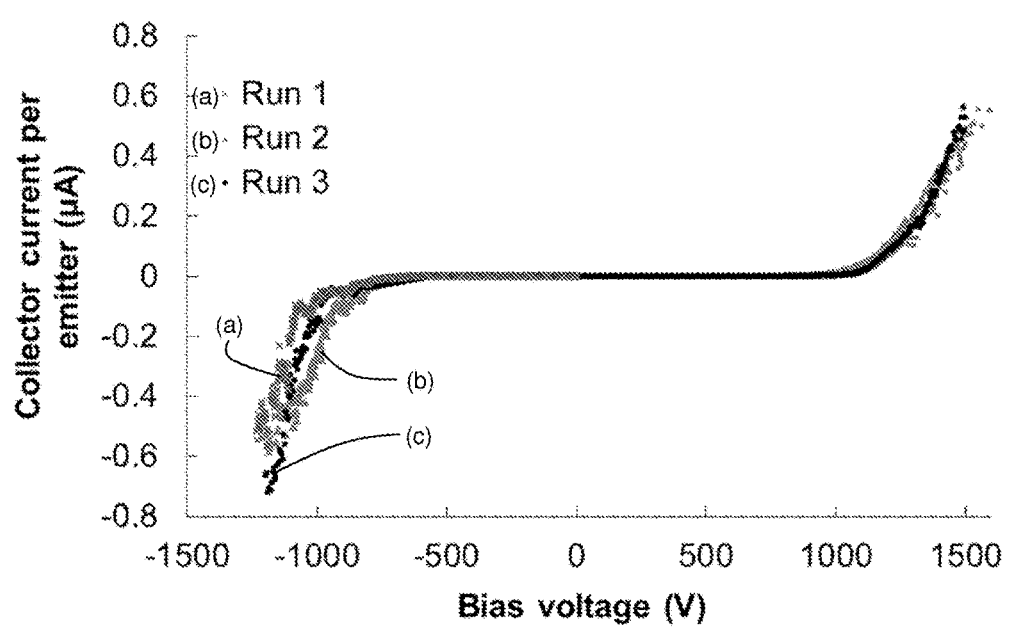
FIG. 26 is an exemplary plot, according to one set of embodiments, of collector current per protrusion as a function of emitter-to extractor bias voltage for an emitter comprising an array of 1900 protrusions per cm².

Current-voltage characteristics in the steady phase for the array of 1900 emitters in 1 cm$^2$ are shown in FIG. 26, using 360 micrometer thick spacers between the emitter and extractor electrodes. Symmetric emission was obtained in both polarities with as much as 0.5 microamps per emitting protrusion tip. The average start-up voltage was 700 V. Maximum output current of 1 mA was measured, corresponding to an output current density of 1 mA/cm$^2$. The imprints on the collector electrodes indicated uniform emission across the emitter array.

The following applications are hereby incorporated by reference in their entirety for all purposes: U.S. Provisional Patent Application Ser. No. 61/827,905, filed May 28, 2013, and entitled "High-Throughput Manufacturing of Nanofibers Using Massive Arrays of Electrospinning Emitters"; U.S. Provisional Patent Application Ser. No. 61/827,893, filed May 28, 2013, and entitled "Bio-Inspired Electrospray Emitter Arrays for High-Throughput Ionization of Liquids"; and U.S. Non-Provisional patent application Ser. No. 13/918,742, filed on Jun. 14, 2013, published as U.S. Patent Publication No. US 2014/0353397 on Dec. 4, 2014, and entitled "Electrospraying Systems and Associated Methods."

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system, comprising:
   an emitter comprising an array of at least about 9 protrusions extending from an emitter substrate and having an aerial density of at least about 9 protrusions/cm$^2$; and
   an electrode;
   wherein:
      when a voltage is applied across the emitter and the electrode and the emitter is exposed to a fluid, the fluid is essentially simultaneously emitted from at least about 10% of the protrusions in the array toward the electrode, and
      at least one of the protrusions comprises a plurality of microstructures having aspect ratios of greater than 10 extending from at least one external surface of the protrusion.

2. The system of claim 1, wherein the protrusions have an aerial density of between about 9 protrusions/cm$^2$ and about 100,000 protrusions/cm$^2$.

3. The system of claim 1, wherein the protrusions do not contain internal fluid passageways.

4. The system of claim 1, comprising a voltage source configured to apply the voltage across the emitter and the electrode.

5. The system of claim 1, wherein, when the voltage is applied across the emitter and the electrode, and the emitter is exposed to a fluid, the fluid is essentially simultaneously emitted from at least about 90% of the protrusions in the array toward the electrode.

6. The system of claim 1, wherein, when the voltage is applied across the emitter and the electrode, and the emitter is exposed to a fluid, the fluid is emitted in droplets toward the electrode.

7. The system of claim 6, wherein the droplets each have a volume, and the standard deviation of the volumes of the droplets is less than about 100% of the average of the volumes of the droplets.

8. The system of claim 1, wherein, when the voltage is applied across the emitter and the electrode and the emitter is exposed to a fluid, the fluid is emitted in continuous streams toward the electrode.

9. The system of claim 8, wherein the standard deviation of the cross-sectional diameters of the continuous streams is less than 100% of the average of the cross-sectional diameters of the continuous streams.

10. The system of claim 1, wherein fluid is essentially simultaneously emitted from at least about 10% of the protrusions in the array toward the electrode when a voltage of less than about 10 kilovolts is applied across the emitter and the electrode.

11. The system of claim 1, wherein fluid is essentially simultaneously emitted from at least about 10% of the protrusions in the array toward the electrode when a voltage of from about 100 volts to about 10 kilovolts is applied across the emitter and the electrode.

12. The system of claim 1, wherein at least a portion of the protrusions have heights of at least about 50 microns.

13. The system of claim 1, wherein the protrusions have volumes, and the standard deviation of the volumes of the protrusions is less than about 100% of the average of the volumes of the protrusions.

14. The system of claim 1, wherein the protrusions comprise tips having radii of curvature, and the standard deviation of the radii of curvature of the protrusion tips is less than about 100% of the average of the radii of curvature of the protrusion tips.

15. The system of claim 1, wherein the array of protrusions is a substantially planar array.

16. The system of claim 1, wherein the protrusions are substantially perpendicular to the emitter substrate.

17. The system of claim 1, wherein the system is configured such that a charged fluid is emitted from the protrusions.

18. The system of claim 1, wherein, when the voltage is applied across the emitter and the electrode, and the emitter is exposed to a fluid, the fluid is emitted as ions toward the electrode.

19. The system of claim 1, wherein at least a portion of the microstructures comprise nanotubes, nanofibers, nanowires, nanopillars, and/or nanowhiskers.

20. A system, comprising:
   an emitter comprising an array of at least about 9 protrusions extending from an emitter substrate and having an aerial density of at least about 9 protrusions/cm$^2$; and
   an electrode;
   wherein:
      when a voltage is applied across the emitter and the electrode and the emitter is exposed to a fluid, the fluid is essentially simultaneously emitted from at least about 10% of the protrusions in the array toward the electrode, and
      at least one of the protrusions comprises nanotubes, nanofibers, nanowires, nanopillars, and/or nanowhiskers having longitudinal axes extending outward from at least one external surface of the protrusion.

* * * * *